(12) United States Patent
Terentiev

(10) Patent No.: US 7,434,983 B2
(45) Date of Patent: Oct. 14, 2008

(54) SYSTEMS USING A LEVITATING, ROTATING PUMPING OR MIXING ELEMENT AND RELATED METHODS

(75) Inventor: Alexandre N. Terentiev, Lexington, KY (US)

(73) Assignee: LevTech, Inc., Lexington, KY (US)

( * ) Notice: Subject to any disclaimer, the term of this patent is extended or adjusted under 35 U.S.C. 154(b) by 0 days.

(21) Appl. No.: 11/496,702

(22) Filed: Jul. 31, 2006

(65) Prior Publication Data

US 2007/0030759 A1   Feb. 8, 2007

Related U.S. Application Data

(63) Continuation-in-part of application No. 10/491,512, filed as application No. PCT/US02/31478 on Oct. 2, 2002, which is a continuation of application No. 10/398,946, filed as application No. PCT/US01/31459 on Oct. 9, 2001, now Pat. No. 7,086,778.

(60) Provisional application No. 60/326,833, filed on Oct. 3, 2001, provisional application No. 60/318,579, filed on Sep. 11, 2001, provisional application No. 60/282,927, filed on Apr. 10, 2001, provisional application No. 60/239,187, filed on Oct. 9, 2000.

(51) Int. Cl.
*B01F 13/08* (2006.01)
*B01F 7/22* (2006.01)

(52) U.S. Cl. .................................... 366/273
(58) Field of Classification Search .............. 366/314, 366/273, 274, 343
See application file for complete search history.

(56) References Cited

U.S. PATENT DOCUMENTS

| | | | | |
|---|---|---|---|---|
| 1,648,983 A * | 11/1927 | Elrod | ............... | 366/263 |
| 3,206,173 A | 9/1965 | Burger et al. | | |
| 3,554,497 A | 1/1971 | Zipperer | | |
| 3,647,397 A * | 3/1972 | Coleman | ............... | 366/273 |
| 4,162,855 A | 7/1979 | Bender | | |
| 4,711,582 A * | 12/1987 | Kennedy | ............... | 366/279 |
| 5,298,875 A | 3/1994 | Laibowitz et al. | | |
| 5,456,586 A * | 10/1995 | Carson | ............... | 366/314 |
| 5,531,519 A * | 7/1996 | Earle | ............... | 366/139 |
| 5,727,878 A * | 3/1998 | Sullivan, Jr. | ............... | 366/247 |
| 5,779,359 A * | 7/1998 | Gambrill et al. | ............... | 366/273 |
| 5,941,867 A | 8/1999 | Kao | | |
| 6,280,077 B1 * | 8/2001 | Sullivan, Jr. | ............... | 366/247 |
| 6,494,613 B2 * | 12/2002 | Terentiev | ............... | 366/279 |
| 6,698,619 B2 * | 3/2004 | Wertenberger | ............... | 222/94 |
| 6,908,223 B2 * | 6/2005 | Bibbo et al. | ............... | 383/127 |
| 6,923,567 B2 * | 8/2005 | Bibbo et al. | ............... | 366/149 |
| 6,981,794 B2 * | 1/2006 | Bibbo et al. | ............... | 366/149 |
| 7,147,365 B2 * | 12/2006 | McGill | ............... | 366/314 |
| 7,153,021 B2 * | 12/2006 | Goodwin et al. | ............... | 366/273 |
| 7,168,848 B2 | 1/2007 | Gigas et al. | | |
| 2002/0105856 A1 * | 8/2002 | Terentiev | ............... | 366/262 |
| 2003/0205581 A1 * | 11/2003 | Wertenberger | ............... | 222/94 |
| 2005/0002274 A1 * | 1/2005 | Terentiev | ............... | 366/273 |

* cited by examiner

*Primary Examiner*—Tony G Soohoo
(74) *Attorney, Agent, or Firm*—King & Schickli, PLLC

(57) ABSTRACT

A system for pumping or mixing a fluid using a rotating pumping or mixing element and various other components for use in a pumping or mixing system are disclosed.

23 Claims, 32 Drawing Sheets

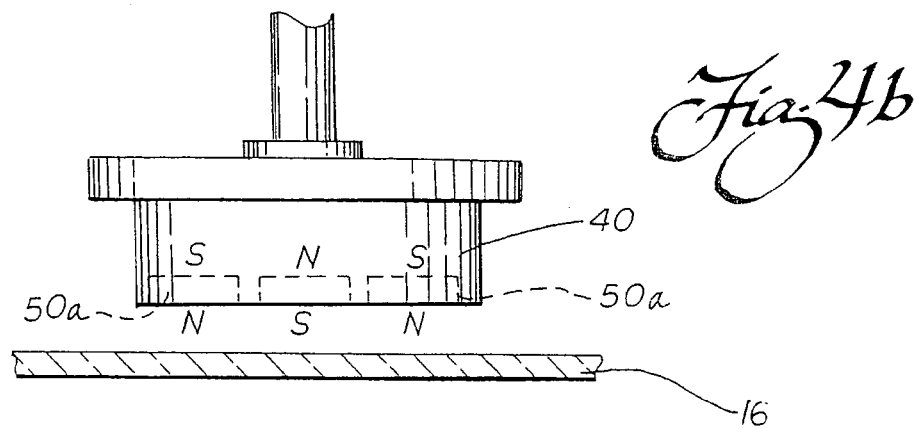
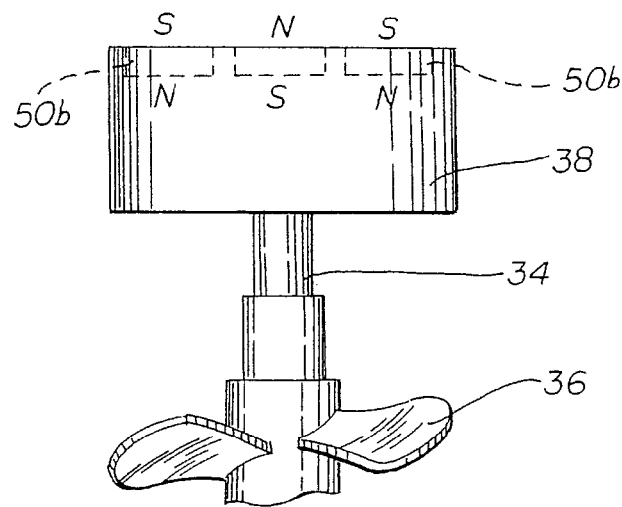
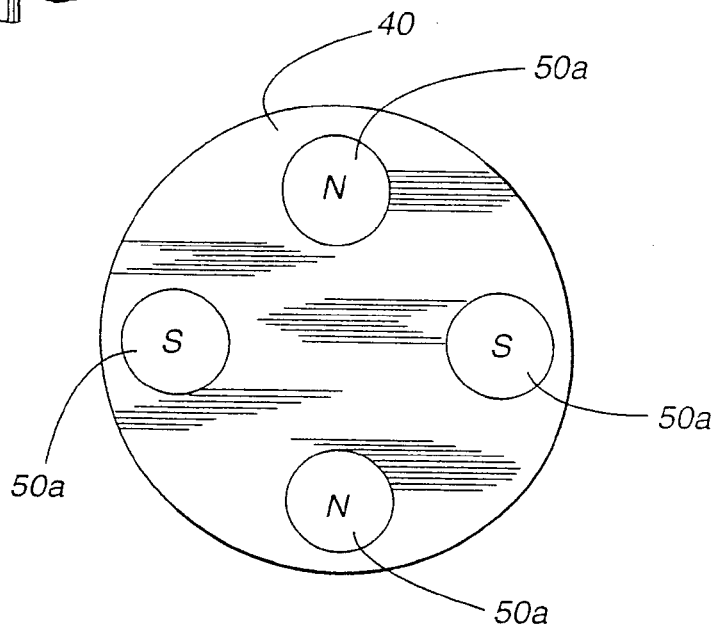
Fig. 4b
Fig. 4a

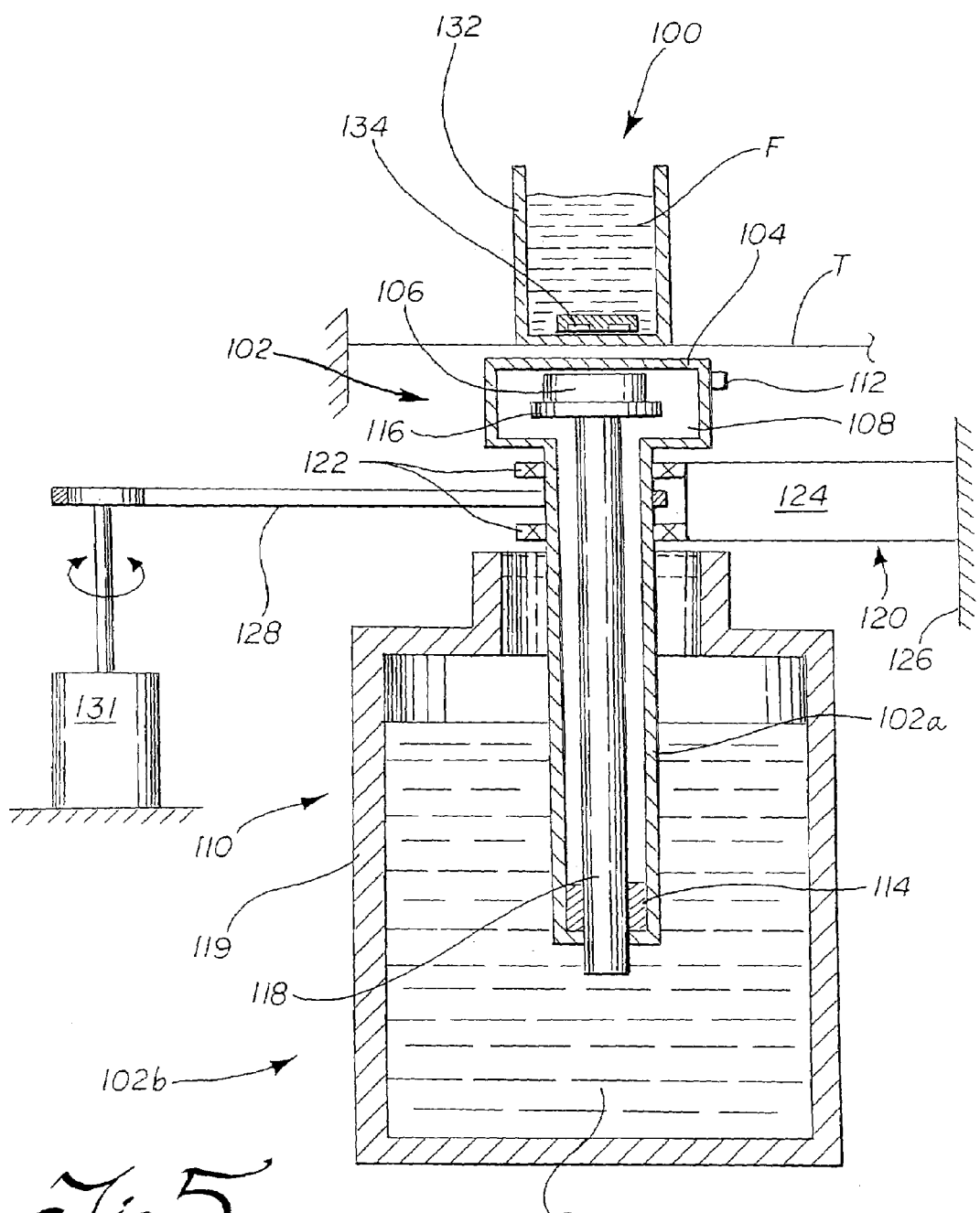

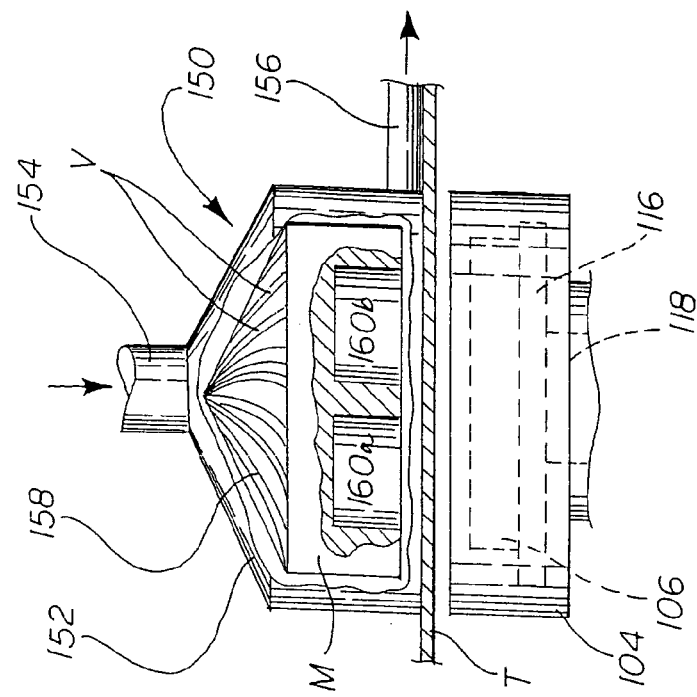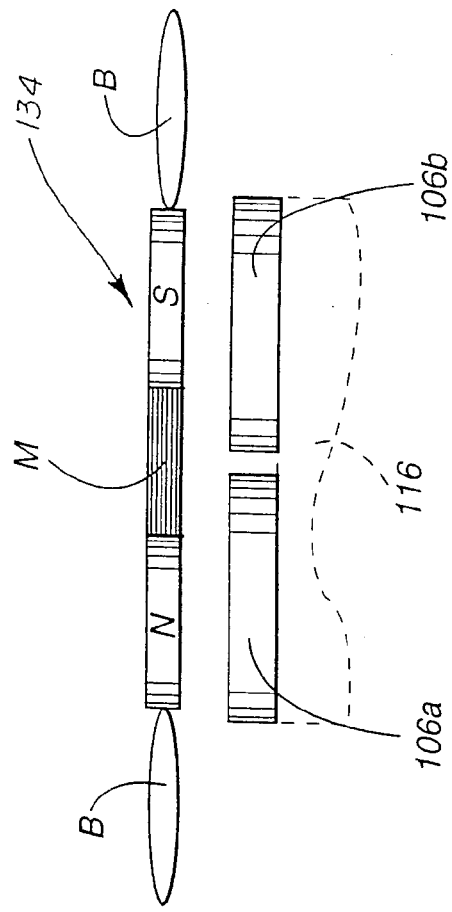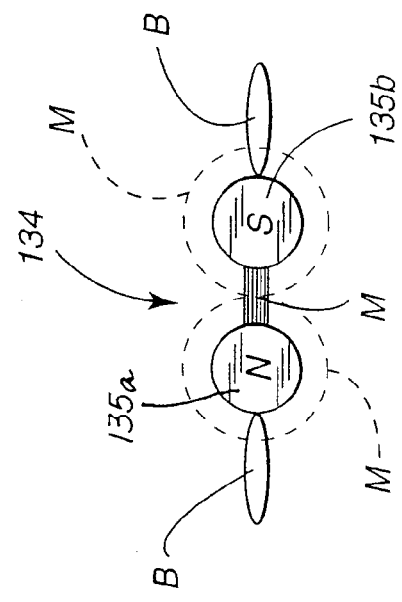

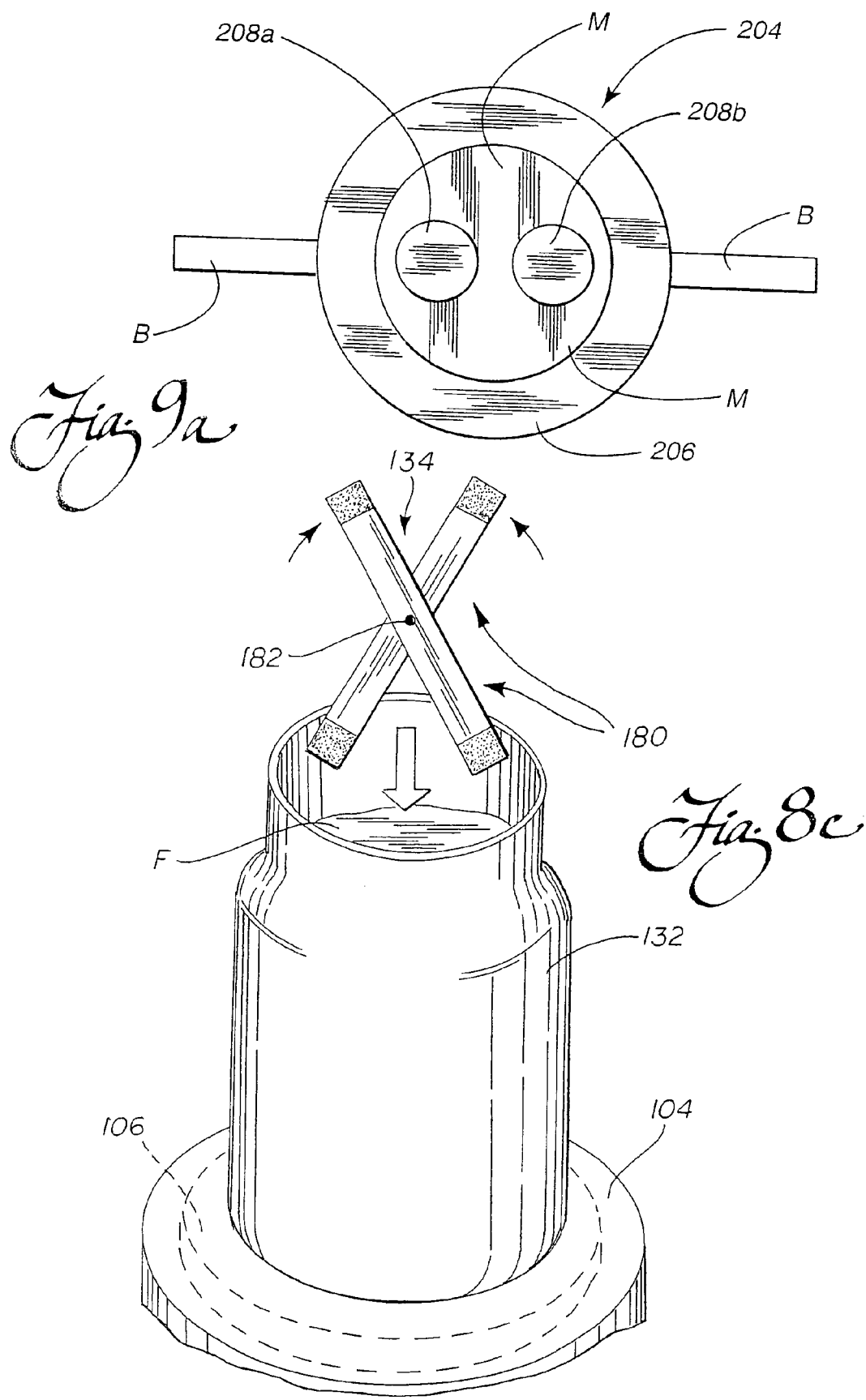

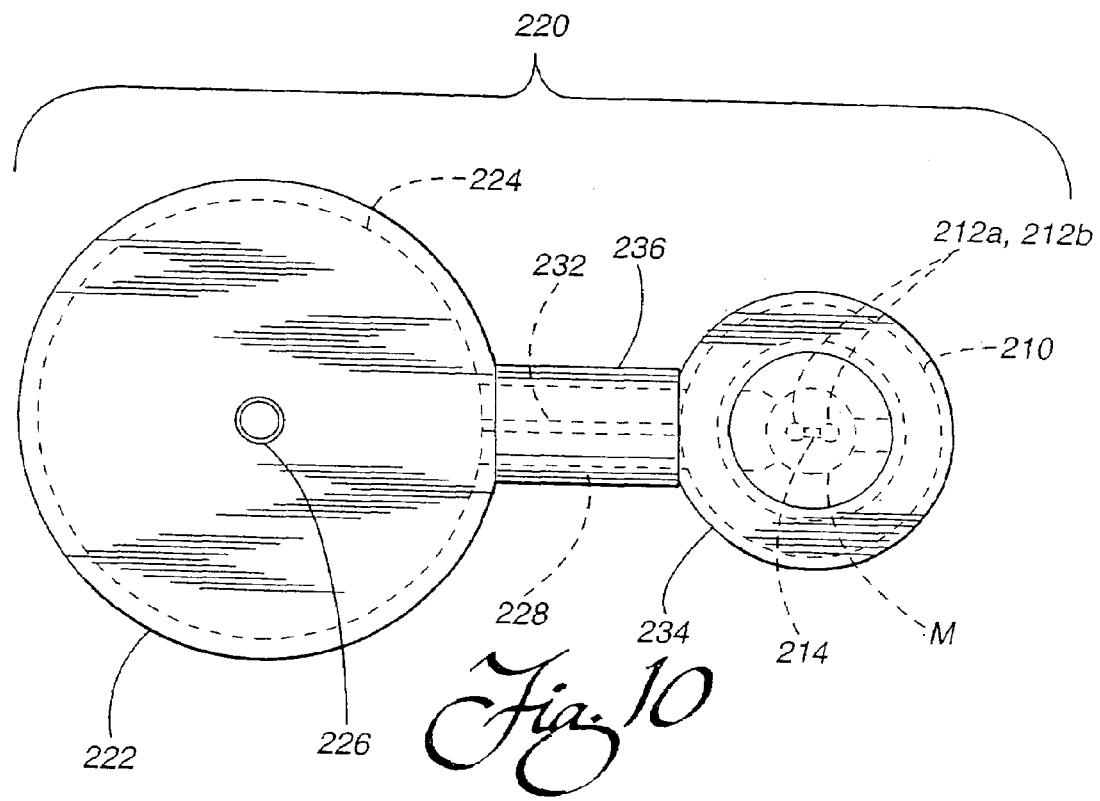
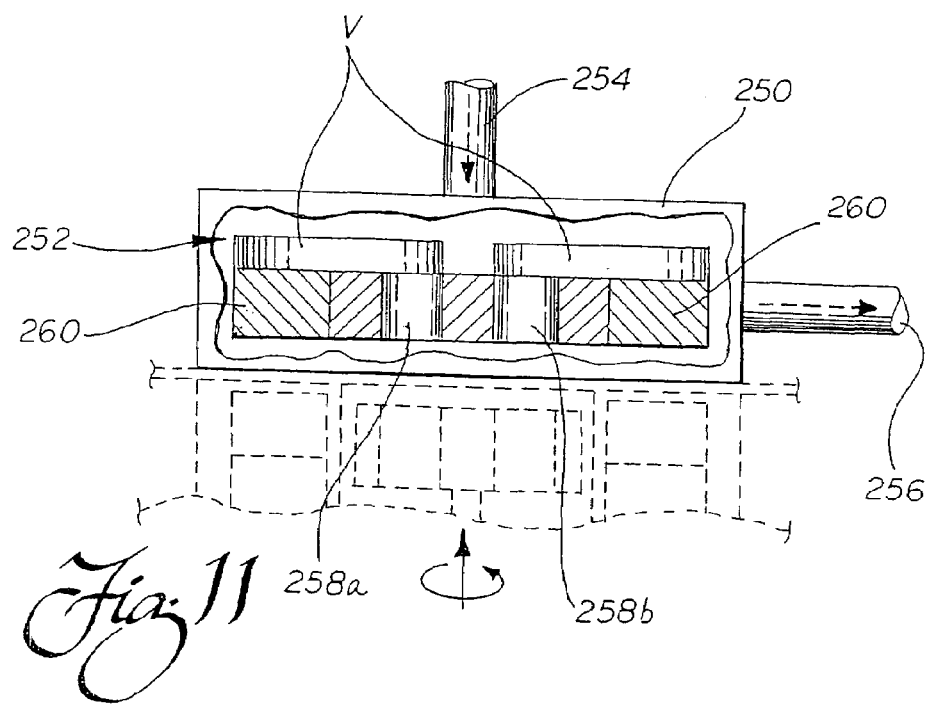

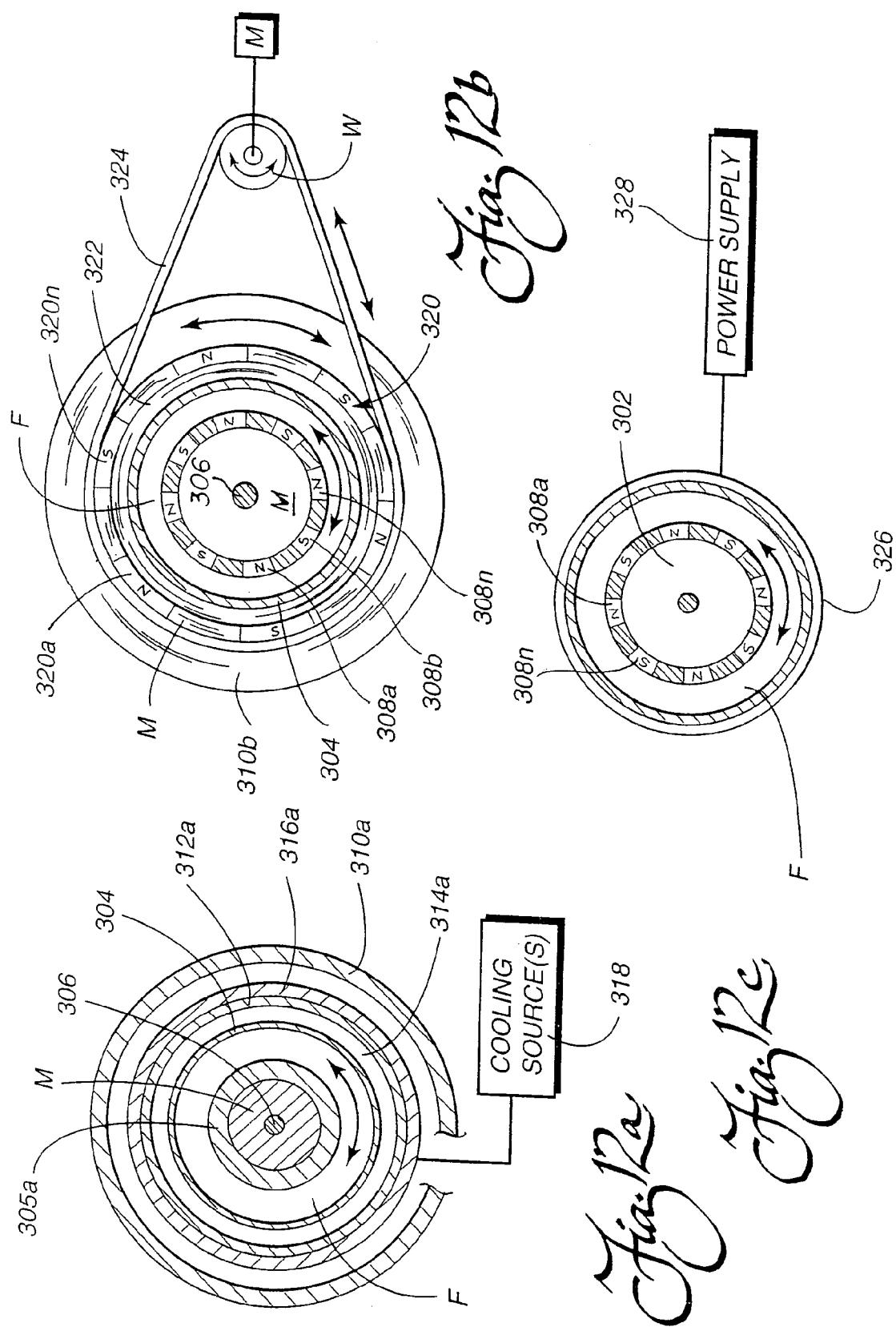

SYSTEMS USING A LEVITATING, ROTATING PUMPING OR MIXING ELEMENT AND RELATED METHODS

This application is: (1) a continuation of Ser. No. 10/398,946, filed Apr. 8, 2003 which is the national stage of PCT/US01/31459, filed Oct. 9, 2001, now U.S. Pat. No. 7,086,778 which claims the benefit of the following U.S. Provisional Patent Applications: (a) Ser. No. 60/239,187, filed Oct. 9, 2000; (b) Ser. No. 60/282,927, filed Apr. 10, 2001; and (c) Ser. No. 60/318,579, filed Sep. 11, 2001; and (2) a continuation-in-part of Ser. No. 10/491,512, filed Apr. 1, 2004 which is the national stage of PCT/US02/31478, filed Oct. 2, 2002, which claims the benefit of U.S. Provisional Patent Application Ser. No. 60/326,833, filed Oct. 3, 2001. The disclosures of the foregoing applications are all incorporated herein by reference.

TECHNICAL FIELD

The present invention relates generally to the mixing arts and, more particularly, to a system, related components, and related method for pumping or mixing fluids using a rotatable magnetic element levitated in a vessel.

BACKGROUND OF THE INVENTION

Most pharmaceutical solutions and suspensions manufactured on an industrial scale require highly controlled, thorough mixing to achieve a satisfactory yield and ensure a uniform distribution of ingredients in the final product. Agitator tanks are frequently used to complete the mixing process, but a better degree of mixing is normally achieved by using a mechanical stirrer or impeller (e.g., a set of mixing blades attached to a metal rod). Typically, the mechanical stirrer or impeller is simply lowered into the fluid through an opening in the top of the vessel and rotated by an external motor to create the desired mixing action.

One significant limitation or shortcoming of such an arrangement is the danger of contamination or leakage during mixing. The rod carrying the mixing blades or impeller is typically introduced into the vessel through a dynamic seal or bearing. This opening provides an opportunity for bacteria or other contaminants to enter, which of course can lead to the degradation of the product. A corresponding danger of environmental contamination exists in applications involving hazardous or toxic fluids, or suspensions of pathogenic organisms, since dynamic seals or bearings are prone to leakage. Cleanup and sterilization are also made difficult by the dynamic bearings or seals, since these structures typically include folds and crevices that are difficult to reach. Since these problems are faced by all manufacturers of sterile solutions, pharmaceuticals, or the like, the U.S. Food and Drug Administration (FDA) has consequently promulgated strict processing requirements for such fluids, and especially those slated for intravenous use.

Recently, there has also been an extraordinary increase in the use of biosynthetic pathways in the production of pharmaceutical materials, but problems plague those involved in this rapidly advancing industry. The primary problem is that suspensions of genetically altered bacterial cells frequently used to produce protein pharmaceuticals (insulin is a well-known example) require gentle mixing to circulate nutrients. If overly vigorous mixing or contact between the impeller and the vessel wall occurs, the resultant forces and shear stresses may damage or destroy a significant fraction of the cells, as well as protein molecules that are sensitive to shear stresses. This not only reduces the beneficial yield of the process, but also creates deleterious debris in the fluid suspension that requires further processing to remove.

In an effort to overcome this problem, others have proposed alternative mixing technologies. The most common proposal for stirring fluids under sterile conditions is to use a rotating, permanent magnet bar covered by an inert layer of TEFLON, glass, or the like. The magnetic bar is placed on the bottom of the agitator vessel and rotated by a driving magnet positioned external to the vessel. Of course, the use of such an externally driven magnetic bar avoids the need for a dynamic bearing, seal or other opening in the vessel to transfer the rotational force from the driving magnet to the stirring magnet. Therefore, a completely enclosed system is provided. This of course prevents leakage and the potential for contamination created by hazardous materials (e.g., cytotoxic agents, solvents with low flash points, blood products, etc.), eases clean up, and allows for the desirable sterile interior environment to be maintained. However, several well-recognized drawbacks are associated with this mixing technology, making it unacceptable for use in many applications. For example, the driving magnet produces not only torque on the stirring magnetic bar, but also an attractive axial thrust force tending to drive the bar into contact with the bottom wall of the vessel. This of course generates substantial friction at the interface between the bar and the bottom wall of the vessel. This uncontrolled friction generates unwanted heat and may also introduce an undesirable shear stress in the fluid. Consequently, fragile biological molecules, such as proteins and living cells that are highly sensitive to temperature and shear stress, are easily damaged during the mixing process, and the resultant debris may contaminate the product. Moreover, the magnetic bar stirrer may not generate the level of circulation provided by an impeller, and thus cannot be scaled up to provide effective mixing throughout the entire volume of large agitation tanks of the type preferred in commercial production operations.

In yet another effort to eliminate the need for dynamic bearings or shaft seals, some have proposed mixing vessels having external magnets that remotely couple the mixing impeller to a motor located externally to the vessel. A typical magnetic coupler comprises a drive magnet attached to the motor and a stirring magnet carrying an impeller. Similar to the magnetic bar technology described above, the driver and stirrer magnets are kept in close proximity to ensure that the coupling between the two is strong enough to provide sufficient torque. An example of one such proposal is found in U.S. Pat. No. 5,470,152 to Rains.

As described above, the high torque generated can drive the impeller into the walls of the vessel creating significant friction. By strategically positioning roller bearings inside the vessel, the effects of friction between the impeller and the vessel wall can be substantially reduced. Of course, high stresses at the interfaces between the ball bearings and the vessel wall or impeller result in a grinding of the mixing proteins and living cells, and loss of yield. Further, the bearings may be sensitive to corrosive reactions with water-based solutions and other media and will eventually deteriorate, resulting in frictional losses that slow the impeller, reduce the mixing action, and eventually also lead to undesirable contamination of the product. Mechanical bearings also add to the cleanup problems.

In an effort to address and overcome the limitations described above, still others have proposed levitated pumping or mixing elements designed to reduce the deleterious effects of friction resulting from magnetically coupled mixers. By using a specially configured magnetic coupler to maintain only a repulsive levitation force in the vertical direction, the large thrust force between the stirring and driving magnets can be eliminated, along with the resultant shear stress and frictional heating. An example of one such arrangement is shown in U.S. Pat. No. 5,478,149 to Quigg.

However, one limitation remaining from this approach is that only magnet-magnet interactions provide the levitation. This leads to intrinsically unstable systems that produce the desired levitation in the vertical direction, but are unable to control side-to-side movement. As a result, external contact bearings in the form of bearing rings are necessary to laterally stabilize the impeller. Although this "partial" levitation reduces the friction between the impeller and the vessel walls, it does not totally eliminate the drawbacks of the magnetically coupled, roller bearing mixers previously mentioned.

In an attempt to eliminate the need for contact or other types of mechanical roller bearings, complex feedback control has been proposed to stabilize the impeller. Typical arrangements use electromagnets positioned alongside the levitating magnet. However, the high power level required to attain only sub-millimeter separations between the levitating magnet and the stabilizing magnets constitutes a major disadvantage of this approach. Furthermore, this solution is quite complex, since the stabilizing magnets must be actively monitored and precisely controlled by complex computer-implemented software routines to achieve even a moderate degree of stability. As a consequence of this complexity and the associated maintenance expense, this ostensible solution has not been accepted in the commercial arena, and it is doubtful that it can be successfully scaled up for use in mixing industrial or commercial scale process volumes.

Thus, a need is identified for a system having a magnetic element for pumping or mixing fluids, and especially ultra-pure, hazardous, or delicate fluid solutions or suspensions, including those which may be processed in vessels capable of withstanding high pressurization. The system would preferably employ a magnetic element capable of pumping or mixing a fluid that levitates in a stable fashion in the vessel to avoid contact with the bottom or side walls thereof when in use. No mixing rod or other structure penetrating the mixing vessel would be required, which of course eliminates the need for dynamic bearings or seals and all potentially deleterious effects associated therewith. Also, the use of a levitating magnetic element would eliminate the need for mechanical bearings or the deleterious magnet-wall interactions that create undesirable shear stresses and unwanted friction in the fluid. Since penetration is unnecessary, the vessel could be completely sealed prior to mixing, and possibly even pressurized. This would reduce the chance for external exposure in the case of hazardous or biological fluids, such as blood or the like, or contamination, in the case of biologically active or sensitive products. The vessel and pumping or mixing element could also possibly be made of disposable materials, such as inexpensive, flexible plastic materials, and discarded after each use to eliminate the need for cleaning or sterilization.

SUMMARY OF THE INVENTION

In accordance with a first aspect of the invention, a mixing tank assembly is described. The mixing tank assembly comprises a side wall having an interior surface at least partially bounding a chamber; a floor disposed within or at the base of the chamber, the floor having an opening extending therethrough; a collapsible container disposed within the chamber so as to rest on the floor, the collapsible container bounding a compartment; a mixer disposed within the compartment of the container; and a shaft having a first end for receiving the mixer and an opposing second end extending down through the opening in the floor.

In one embodiment, the collapsible container comprises a flexible bag. Preferably, the shaft projects through an aperture in the sidewall of the flexible bag, and further including a seal for sealing the shaft to the bag to prevent leakage. The seal may be formed by a tie surrounding the shaft.

In accordance with another aspect of the invention, a mixing tank assembly comprises a first container including a lower portion having an opening and a second, collapsible container disposed within the first container so as to rest on the floor. A mixer is disposed within the second, collapsible container, and a shaft has a first end for receiving the mixer and an opposing second end extending through the opening.

In one embodiment, the lower portion is the floor of the first container. In another embodiment, the lower portion is the sidewall of the first container. Preferably, the second end of the shaft is inserted into a motive device, and the collapsible container comprises a flexible bag. In such case, the shaft projects through an aperture in the sidewall of the flexible bag, and further including a seal for sealing the shaft to the bag. The seal may be formed by a tie surrounding the shaft.

In accordance with a third aspect of the invention, a mixing tank assembly comprises a support structure and a collapsible container resting on the support structure. A mixer is disposed within the collapsible container. A shaft having a first end projects from a lower portion of the collapsible container for receiving the mixer.

In one embodiment, the shaft is connected to the collapsible container, which may be a flexible bag. In another embodiment, the shaft is movable relative to the collapsible container. Preferably, the collapsible container surrounds the shaft, and the support structure comprises a generally planar surface for supporting the collapsible container. The support structure may include an opening through which a second end of the shaft extends. Still more preferably, the support structure comprises a container having a side wall with an interior surface at least partially bounding a chamber for receiving the collapsible container, said container further including a floor disposed within or at the base of the chamber, the floor having an opening extending therethrough. The shaft may project through an aperture in the sidewall of the flexible bag, and further including a seal for sealing the shaft to the bag. Preferably, the seal is formed by a tie surrounding the shaft.

In accordance with another aspect of the invention, a method of forming a mixing tank assembly is described. The method comprises positioning a first collapsible container bounding a compartment so as to rest within a second container having an opening extending through a lower portion thereof. The method further includes the step of disposing a mixer within the compartment of the first container, as well as inserting a shaft through the opening in the second container and into the compartment of the first container. The method still further includes the step of positioning the mixer on a first end of the shaft.

In one embodiment, the method further includes the step of forming a seal with the shaft to prevent leakage from the collapsible container. In this or another embodiment, the second end of the shaft passes through the opening. In such case, the method may further include the step of inserting the second end of the shaft into a motive device.

BRIEF DESCRIPTION OF THE DRAWINGS

The accompanying drawings incorporated in and forming a part of the specification illustrate several aspects of the present invention and, together with the description, assist in explaining the principles of the invention. In the drawings:

FIG. 4a is a bottom view of the drive magnet used in situations where exceptional rotational stability of the pumping or mixing element of the preferred embodiment is required;

FIG. 4b is a partially cross-sectional, partially cutaway side view of the system showing the drive magnet of FIG. 4a magnetically coupled to a similarly constructed second permanent magnet forming a part of the pumping or mixing element;

FIG. 5 is a partially cross-sectional, partially schematic side view of a second possible embodiment of a pumping or mixing system using a pumping or mixing element levitated by a thermally isolated cold superconducting element wherein the motive force for rotating the pumping or mixing element in the vessel is provided by rotating the superconducting element itself;

FIG. 6a is a top schematic view of one possible arrangement of the levitating pumping or mixing element that may be driven by a rotating superconducting element;

FIG. 6b shows the pumping or mixing element of FIG. 6a levitating above a rotating superconducting element formed of two component parts;

FIG. 7 is a partially cutaway, partially cross-sectional schematic side view of a vessel in the form of a centrifugal pumping head, including a levitating, rotating pumping or mixing element for pumping fluid from the inlet to the outlet of the centrifugal pumping head;

FIG. 8c illustrates the pumping or mixing element of FIG. 8b in a partially folded state for insertion in the narrow opening of a vessel or container;

FIG. 9a is a top or bottom view of one possible embodiment of a pumping or mixing element for use in the system of FIG. 9;

FIG. 10 is a top view of a most preferred version of a cryostat for use with the pumping and mixing system of the embodiment of FIG. 9;

FIG. 11 is a partially cutaway, partially cross-sectional side schematic view of a centrifugal pumping head for use with the system of FIG. 9;

FIG. 12a is a cross-sectional view taken along line 12a-12a of FIG. 12;

FIG. 12b is a cross-sectional view taken along line 12b-12b of FIG. 12;

FIG. 12c is a cross-sectional view of the embodiment of FIG. 12, but wherein the motive device is in the form of a winding around the vessel for receiving an electrical current that creates an electrical field and causes the pumping or mixing element to rotate;

DETAILED DESCRIPTION OF THE INVENTION

Figure 1:
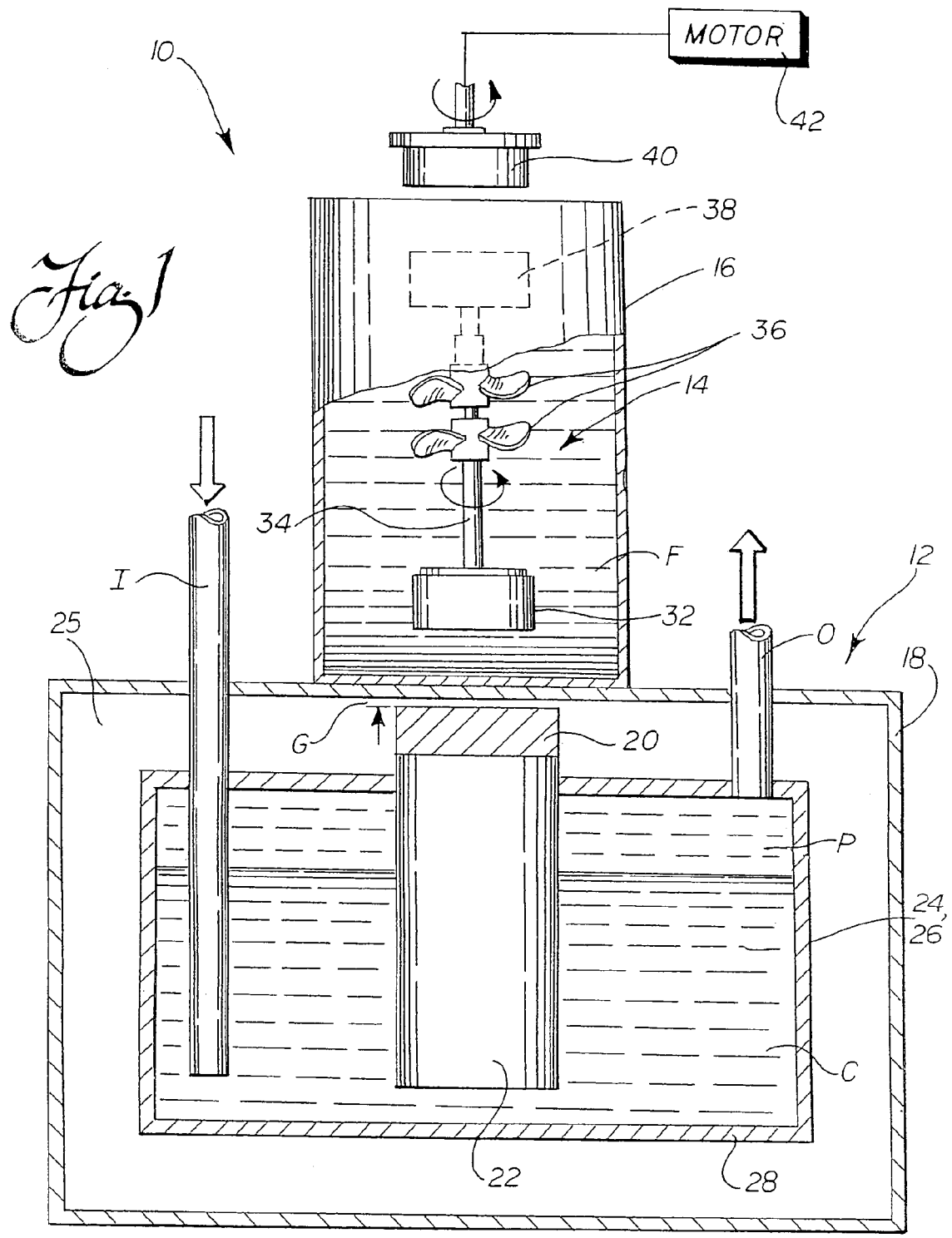
FIG. 1 is a partially cross-sectional, partially cutaway, partially schematic view of one embodiment of the system of the present invention wherein the levitating pumping or mixing element is rotated by an external drive or driving magnet to mix a fluid in a vessel and the cooling source is a separate cooling chamber defined by the outer wall of a cryostat holding a cryogen.

Reference is now made to FIG. 1, which shows a first possible embodiment of the mixing or pumping system 10 of the present invention. In this embodiment, a cryostat 12 is used to hold the cooling source for the superconducting element that produces the desired levitation in a pumping or mixing element 14. This element 14 is placed in a vessel 16 positioned external to the cryostat 12. The vessel 16 may already contain a fluid F or may be filled after the pumping or mixing element 14 is in place. It should be appreciated at the outset that the term "fluid" is used herein to denote any substance that is capable of flowing, as may include fluid suspensions, gases, gaseous suspensions, or the like, without limitation. The vessel 16 for holding the fluid is shown as being cylindrical in shape and may have an open top. Alternatively, it may be completely sealed from the ambient environment to avoid the potential for fluid contamination or leakage during mixing, or adapted to pump the fluid F from an inlet to an outlet in the vessel 16 (see FIG. 2). In any case, the vessel 16 may be fabricated of any material suitable for containing fluids, including glass, plastic, metal, or the like. Of course, the use of lightweight plastic or other high density polymers is particularly desirable if the vessel 16 is going to be discarded after mixing or pumping is complete, as set forth in more detail in the description that follows.

As illustrated in FIG. 1, the vessel 16 rests atop the outer wall 18 of the cryostat 12. Preferably, this outer wall 18 is fabricated of non-magnetic stainless steel, but the use of other materials is of course possible, as long as the ability of the pumping or mixing element 14 to levitate and rotate remains substantially unaffected. Positioned inside of and juxtaposed to this wall 18 is a superconducting element 20. The superconducting element 20 is supported by a rod 22 that serves as the thermal link to a cooling source 24. The outer wall 18 of the cryostat 12 thus defines a chamber 25 that is preferably evacuated to thermally isolate the cold superconducting element 20 from the relatively warm vessel 16, pumping or mixing element 14, and fluid F. Positioning of the superconducting element 20 in this vacuum chamber 25 may be possible by virtue of the thermal link provided by the rod 22. The thermal isolation and separation provided by the chamber 25 allows for the superconducting element 20 to be placed in very close proximity to the outer wall 18 without affecting its temperature, or the temperature of the vessel 16. This allows the separation distance from the superconducting element 20 to the inner surface of the wall 18 to be narrowed significantly, such that in the preferred embodiment, the gap G between the two is preferably under 10 millimeters, and can be as narrow as approximately 0.01 millimeters. This substantial reduction in the separation distance enhances the levitational stability, magnetic stiffness, and loading capacity of the pumping or mixing element 14.

In this first illustrated embodiment, the cooling source 24 is a separate, substantially contained cooling chamber 26 holding a cryogen C, such as liquid nitrogen. The chamber 26 is defined by an outer wall 28 that is substantially thermally separated from the outer wall 18 of the cryostat 12 to minimize heat transfer. An inlet I is provided through this wall 28 for introducing the cryogen into the cooling chamber 26. To permit any vapor P to escape from the chamber 26 as the cryogen C warms, an exhaust outlet O is also provided (see action arrows in FIG. 1 also designating the inlet and outlet). In the illustrated embodiment, the inlet I and outlet O lines may formed of a material having a low thermal conductivity, such as an elongate, thin walled tube formed of non-magnetic stainless steel, and are sealed or welded in place to suspend the cooling chamber 26 in the cryostat 12. As should be appreciated by one of ordinary skill in the art, the use of a thin walled tube formed of a material having a low thermal conductivity, such as stainless steel, results in a negligible amount of thermal transfer from the inlet or outlet to the wall 18. The sealing or welding method employed should allow for the chamber 25 to be maintained in an evacuated state, if desired. Despite this illustration of one possible support arrangement, it should be appreciated that the use of any other support arrangement that minimizes thermal transfer between the cooling chamber 26 and the cryostat wall or other housing 18 is also possible (see, e.g., my '672 patent).

The rod 22 serving as the thermal link between the cooling source 24 and the superconducting element 20 may be cylindrical and may extend through the outer wall 28 of the cooling chamber 26. The entire surface area of the superconducting element 20 should contact the upper surface of the cylindrical rod 22 to ensure that thermal transfer is maximized. The rod 22 may be formed of materials having low thermal resistance/high thermal conductance, such as brass, copper, or aluminum.

As should be appreciated from viewing FIG. 1, and as briefly noted in the foregoing description, the combination of the outer wall 18 and the inner cooling chamber 26 in this first embodiment defines the chamber 25 around the superconducting element 20. Preferably, this chamber 25 is evacuated to minimize heat transfer from the cooling chamber walls 28 and the superconducting element 20 to the outer wall 18 of the cryostat 12. The evacuation pressure is preferably at least $10^{-3}$ torr, and most preferably on the order of $10^{-5}$ torr, but of course may vary depending upon the requirements of a particular application. The important factor is that thermal transfer from the cooling source 24, which in this case is the cooling chamber 26 holding a cryogen C, and the superconducting element 20 to the outer wall 18 is minimized to avoid cooling the vessel 16 or fluid F held therein. Although a vacuum chamber 25 is proposed as one preferred manner of minimizing this thermal transfer, the use of other means to provide the desired thermal isolation is possible, such as by placing insulating materials or the like in the chamber 25.

As is known in the art, by cooling the superconducting element 20 in the presence of a magnetic field, it becomes capable of distributing the current induced by a permanent magnet such that the magnet levitates a certain distance above the superconducting element, depending primarily upon the intensity and the direction of the magnetic field generated by the levitating magnet. Although basically a repulsive force is created, the peculiar nature of the pinning forces generated actually tie the levitating magnet to the superconducting element as if the two were connected by an invisible spring. As should be appreciated, this form of attachment cannot be achieved in conventional levitation schemes for pumping or mixing elements that employ two opposed permanent magnets that merely repel each other, since no pinning forces act to tie the two magnets together, while at the same time provide a balancing repulsive force.

In the preferred embodiment of the present system 10, the element 20 providing the superconductive effects is a "high temperature" or "type II" superconductor. Most preferably, the superconducting element 20 is formed of a relatively thin cylindrical pellet of melt-textured Yttrium-Barium Copper Oxide (YBCO) that, upon being cooled to a temperature of approximately 77-78 Kelvin using a cooling source 24, such as the illustrated liquid nitrogen chamber 26, exhibits the desired levitational properties in a permanent magnet. Of course, the use of other known superconducting materials having higher or lower operating temperatures is also possible, and my prior U.S. Pat. No. 5,567,672 is incorporated herein by reference for, among other things, the other high-temperature superconducting materials referenced therein.

The pumping or mixing element 14 in the preferred embodiment includes a first permanent magnet 32 for positioning in the vessel 16 adjacent to the superconducting element 20 such that it levitates in the fluid F. Although the polarity of this first magnet 32 is not critical to creating the desired levitation, the magnet 32 is preferably disk-shaped and polarized in the vertical direction. This ensures that a symmetrical magnetic field is created by the magnet 32 and stable levitation results above the superconducting element 20, while at the same time free rotation relative to the vertical axis is possible.

In a version of the pumping or mixing element 14 particularly adapted for use in relatively deep fluid vessels, a support shaft 34 is connected to and extends vertically from the first permanent magnet 32. Along the shaft 34, at least one, and preferably two, impellers 36 are carried that serve to provide the desired pumping, or in the case of FIG. 1, mixing action when the pumping or mixing element 14 is rotated. Rotation of the levitating pumping or mixing element 14 in the vessel 16 is achieved by a magnetic coupling formed between a second permanent magnet 38 (shown in dashed line outline in FIG. 1, but see also FIG. 2) and a drive magnet 40 positioned externally of the vessel 16. The drive magnet 40 is rotated by a drive means, such as an electric motor 42 or the like, and the magnetic coupling formed with the second permanent magnet 38 serves to transmit the driving torque to the pumping or mixing element 14 to provide the desired pumping or mixing action. The direction of rotation is indicated by the action arrows shown in FIGS. 1 and 2 as being in the counterclockwise direction, but it should be appreciated that this direction is easily reversed by simply reversing the direction in which the drive magnet 40 is rotated.

In operation, and in practicing one possible method of pumping or mixing a fluid disclosed herein, the vessel 16 containing the fluid F and pumping or mixing element 14 are together placed external to the wall 18 of the cryostat 12 adjacent to the superconducting element 20, which is placed in the evacuated or insulated chamber 25. When the first disk-shaped permanent magnet 32 is brought into the proximity of the superconducting element 20, the symmetrical magnetic field generated causes the entire pumping or mixing element 14 to levitate in a stable fashion above the bottom wall of the vessel 16. This levitation brings the second permanent magnet 38 into engagement with the drive magnet 40 to form the desired magnetic coupling. In addition to transmitting the driving torque, this magnetic coupling also serves to stabilize rotation of the pumping or mixing element 14. The motor 42 or other motive device is then activated to cause the drive magnet 40 to rotate, which in turn induces a steady, stable rotation in the pumping or mixing element 14. Rotating impellers 36 then serve to mix or pump the fluid F in a gentle, yet thorough fashion.

Since the pumping or mixing element 14 fully levitates and can be completely submerged in the fluid, the need for mixing or stirring rods penetrating through the vessel 16 in any fashion is eliminated. The concomitant need for dynamic shaft seals or support bearings in the vessel walls is also eliminated. Deleterious friction is also not a concern. A related advantage is that the vessel 16 containing the fluid F and the pumping or mixing element 14 can be completely sealed from the outside environment before mixing to provide further assurances against leakage or contamination. Yet another related advantage discussed in detail below is that the vessel 16 and pumping or mixing element 14 can be formed of relatively inexpensive, disposable materials and simply discarded once mixing is complete. As should be appreciated, this advantageously eliminates the need for cleanup and sterilization of the pumping or mixing element 14 and vessel 16. Thus, by completely sealing a disposable vessel, such as a plastic container or flexible bag containing the pumping or mixing element and fluid prior to mixing, the entire assembly can simply be discarded once the fluid contents are recovered. This reduces the risk of exposure both during and after mixing in the case of hazardous fluids, and also serves to protect the fluid from contamination prior to or during the pumping or mixing operation.

Figure 2:
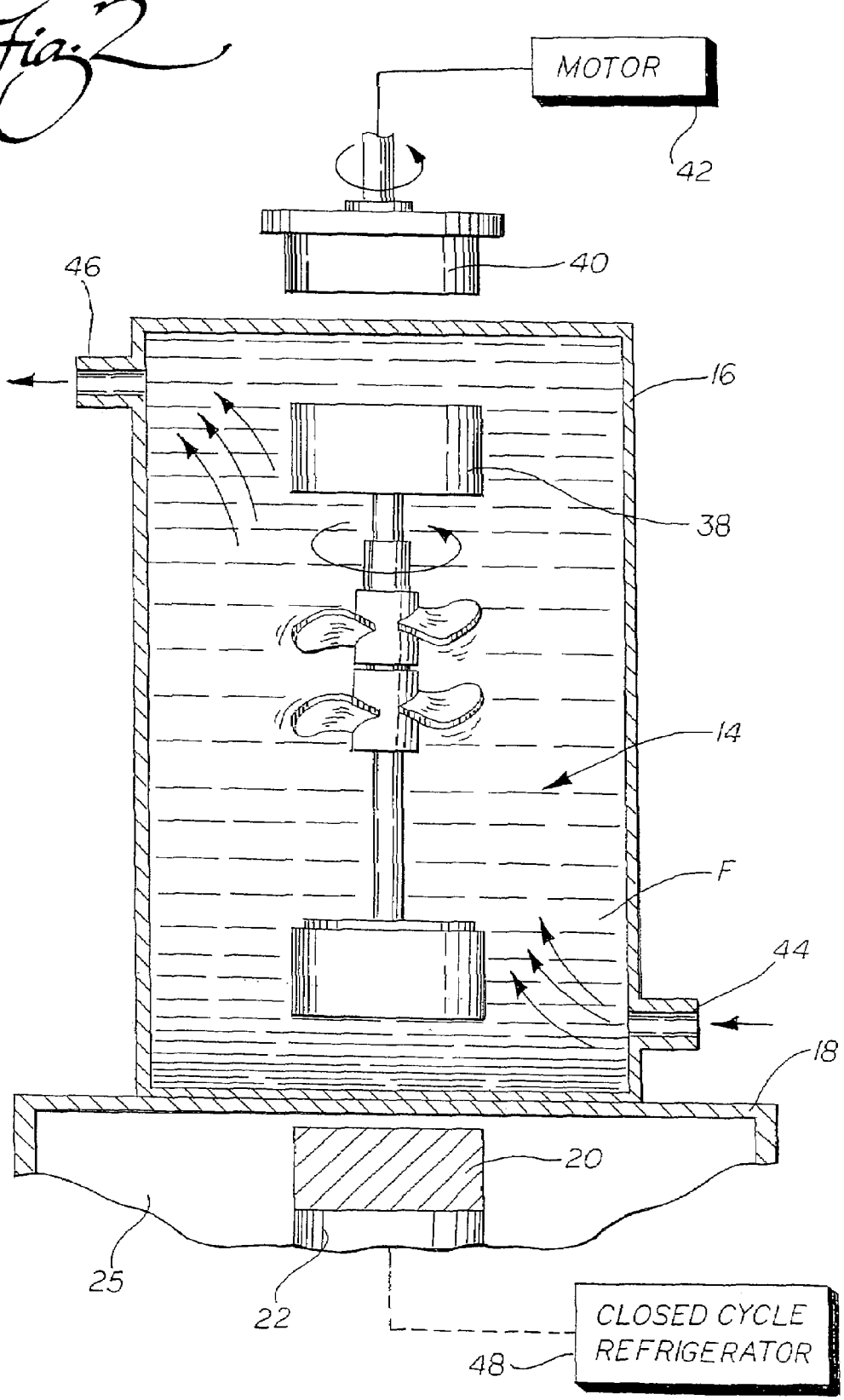
FIG. 2 is an enlarged cross-sectional, partially cutaway, partially schematic view of an embodiment wherein the rotating, levitating pumping or mixing element is used to pump a fluid through a vessel positioned adjacent to the housing for the superconducting element and the cooling source is a closed cycle refrigerator.

An alternative version of this first possible embodiment of the system 10 of the present invention particularly adapted for pumping a fluid F is shown in FIG. 2. In this version, the vessel 16 includes at least one fluid inlet 44 and at least one outlet 46. The pumping or mixing element 14 preferably carries rotating impellers 36 that serve to provide the desired pumping action by forcing fluid F from the inlet 44 to the outlet 46 (see action arrows). By increasing or decreasing the rotational speed of the motor 42 or other motive device, or adjusting the size, shape or style of the pumping or mixing element 14, impeller blades 36, or substituting a different design altogether, a precise level of pumping action may be provided.

Another possible modification shown in FIG. 2 is to use a closed cycle refrigerator 48 to provide the necessary cooling for the superconducting element 20 instead of a cryostat with a liquid cryogen as the cooling source. The refrigerator 48 can be positioned externally to a housing 18 containing the superconducting element 20, which may be the equivalent of the cryostat outer wall 18 previously described. As with the first embodiment, a chamber 25 is defined by the housing 18. This chamber 25 is preferably evacuated or filled with other insulating materials to minimize thermal transfer from the superconducting element 20 to the housing 18. However, since no cooling source 24 is contained within the housing 18, it is not actually a "cryostat" as that term is commonly defined. Nevertheless, the desired dual levels of thermal separation are still possible, and the concomitant advantages provided, since: (1) the cooling source 24, 48 is positioned away from the housing 18 and, thus, the vessel 16, pumping or mixing element 14, and fluid F; and (2) the housing 18 still separates and defines a chamber 25 that thermally isolates the superconducting element 20 and the vessel 16. In yet another alternate arrangement, the refrigerator 48 can be used as a primary cooling source, with the cryogenic chamber (not shown) serving as a secondary or "backup" cooling source in the event of a power outage or mechanical failure.

Figure 3:
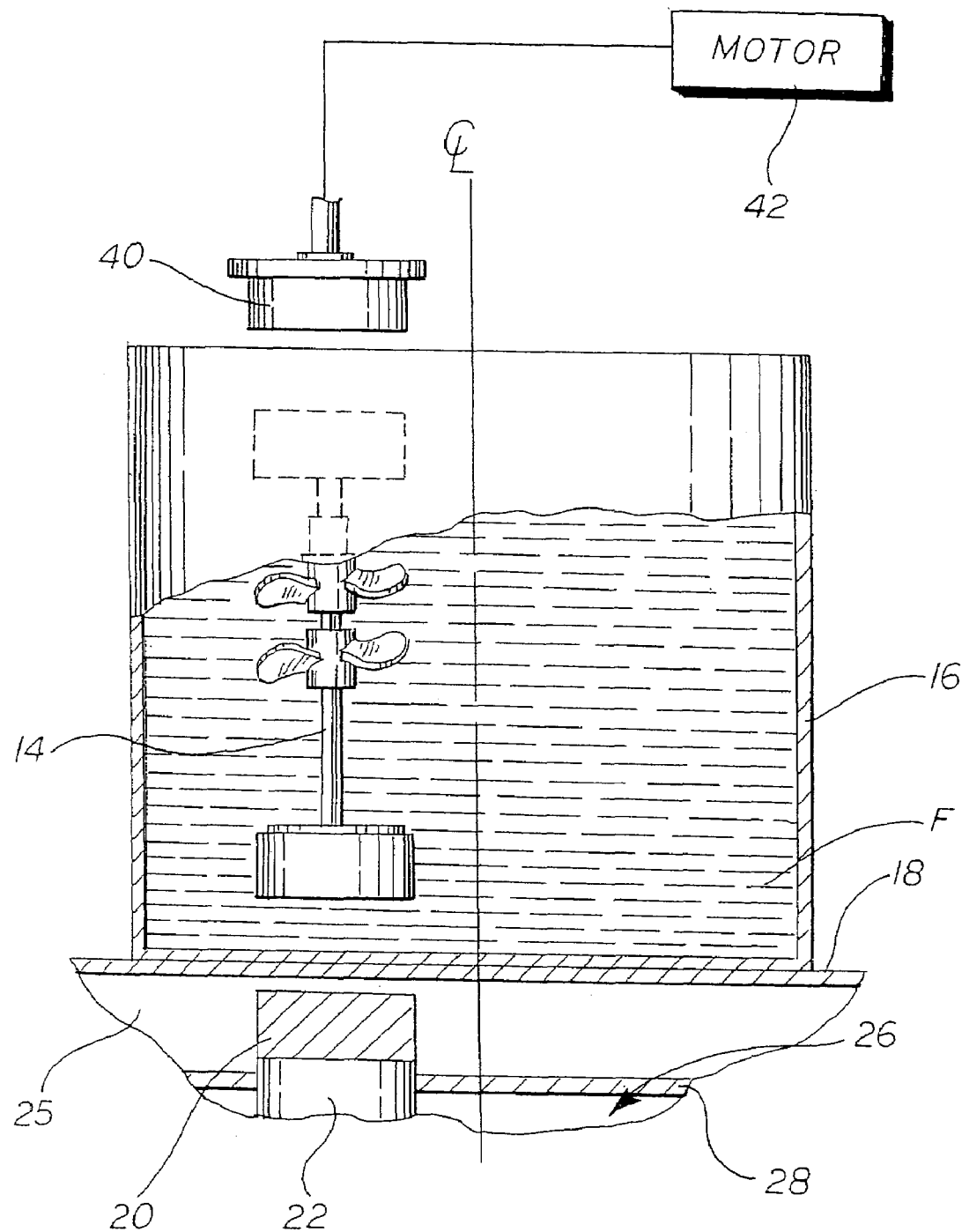
FIG. 3 is a partially cross-sectional, partially cutaway, partially schematic view of the system of the first embodiment wherein the superconducting element, vessel, pumping or mixing element, and drive magnet are axially aligned, but moved off-center relative to the vertical center axis of the vessel.

In accordance with another of the many important aspects of the present system 10, the absence of a mixing rod or other mechanical stirrer extending through a wall of the vessel 16 also allows for placement of the pumping or mixing element 14 at an off-axis position, as shown in FIG. 3. Specifically, the superconducting element 20, pumping or mixing element 14, and drive magnet 40 are all axially aligned away from the vertical center axis of the vessel 16. One particular advantage of using this approach is that the pumping or mixing element 14 may be rotated at a very low speed while the vessel 16 is also rotated about its center axis. This advantageously ensures that gentle, yet thorough mixing, is achieved, which is particularly advantageous for use with fluids that are sensitive to shear stress. As should be appreciated, this arrangement can be used both whether the vessel 16 is completely sealed, provided with an inlet 44 and an outlet 46 for pumping as shown in FIG. 2, or open to the ambient environment. For purposes of illustration only, FIG. 3 shows the cryostat 12 of the embodiment shown in FIG. 1 having an outer wall 18 and a cooling chamber 26 defined by a wall 28. However, it should be appreciated that use of the housing 18 and closed-cycle refrigerator 48 of the second embodiment of FIG. 2 as part of the "cryostat" is also possible with this arrangement.

Through experimentation, it has been discovered that when the pumping or mixing element 14 of the type described for use in this first possible embodiment is employed, providing the requisite degree of stability to ensure that all contact with the side walls of the container 16 is avoided may in some instances be a concern. Thus, to ensure that the pumping or mixing element 14 rotates with exceptional stability and such deleterious contact is completely avoided, the second permanent magnet 38 and the drive magnet 40 are each provided with at least two pairs, and preferably four pairs of cooperating sub-magnets 50a, 50b. As shown in FIGS. 4a and 4b, these magnets 50a, 50b have opposite polarities and thereby serve to attract each other and prevent the levitating pumping or mixing element 14 from moving from side-to-side to any substantial degree. However, the attractive force is counterbalanced by the combined spring-like attractive and repulsive levitational/pinning forces created between the first permanent magnet 32 and the superconducting element 20 when cooled. This avoids the potential for contact with the upper wall of the vessel 16, if present. Overall, the pumping or mixing element 14 is capable of exceptionally stable rotation using this arrangement, which further guards against the undesirable frictional heating or shear stress created if the rotating pumping or mixing element 14, or more particularly, the first and second permanent magnets 32, 38 or the blades of the impellers 36 could move into close proximity with the bottom or side walls of the vessel 16.

Figure 4C:
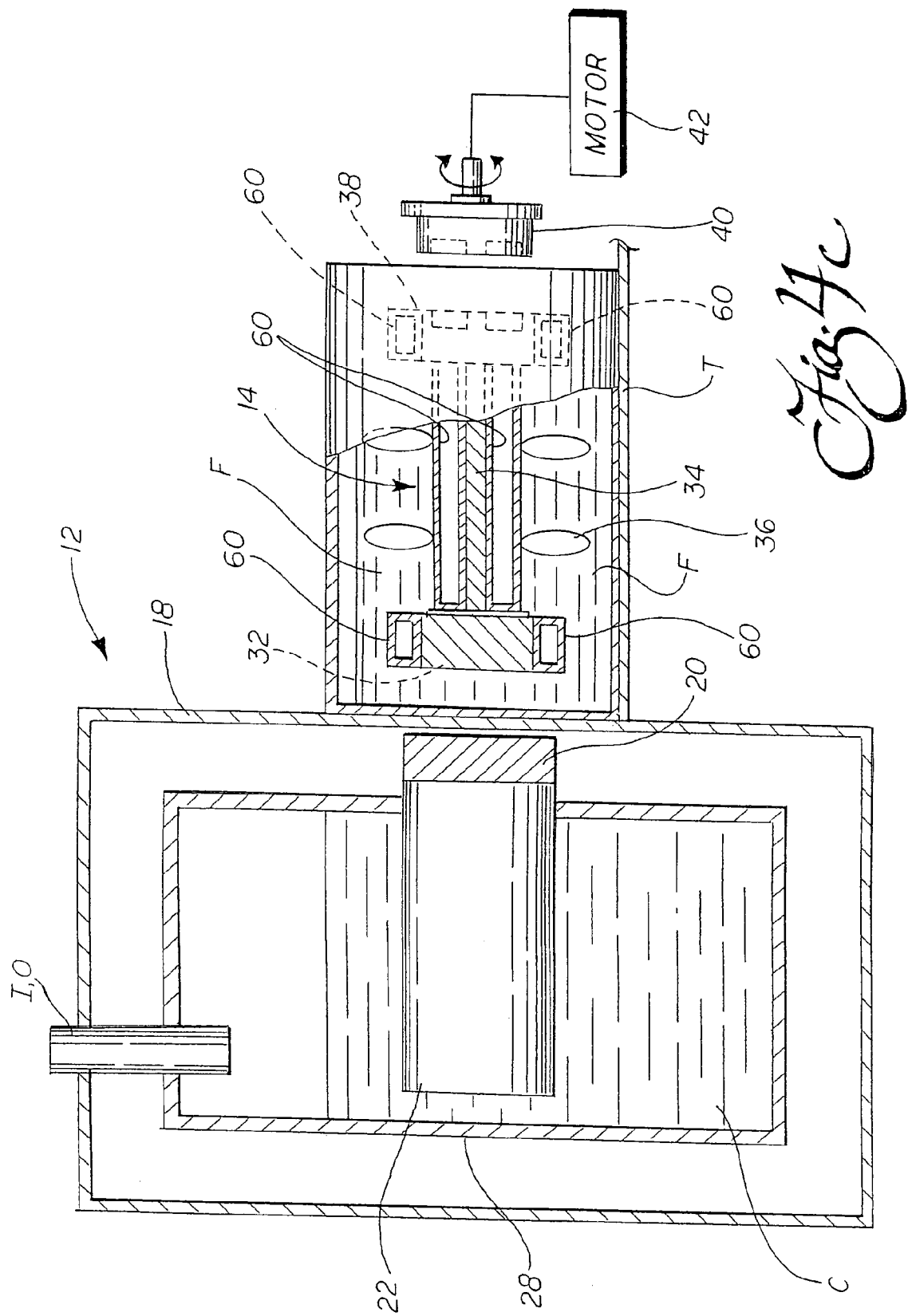
FIG. 4c is one possible embodiment of the pumping or mixing system including a pumping or mixing element having a chamber for holding a substance that is lighter than the surrounding fluid, such as air, that assists in levitating the pumping or mixing element.

As should be appreciated, it is possible to rearrange the components of the system 10 such that the levitation and driving forces are provided from other areas of the vessel, rather than from the top and bottom of the vessel. Thus, as shown in FIG. 4c, the cryostat 12 or other housing for containing the superconducting element 20 may be positioned adjacent to one side of the vessel 16, while the drive magnet 40 is positioned adjacent to the opposite side. In that case, the pumping or mixing element 14 may be turned on its side and supported by a separate stable support structure, such as a table T or the like. The vessel 14 is shown as being sealed, but it should be appreciated that any of the vessels disclosed herein may be employed instead, including even a straight or L-shaped pipe.

To assist in levitating the pumping or mixing element 14 in either the embodiment of FIG. 1 or 2 or the other embodiments disclosed herein, at least one, and preferably a plurality of chambers 60 are provided for containing a substance lighter than the surrounding fluid F. The chambers 60 may be provided adjacent to each magnet 32, 38 in the pumping or mixing element 14, as well as around the shaft 34, if desired. In the preferred embodiment where the fluid F is or has a specific gravity similar to that of water, the substance contained in the chambers 60 may be air. However, in more viscous fluids, such as those having a specific gravity more like glycerin, it may be possible to use lighter fluids, such as water, even lighter gases, or combinations thereof. These chambers 60 thus serve to assist in levitating the pumping or mixing element 14 by helping it "float" in the fluid F. However, the "pinning" force created by the superconducting element 20, plus the levitating and aligning force created between the second permanent magnet 38 and the driving magnet 40, both also serve to assist in keeping the pumping or mixing element 14 in the proper position as it rotates. In the case of disk or pancake shaped permanent first and second magnets 32, 38 and a cylindrical shaft 34, annular chambers 60 may be used. Instead of fluid or gas filled chambers, the use of other buoyant materials is also possible to provide the levitation-assist function.

As previously mentioned, one of the many advantages of the system 10 of the present invention is that, since the pumping or mixing element 14 levitates in the fluid F and no mixing or stirring rods are required for rotation, the vessel 16 can be completely sealed from the outside ambient environment. Thus, by forming the pumping or mixing element 14 and vessel 16 of relatively inexpensive or disposable materials, both can simply be discarded after mixing is completed and the fluid F is recovered. Of course, such disposable materials can also be used to form the vessel 16 designed for pumping fluids (FIG. 2), or to form the open-top container for mixing fluids to avoid the need for clean up or sterilization once the operation is complete.

It should also be appreciated that the pumping or mixing element 14 illustrated is an example of one preferred arrangement only, and that other possible configurations are possible. For instance, impeller blades are not required, since a smooth-walled, disk-shaped pumping or mixing element alone creates some gentle mixing action simply by rotating. If present, the blade or blades could simply be placed circumferentially around the disk-shaped first permanent magnet 32 to reduce the length of the shaft 34, or eliminate it altogether, especially if the vessel 16 has a relatively small vertical dimension. Instead of a bladed impeller assembly 36, the use of other structural arrangements is also possible, such as disk-shaped wheels having vanes or like structures designed to create more or less efficient rotation, and a concomitant increase in the desired mixing or pumping action when rotated. Depending on the depth of the vessel 16, the length of the shaft 34, if present, can also be increased or decreased as necessary. All components forming the pumping or mixing element in any embodiment described above may be coated with TEFLON or other inert materials to reduce the chances of contamination or corrosion, as well as to facilitate clean up, if required.

Of course, besides use in the mixing or pumping of small batches of fluid solutions or suspensions used during experimentation and research in the laboratory setting, all components are also easily scaled up for use in industrial or commercial pumping or mixing operation, such as those commonly used in the manufacture of large batches pharmaceuticals or food products. The stable, reliable levitation of the magnetic pumping or mixing element can still be readily achieved in systems of much greater capacity than the one shown for purposes of illustration in the drawings, thus making the present arrangement particularly well-suited for the commercial production of pharmaceuticals or any other solutions or suspensions that require gentle, yet thorough mixing during processing.

Experiments conducted to date have demonstrated the efficacy of the system 10 described above. The set-up utilized in conducting these experiments included a pumping or mixing element having axially aligned upper and lower magnets and an impeller assembly mounted on a vertically extending support shaft, as shown in FIG. 1. A cylindrical pellet of melt-textured $YBa_2Cu_3O_{7+x}$ having a diameter of 30 millimeters and a thickness of 25 millimeters was used as the superconducting element and placed in a cryostat having a configuration similar to the one shown in FIG. 1. The cryostat included a cooling chamber filled with approximately 1 liter of liquid nitrogen. A Nd—Fe—B permanent magnet with a surface field intensity of 0.4 Tesla was used as the lower, first permanent magnet.

Using this set-up, the experiments demonstrated that the desired exceptionally stable levitation of the pumping or mixing element above the top surface of the cryostat in a vessel filled with a relatively warm fluid was possible. A separation distance of up to seven millimeters was achieved, and the levitation was stable for up to five hours using just a liter of liquid nitrogen as the cryogen. In the first experiment using this set up, water was selected as a model low viscosity fluid. Rotational speeds of up to 600 rpm were achieved—this upper limit being defined by only the limited capabilities of the motor used to rotate the drive magnet in this experiment. No decoupling or instability in the pumping or mixing element was observed at any speed. In the case of glycerin, a model high viscosity fluid, a maximum rotational speed of 60 rpm was achieved before some decoupling of the pumping or mixing element was observed. To further demonstrate the mixing capabilities using the proposed system, SEPHADEX powder (dry bead, 50-150 micron diameter) was placed on the bottom of a water-filled vessel and the levitating pumping or mixing element rotated. A uniform suspension was achieved after approximately five minutes of mixing.

As should be appreciated, the system 10 described above and shown in FIGS. 1-4 is based on the use of a stationary superconducting element 20 and a pumping or mixing element 14 that, in addition to a "levitation" magnet, includes one or more separate driven magnets for coupling with a drive mechanism, such as one positioned at the opposite end of the vessel or container relative to the superconducting element. However, other embodiments of the pumping or mixing system may include a levitating, rotating pumping or mixing element with magnets that are simultaneously used not only for levitation, but also for transmitting driving torque. In one embodiment, this driving torque is simultaneously provided by the pinning forces that couple the pumping or mixing element with a rotating superconducting element. Thus, the superconducting element causes the pumping or mixing element to both levitate and rotate, even though there is no physical contact between the two elements.

More specifically, and in accordance with this second possible embodiment of the present invention illustrated in FIG. 5, the pumping or mixing system 100 includes a cryostat 102, which may be formed of two separate components: a first component 102a including an outer wall 104 that surrounds a relatively thin, disk-shaped superconducting element 106 to define a chamber 108, and a second component 102b including the cooling source 110. Preferably, the outer wall 104 is formed of thin, non-magnetic material, such as non-magnetic stainless steel or the like, but the use of other materials is possible, as long as they do not interfere with the operation of the system 100 and have relatively poor thermal conductivity. The chamber 108 surrounding the superconducting element 106 may be evacuated or insulated as described above to thermally isolate and separate it from the wall 104. However, in this embodiment, and as noted further below, it is possible to eliminate the chamber 108 entirely in the case where a non-temperature sensitive fluid is being pumped or mixed.

In the case where the chamber 108 is evacuated, a valve 112 may be provided in the outer wall 104 for coupling to a vacuum source. An optional getter 114 (such as an activated carbon insert or the like) may be positioned in the chamber 108 for absorbing any residual gases and ensuring that the desired evacuation pressure is maintained. As with the embodiments described above, the evacuation pressure is preferably on the order of $10^{-3}$ torr or greater, but may vary depending on the particular application.

The superconducting element 106 is supported in the chamber 108 independent of the outer wall 104 of the first portion 102a of the cryostat 102. The support may be provided by a platform 116 that is enclosed by wall 104 and supported at one end of an elongated thermal link 118, preferably formed of metal or another material having a high degree of thermal conductivity (e.g., 50 Watts/Kelvin or higher). To supply the necessary cooling to the superconducting element, the opposite end of the elongated thermal link 118 is positioned in contact with the cooling source 110, which as described above forms a part of the second component 102b of the "cryostat" 102 (the term cryostat being used throughout to denote a structure or combination of structures that are capable of maintaining a superconducting element in a cold state, whether forming a single unit or not). The cooling source 110 is illustrated schematically as an open-top container 119, such as a Dewar flask, containing a liquid cryogen C, such as nitrogen. However, it is also possible to use a closed-cycle refrigerator or any other device capable of supplying the cooling necessary to levitate a magnet above a superconducting element after field cooling is complete. In the case where the wall 104 of the first portion 102a of the cryostat 102 makes contact with the cryogenic fluid C, as illustrated, it should be appreciated that there is only negligible thermal transfer to the portion of the wall 104 adjacent the vessel, since: (1) the wall 104 may be formed of a thin material having low thermal conductivity; and (2) the portion of the wall 104 adjacent to the vessel is surrounded by the ambient, room-temperature environment.

To permit the superconducting element 106 to rotate, a roller bearing assembly 120 comprising one or more annular roller bearings 122 supports the first portion of the cryostat 102a, including the wall 104 defining the chamber 108. As should be appreciated from viewing FIG. 5, these roller bearings 122 permit the first portion of the cryostat 102a housing the superconducting element 102 to rotate about an axis, which is defined as the axis of rotation. A bearing housing 124 or the like structure for supporting the bearing(s) 122 is secured to an adjacent stable support structure 126. In the illustrated embodiment, a motive device includes an endless belt 128 that serves to transmit rotational motion from the pulley 129 keyed or attached to the shaft 130 of a motor 131 to the first portion of the cryostat 102a. The motor 131 may be a variable speed, reversible electric motor, but the use of other types of motors to create the rotary motion necessary to cause the superconducting element 106, and more particularly, the first portion of the cryostat 102a housing the superconducting element 106, to rotate is possible.

The vessel 132 containing the fluid to be mixed (which as described below can also be in the form of a centrifugal pumping head for transmitting a fluid) is positioned adjacent to the rotating superconducting element 106, preferably on a stable support surface T fabricated of a material that does not interfere with the magnetic field created by the pumping or mixing element 134. As previously noted, the vessel 132 can be a rigid vessel of any shape (open top, sealed having an inlet or outlet, cylindrical with a hollow center, such as a pipe, or even a flexible plastic bag (by itself, with rigid inserts, or inserted into a rigid or semi-rigid vessel)). The only requirement is that the vessel 132 employed is capable of at least temporarily holding the fluid F (or gas) being mixed or pumped.

To create the desired mixing action in this embodiment, a pumping or mixing element 134 is positioned in the vessel 132 and simultaneously levitated and rotated by the superconducting element 106. More specifically, the first portion of the cryostat 102a containing the superconducting element 106, thermal link 118, and the evacuated chamber 108 is rotated as a result of the rotational motion transmitted by the endless belt 128. This rotation causes the pumping or mixing element 134 in the vessel 124 to rotate and either pump or mix the fluid F held therein. In the case where the chamber 104 is evacuated or insulated, the pumping or mixing element 134 is rotated in a stable, reliable fashion while the desired thermal separation between the cold superconducting element 106 supplying the levitation force, the vessel 124, and hence the fluid F, is achieved. The pumping or mixing element 134 may include a plurality of mixing blades B (see FIGS. 6a and 6b), vanes V (not shown, but see FIG. 7), or like structures to create an impeller. However, again referring back to FIG. 5, a low-profile, disk-shaped pumping or mixing element 134 may also be used to provide the desired mixing action, especially for particularly delicate fluids, such as blood or other types of cell suspensions.

Figure 20:
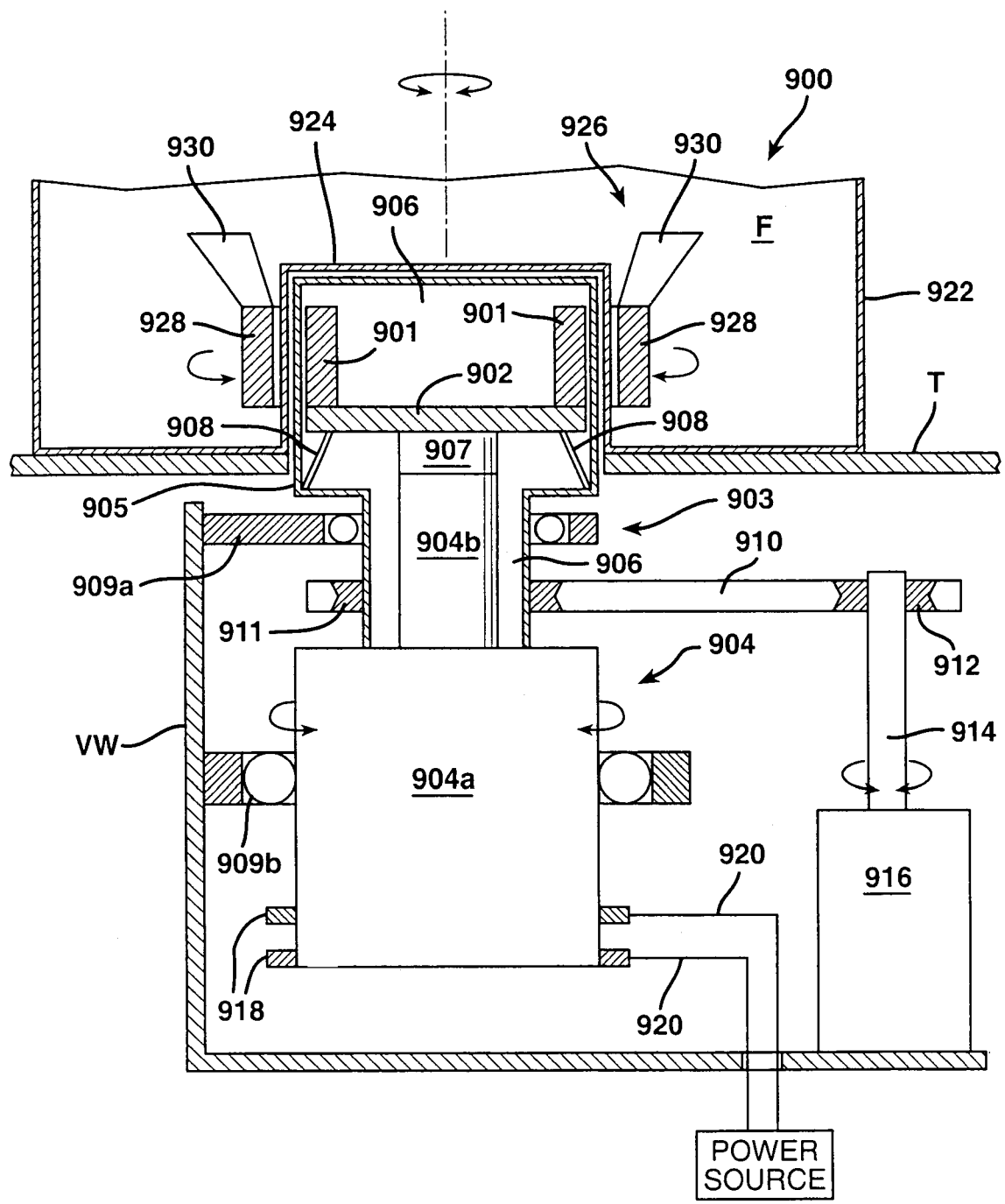
FIG. 20 illustrates an embodiment where the cryostat includes a cryocooler which rotates along with the superconducting element to both levitate and rotate the pumping or mixing element in a vessel, which is shown as having a cavity formed therein.

As perhaps best understood by viewing FIGS. 6a and 6b together, the pumping or mixing element 134 may include at least two magnets 135a, 135b, and possibly more than two (see FIG. 20). These magnets 135a, 135b not only serve to generate the magnetic field that causes the pumping or mixing element 134 to levitate above the superconducting element 106, but also transmit rotational motion to the pumping or mixing element. As should be appreciated by one of ordinary skill in the art, the magnetic field generated by the magnets 135a, 135b should be axially non-symmetrical relative to the axis of rotation of the superconducting element 106 in order to create the magnetic coupling necessary to efficiently transmit the rotary motion. In one embodiment, the magnets 135a, 135b are disk-shaped and polarized along a center vertical axis (see FIG. 6b, showing permanent magnets 135a, 135b of alternating polarities (N—North; S—South) levitating above a pair of superconducting elements 106a, 106b, with the corresponding action arrows denoting the direction and axis of polarity). These magnets 135a, 135b can be fabricated from a variety of known materials exhibiting permanent magnetic properties, including, but not limited to, Neodymium-Iron-Boron (NdFeB), Samarium Cobalt (SmCo), the composition of aluminum, nickel, and cobalt (Alnico), ceramics, or combinations thereof. The magnets 135a, 135b may be interconnected by a piece of an inert matrix material M, such as plastic or inert, non-corrosive metals. Alternatively, the magnets 135a, 135b may each be embedded in separate pieces of a matrix material M, or may be embedded in a single unitary piece of material (not shown). Also, as previously mentioned, the pumping or mixing element 134 may carry one or more optional blades B, vanes or like structures to enhance the degree of pumping or mixing action created.

Figure 21:
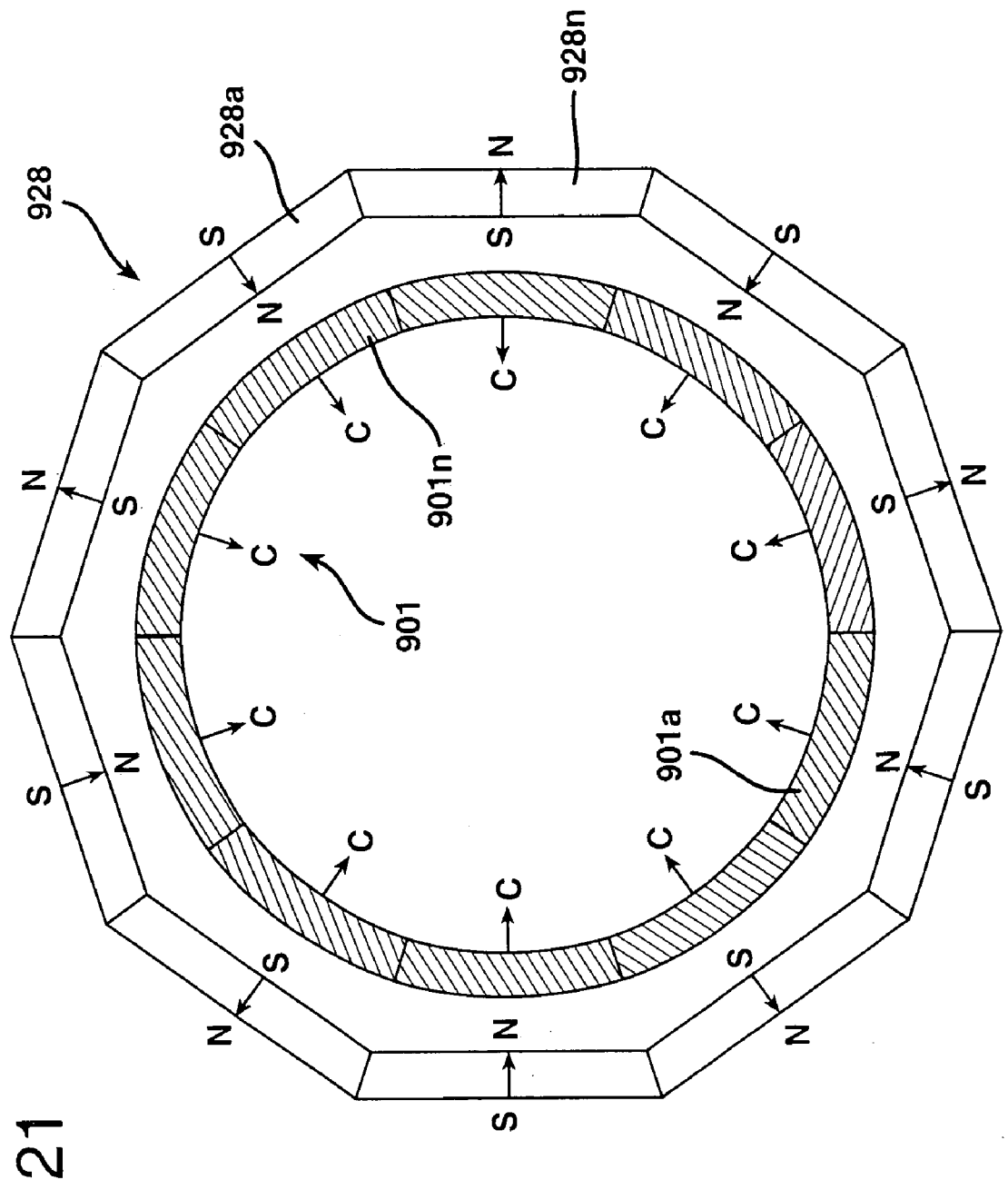
FIG. 21 is a schematic view showing one possible orientation of the magnets and superconductors in the embodiment of FIG. 20.

In another possible embodiment, the second portion of the cryostat 102b including the cooling source (either a liquid cryogen container (open top, sealed with inlet/outlet ports, or a refrigerator (preferably a "cryocooler," as described further below)) may be rigidly attached to the first portion 102a and both components may be simultaneously rotated together (see the dashed lines at the top of the open cooling container 119 in FIG. 5, and see also the embodiment described below and shown in FIGS. 20-21). The rotational motion may be supplied by an endless belt/motor combination, as described above, or alternatively may be provided through a direct coupling between the second portion of the cryostat 102b (comprising any type of cooling source) and an inline shaft extending from or coupled to a motor or similar motive device (not shown).

As briefly mentioned above, it is possible to use this embodiment of the system 100 without evacuating, insulating, or otherwise thermally separating the superconducting element 106 from the ambient environment, such as for mixing or pumping cold (cryogenic) or non-temperature sensitive fluids. In that case, there is no specific need for a wall 104 or chamber 108 surrounding the superconducting element 106, since thermally separating it from the structure supporting the vessel 132 (e.g., a table, stand or the like) is unnecessary. Even with this modification, reliable and stable levitation of the pumping or mixing element 134 is still achieved.

From the foregoing, it should be appreciated that the same driving mechanism and cryostat shown in FIG. 5 can be used for pumping a fluid instead of mixing it. One version of a vessel 132 in the form of a centrifugal pumping head 150 is shown in FIG. 7. This pumping head 150 includes a pumping chamber 152 having an inlet 154 and an outlet 156 (which of course, could be reversed, such as in a non-centrifugal pumping head (see FIG. 2)). The chamber 150 contains the levitating pumping or mixing element 158, which as shown may include a plurality of vanes V, or may alternatively carry a plurality of blades (not shown). At least two permanent magnets 160a, 160b having different polarities are embedded or otherwise included in the pumping or mixing element 158, which may be substantially comprised of an inert matrix material M having any desired shape to facilitate the pumping or mixing action. As described above, these magnets 160a, 160b provide both levitation and torque transmission as a result of the adjacent rotating superconducting element 106.

As should be appreciated, one advantage of providing the driving force for the levitating pumping or mixing element 158 from the same side of the vessel/pumping head 150 from which the levitating force originates is that the fluid inlet 154 (or outlet 156, in the case where the two are reversed) may be placed at any location along the opposite side of the vessel/pumping head 150, including even the center, without interfering with the pumping or mixing operation. Also, this same side of the vessel/pumping head 150 may be frusto-conical or otherwise project outwardly, as illustrated, without interfering with the rotation or necessitating a change in the design of the pumping or mixing element 134, 158.

Figures 8A, 8B:
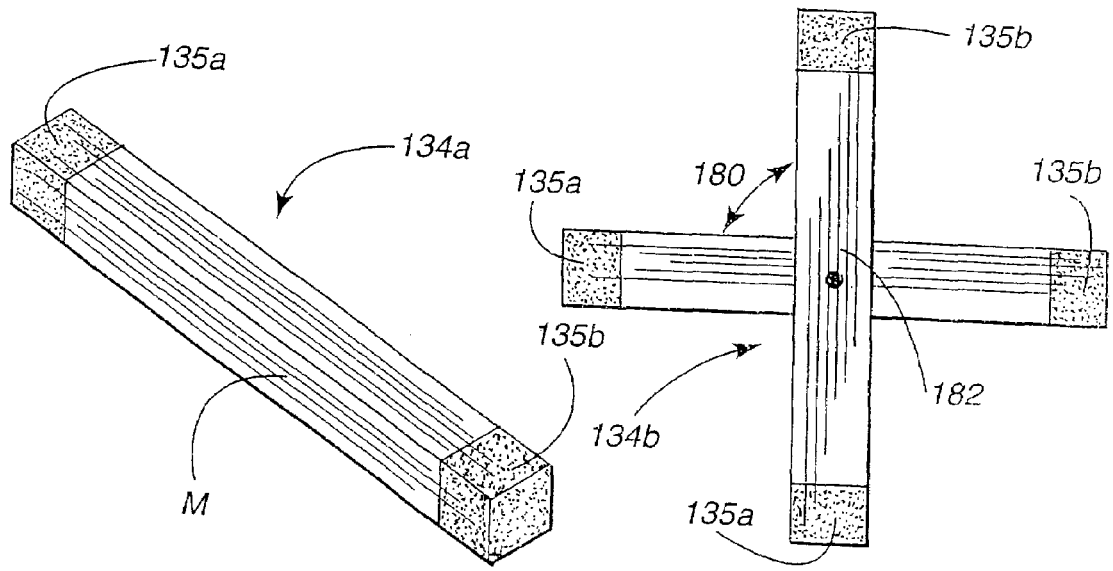
FIG. 8a shows an alternate embodiment of a pumping or mixing element especially adapted for levitation in a vessel or container having a relatively narrow opening.
FIG. 8b shows another alternate embodiment of a pumping or mixing element adapted especially for use in a vessel or container having a relatively narrow opening.

As briefly noted above, in some instances the opening in a vessel may be too small to permit an even moderately sized pumping or mixing element 134 to be inserted into the fluid F. In such a case, alternate versions of a pumping or mixing element 134 meeting this particular need are shown in FIGS. 8a-8c. In the first alternate version, the pumping or mixing element 134a is in the form of a slender rod formed of an inert matrix material M carrying one of the levitating/driven magnets 135a, 135b at or near each end. As should be appreciated, this pumping or mixing element 134a may be easily turned to an upstanding position and inserted in the opening. Upon then coming into engagement with the rotating superconducting element 106, the pumping or mixing element 134a would simultaneously levitate and rotate to pump or mix a fluid held in the vessel. To further facilitate insertion in the narrow opening, the matrix material M may be an elastomeric material or another material having the ability to freely flex or bend.

A second version of a pumping or mixing element 134b for use with a vessel having a narrow opening is shown in FIG. 8b. The pumping or mixing element 134b includes first and second thin rods 180 formed of a matrix material M. The rods 180 each carry the levitating/driven magnets 135a, 135b at each end thereof, with at least two magnets having the identical polarity being held on each different rod. In one version, the rods 180 are pinned about their centers (note connecting pin 182) and are thus capable of folding in a scissor-like fashion. As should be appreciated from FIG. 8c, this allows the pumping or mixing element 134b to be folded to a low-profile position for passing through the opening of the vessel 132. The rods 180 of the pumping or mixing element 134b may then separate upon coming into engagement with an appropriately field cooled superconducting element 106 positioned adjacent to the bottom of the vessel 132. Since magnets 135a or 135b having the same polarity are positioned adjacent to each other, the corresponding ends of the rods 180 repel each other as the pumping or mixing element 132b rotates. This prevents the rods 180 from assuming an aligned position once in the vessel 132. As should be appreciated, instead of pinning two separate rods 180 together to form the pumping or mixing element 134b, it is also possible to integrally mold the rods 180 of a flexible material to form a cross. This would permit the rods 180 of the pumping or mixing element 134b to flex for passing through any narrow opening, but then snap-back to the desired configuration for levitating above the superconducting element 106.

In accordance with yet another aspect of the present invention, a third version of a pumping or mixing system 200 is disclosed. In this third embodiment, which is illustrated in FIGS. 9, 9a, 9b, and 10, the forces for driving and levitating the pumping or mixing element 204 are supplied from the same side of a fluid vessel 202 (which is shown as an open-top container, but as described above, could be a sealed container, a pumping chamber or head, a flexible bag, a pipe, or the like). In this system 200, the pumping or mixing element 204 actually includes two magnetic subsystems: a first one that serves to levitate the pumping or mixing element 204, which includes a first magnet 206, preferably in the form of a ring, and a second magnetic subsystem that includes at least two alternating polarity driven magnets 208a, 208b, preferably positioned inside of the first, ring-shaped magnet 206, to transmit driving torque to the pumping or mixing element (see FIGS. 9a and 9b).

Figure 9B:
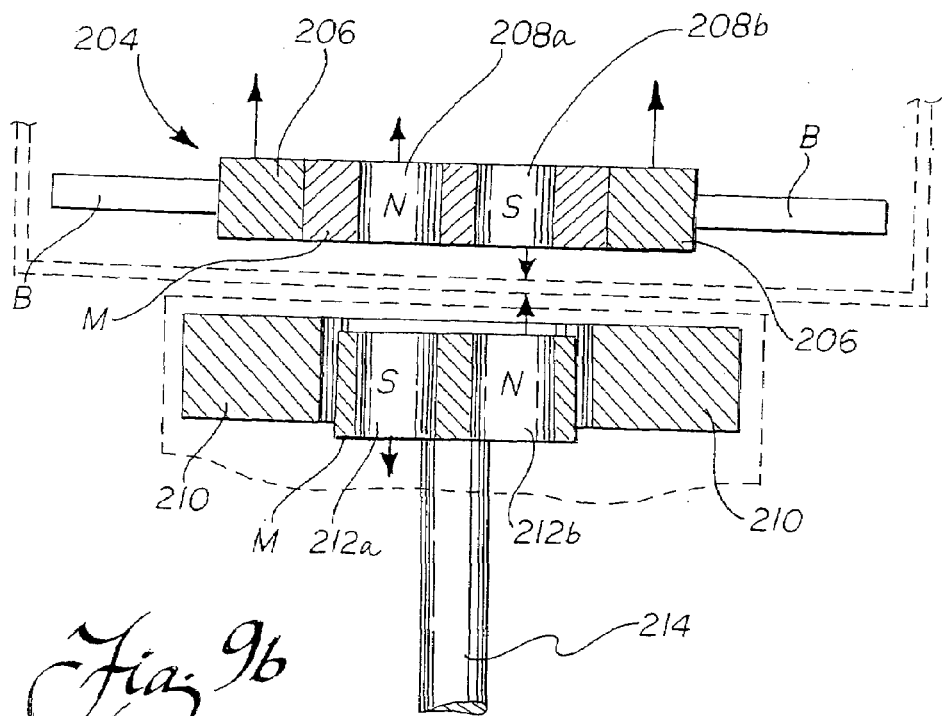
FIG. 9b is a partially cross-sectional side view of the pumping or mixing element of FIGS. 9 and 9a levitating above the superconducting element, and illustrating the manner in which the driven magnets are coupled to the corresponding driving magnets to create the desired rotational motion.
Figure 9:
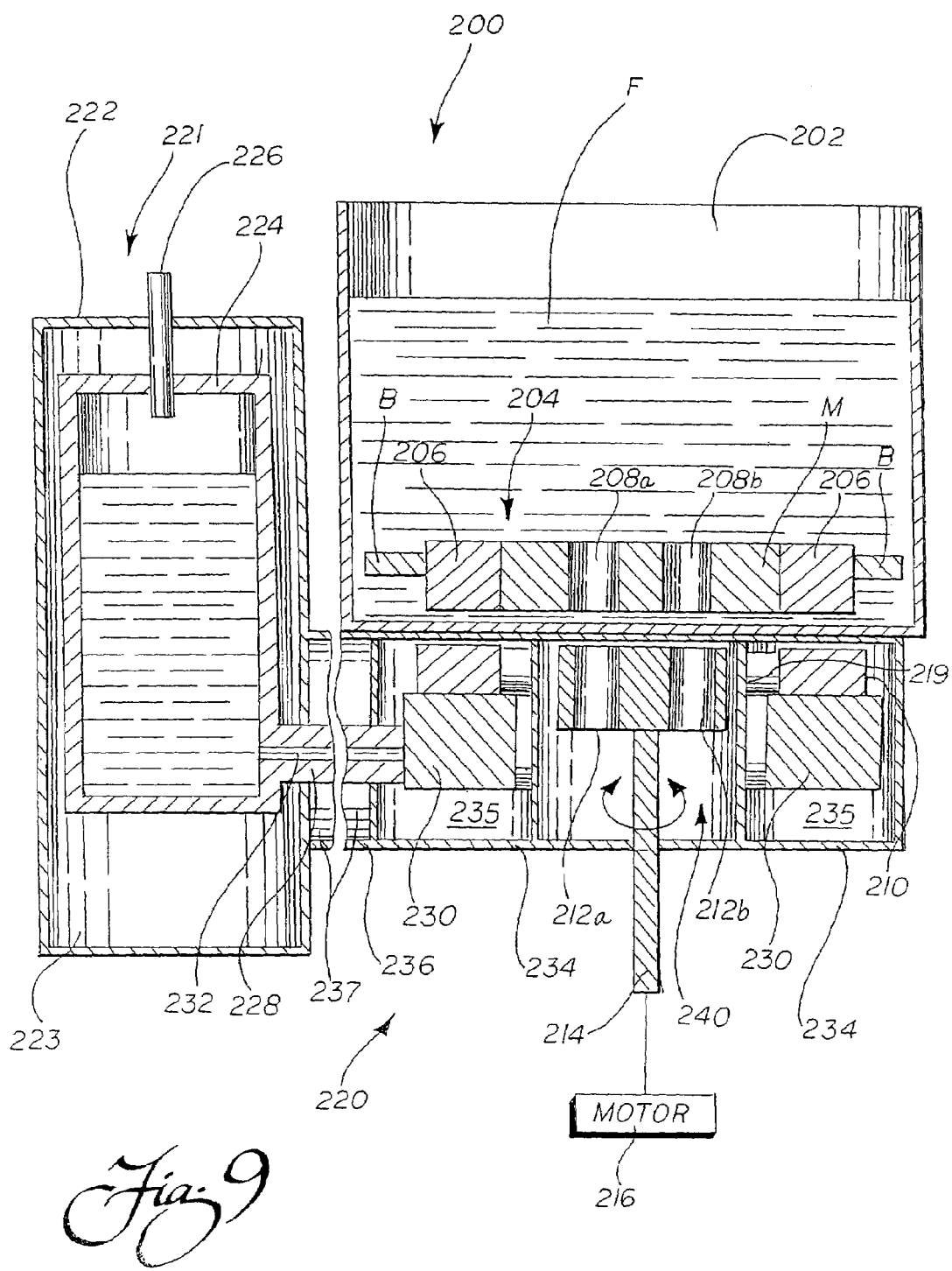
FIG. 9 is a partially cross-sectional, partially schematic side view of a second embodiment of a pumping or mixing system wherein separate levitating and driven magnets are carried on the same, low-profile pumping or mixing element, with the levitation being supplied by a thermally isolated superconducting element and the rotary motion being supplied a motive device including driving magnets coupled to a rotating shaft and positioned in an opening in the evacuated or insulated chamber surrounding the superconducting element.

FIG. 9 shows one embodiment of the overall system 200 in which the ring-shaped permanent magnet 206 or array of magnets (not shown) provides the levitation for the pumping or mixing element 204. Polarization of the ring magnet 206 is vertical (as shown by the long vertical arrows in FIG. 9b). The driven magnets 208a, 208b are shown as being disk-shaped and having opposite or alternating polarities (see corresponding short action arrows in FIG. 9b representing the opposite polarities) to form a magnetic coupling and transmit the torque to the levitating pumping or mixing element 204. Levitation magnet 206 and driven magnets 208a, 208b are preferably integrated in one rigid structure such as by embedding or attaching all three to a lightweight, inert matrix material M, such as plastic or the like.

To correspond to the ring-shaped levitation magnet, the superconducting element 210 for use in this embodiment is annular, as well. This element 210 can be fabricated of a single unitary piece of a high-temperature superconducting material (YBCO or the like), or may be comprised of a plurality of component parts or segments. Upon being cooled to the transition temperature in the presence of a magnetic field and aligning with the ring-shaped permanent magnet 206 producing the same magnetic field, the superconducting ring 210 thus provides the combined repulsive/attractive, spring-like pinning force that levitates the pumping or mixing element 204 in the vessel 202 in an exceptionally stable and reliable fashion. In FIG. 9, the vessel is shown as being supported on the outer surface of a special cryostat 220 designed for use with this system 200, a detailed explanation of which is provided in the description that follows. However, it is within the broadest aspects of the invention to simply support the vessel 202 on any stable support structure, such as a table (not shown), as long as it remains sufficiently close to the superconducting element 210 to induce the desired levitation in the pumping or mixing element 204 held therein.

As in the embodiments described above, a motive device is used to impart rotary motion to the pumping or mixing element 204, and is preferably positioned adjacent to and concentric with the annular superconducting element 210. One example of a motive device for use in the system 200 of this third embodiment includes driving magnets 212a, 212b that correspond to the driven magnets 208a, 208b on the pumping or mixing element 204 and have opposite polarities to create a magnetic coupling (see FIG. 9b). The driving magnets 212a, 212b are preferably coupled to a shaft 214 also forming part of the motive device. The driving magnets 212a, 212b may be attached directly to the shaft 214, or as illustrated in FIG. 9, may be embedded or attached to a matrix material (not numbered in FIG. 9, but see FIG. 9b). By positioning the driving magnets 212a, 212b close to the pumping or mixing element 204, such as by inserting them in the opening or bore 219 defined by the annular superconducting element 210, and rotating the shaft 214 using a motor 216 also forming a part of the motive device, synchronous rotation of the levitating pumping or mixing element 204 is induced. The pumping or mixing element 204 may include one or more blades B that are rigidly attached to the ring or levitation magnet 206 (or any matrix material forming the periphery of the pumping or mixing element 204). However, it remains within the broadest aspects of the invention to simply use a smooth, low-profile pumping or mixing element (see FIG. 5) to provide the desired mixing action.

As shown in FIGS. 9 and 10 and briefly mentioned above, the mixing or pumping system 200 including the pumping or mixing element 204 comprised of the magnetic levitation ring 206 and separate driven magnets 208a, 208b may use a special cryostat 220 to ensure that reliable and stable rotation/levitation is achieved. As perhaps best shown in the cross-sectional side view of FIG. 9, the cryostat 220 includes a cooling source 221 for indirectly supplying the necessary cooling to the superconducting element 210, which as described below is supported and contained in a separate portion of the special cryostat 220. In the illustrated embodiment, the cooling source 221 (not necessarily shown to scale in FIG. 9) includes a container 222, such as a double-walled Dewar flask, in which a first chamber 224 containing a liquid cryogen C (nitrogen) is suspended. A second chamber 223 defined around the first chamber 224 is preferably evacuated or insulated to minimize thermal transfer to the ambient environment, which is normally at room temperature. A port 226 is also provided for filling the suspended chamber 224 with the chosen liquid cryogen C, as well as for possibly allowing any exhaust gases to escape. As with the first and second embodiments described above, the cooling source 221 may instead take the form of a closed-cycle refrigerator (not shown), in which case the double wall container 222 may be entirely eliminated from the system 200.

A thermal link 228 is provided between the cooling source (in the illustrated embodiment, the container 222) and a platform 230 suspended in the cryostat 220 for supporting the superconducting ring 210. The use of the platform 230 is desirable to ensure that the temperature of the superconducting element 210 is kept below the transition temperature, which in the case of a "high temperature" superconducting material (such as YBCO) is most preferably in the range of between 87-93 Kelvin. However, the use of the platform 230 is not critical to the invention or required as part of the special cryostat 220, since the thermal link 228 could extend directly to the superconducting element 210. The thermal link 228 may be a solid rod of material, including copper, brass, or any other material having a relatively high thermal conductivity. Instead of a solid rod, it is also possible to provide an open channel 232 in the thermal link 228, especially when a liquid cryogen C capable of flowing freely, such as nitrogen, is used as the cooling source 221. This channel 232 allows the cryogen C from the suspended container 224 to reach the platform 230 directly. Of course, the direct contact with the cryogen C may provide more efficient and effective cooling for the superconducting element 210, but is not required.

The ring-shaped platform 230 that supports the superconducting element(s) 210 and supplies the desired cooling via thermal conduction may be made of copper, brass, aluminum, or another material having good thermal conductivity. It may be in the form of a solid ring, as illustrated, or may be in the form of a hollow ring (such as a substantially circular or elliptical torus, not shown). This would allow the liquid cryogen C to flow completely around the ring to further increase the efficiency with which the cooling is transferred to the superconducting element 210. In any case, where a platform 230 is used, care should be taken to ensure that full contact is made with at least a majority of the corresponding surface of the superconducting element 210, since even cooling helps to ensure that the desired smooth, even, and reliable levitation is achieved.

To reduce the thermal transfer to the vessel 202 in the case where a temperature sensitive fluid is being pumped or mixed by the system 200, a ring-shaped wall or enclosure 234 surrounding the platform 230 and the annular superconducting element 210 defines a first chamber 235. In addition, a hollow cylindrical wall or enclosure 236 may also surround the thermal link 232 and define a second chamber 237. Preferably, these first and second chambers 235, 237 are evacuated or insulated to minimize thermal transfer between the ambient environment and the cold elements held therein. In a preferred embodiment, each enclosure 234, 236 is fabricated from non-magnetic stainless steel, but the use of other materials is of course possible, as long as no interference is created with the levitation of the pumping or mixing element 204. As with the second embodiment described above, it is also possible to use the system 200 of the third embodiment to pump or mix cryogenic or non-temperature sensitive fluids, in which case there is no need to evacuate or insulate the enclosures 234, 236, or to even use the special cryostat 220 described herein.

As should be appreciated, it is possible to create the chambers 235, 237 defined by the enclosures 234, 236 and the chamber 223 such that all three are in fluid communication and thus represent one integrated vacuum space (not shown). This facilitates set-up, since all three chambers 223, 235, 237 may be evacuated in a single operation, such as by using a vacuum source coupled to a single valve (not shown) provided in one of the chambers. However, separately evacuating each chamber 223, 235, 237 is of course entirely possible. Also, instead of or in addition to evacuating the chambers 223, 235, 237, some or all may be instead filled with a suitable insulating material (not shown).

As should be appreciated, to rotate the pumping or mixing element 204 in this embodiment, it is desirable to place the drive magnets 212a, 212b in close proximity to the pumping or mixing element, but preferably on the same side of the vessel 202 as the superconducting element 210. Accordingly, the special cryostat 220, and more specifically, the wall or enclosure 234 defines a room-temperature cylindrical bore or opening 240 that allows for the introduction of the end of the shaft 214 carrying the driving magnets 212a, 212b, which are at room temperature. As a result of this arrangement, the shaft 214, which is part of the motive device, is concentric with the superconducting element 210. The shaft 214 is also positioned such that the driving magnets 212a, 212b align with the driven magnets 208a, 208b on the pumping or mixing element 204 when the levitating magnet 206 is aligned with the superconducting element 210. Thus, despite being positioned adjacent to and concentric with the superconducting element 210, the shaft 214 and driving magnets 212a, 212b remain at room temperature, as does the vessel 202, the fluid F, and the pumping or mixing element 204.

An example of one possible embodiment of a centrifugal pumping head 250 for use with the system 200 of FIG. 9 is shown in FIG. 11. The head 250 includes a levitating pumping or mixing element 252 that carries one or more optional blades or vanes V (which are upstanding in the side view of FIG. 11), a fluid inlet 254 (which as should be appreciated can be in the center at one side of the pumping head 250 in view of the fact that the levitation and driving forces are both supplied from the same side of the vessel 202), a fluid outlet 256, driven magnets 258a, 258b, and a ring-shaped levitation magnet 260.

Figure 12:
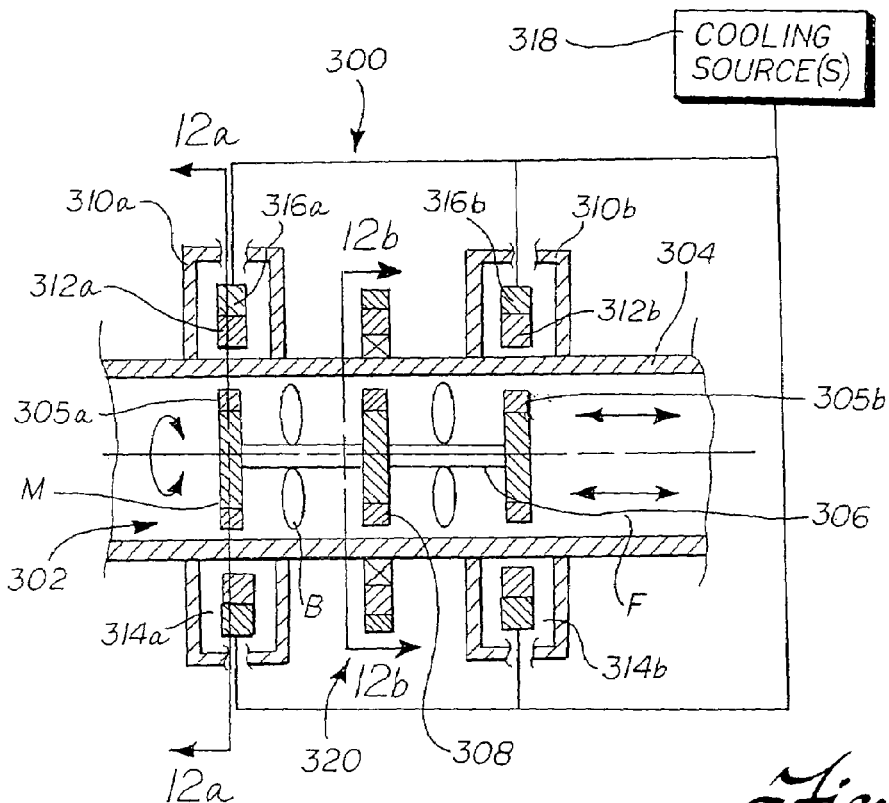
FIG. 12 is a cross-sectional side view of another possible embodiment of a pumping or mixing system of the present invention.

In yet another possible embodiment of the invention, as shown in the cross-sectional view of FIG. 12, the system 300 includes a pumping or mixing element 302 adapted for inline use, such as when the vessel is in the form of a hollow pipe 304. The pumping or mixing element 302 includes first and second spaced levitating magnets 305a, 305b, one of which is preferably positioned at each end to ensure that stable levitation is achieved. The magnets 305a, 305b preferably correspond in shape to the vessel, which in the case of a pipe 304, means that they are annular. The magnets 305a, 305b are carried on a shaft 306 forming a part of the pumping or mixing element 302, which further includes a driven magnet 308. The driven magnet 308 may be comprised of a plurality of submagnets 308a . . . 308n having different polarities and arranged in an annular configuration to correspond to the shape of the pipe 304 serving as the vessel in this embodiment (see FIG. 12b). All three magnets 305a, 305b, and 308 may be embedded or attached to an inert matrix material M, such as plastic, that provides the connection with the shaft 306. The shaft 306 of the bearing 302 may also carry one or more blades B.

First and second "cryostats" 310a, 310b are also provided. As perhaps best understood with reference to the cross-sectional view of FIG. 12a, the first "cryostat" 310a includes a superconductor for levitating the pumping or mixing element in the form of an annular superconducting element 312a. This superconducting element 312a is suspended in a chamber 314a defined by the cryostat 310a, which may be evacuated or insulated to prevent thermal transfer to the pipe 304 or the passing fluid F. The cryostat 310a may include an inner wall adjacent to the outer surface of the pipe 304 (not shown), but such a wall is not necessary in view of the thermal separation afforded by the evacuated or insulated space surrounding the superconducting element 312a. The superconducting element 312a may be coupled to annular support platform 316a, which in turn is thermally linked to one or more separate cooling sources 318. The connection is only shown schematically in FIG. 12, but as should be appreciated from reviewing the foregoing disclosure, may include a rod that serves to thermally link a container holding a liquid cryogen or a closed cycle refrigerator to the superconducting element 312a. While not shown in detail, "cryostat" 310b may be similar or identical to the cryostat 310a just described.

With reference now to FIGS. 12b and 12c, two different motive devices for rotating the pumping or mixing element 302 in the pipe 304 are disclosed. The first motive device includes a driving magnet assembly 320 that is rotatably supported on a bearing 322, such as a mechanical ball or roller bearing, carried on the outer surface of the pipe 304. The magnet assembly 320 includes a plurality of driving magnets 320a . . . 320n, also having different or alternating polarities. As with the driven magnets 308a . . . 308n, the driving magnets 320a . . . 320n are embedded or attached to an inert, non-magnetic matrix material M, such as plastic. An endless belt 324 also forming a part of the motive device frictionally engages both the driving magnet assembly 320 and a pulley or wheel W carried on the spindle or shaft of a motor (preferably a reversible, variable speed electric motor, as described above).

As should now be appreciated, the pumping or mixing element 302 is caused to levitate in the pipe 304 as a result of the interaction of the levitation magnets 305a, 305b with the adjacent superconducting elements 310a, 310b, which may be thermally separated from the outer surface of the pipe 304 (or the adjacent inner wall of the cryostat 310a, 310b, if present). Upon then rotating the magnetic drive assembly 320, the pumping or mixing element 302 is caused to rotate in the pipe 304 serving as the vessel to provide the desiring pumping or mixing action. Even if the fluid F is flowing past the pumping or mixing element 302, it remains held in place in the desired position in the pipe 304 as a result of the pinning forces created by the superconducting elements 310a, 310b acting on the levitation magnets 305a, 305b.

The second version of a motive device is shown in the cross-sectional view of FIG. 12c, which is similar to the cross-section taken in FIG. 12b. However, instead of a magnetic driving assembly 320, endless belt 324, and motor, rotary motion is imparted to the pumping or mixing element 302 by creating an electrical field around the pipe 304. This may be done by placing a winding 326 around the outer wall of the pipe 304 and supplying it with an electrical current, such as from a power supply 328 or other source of AC current. Since the pumping or mixing element 302 carries magnets 308a . . . 308n having different polarities, the resulting electric field will thus cause it to rotate.

Figure 13:
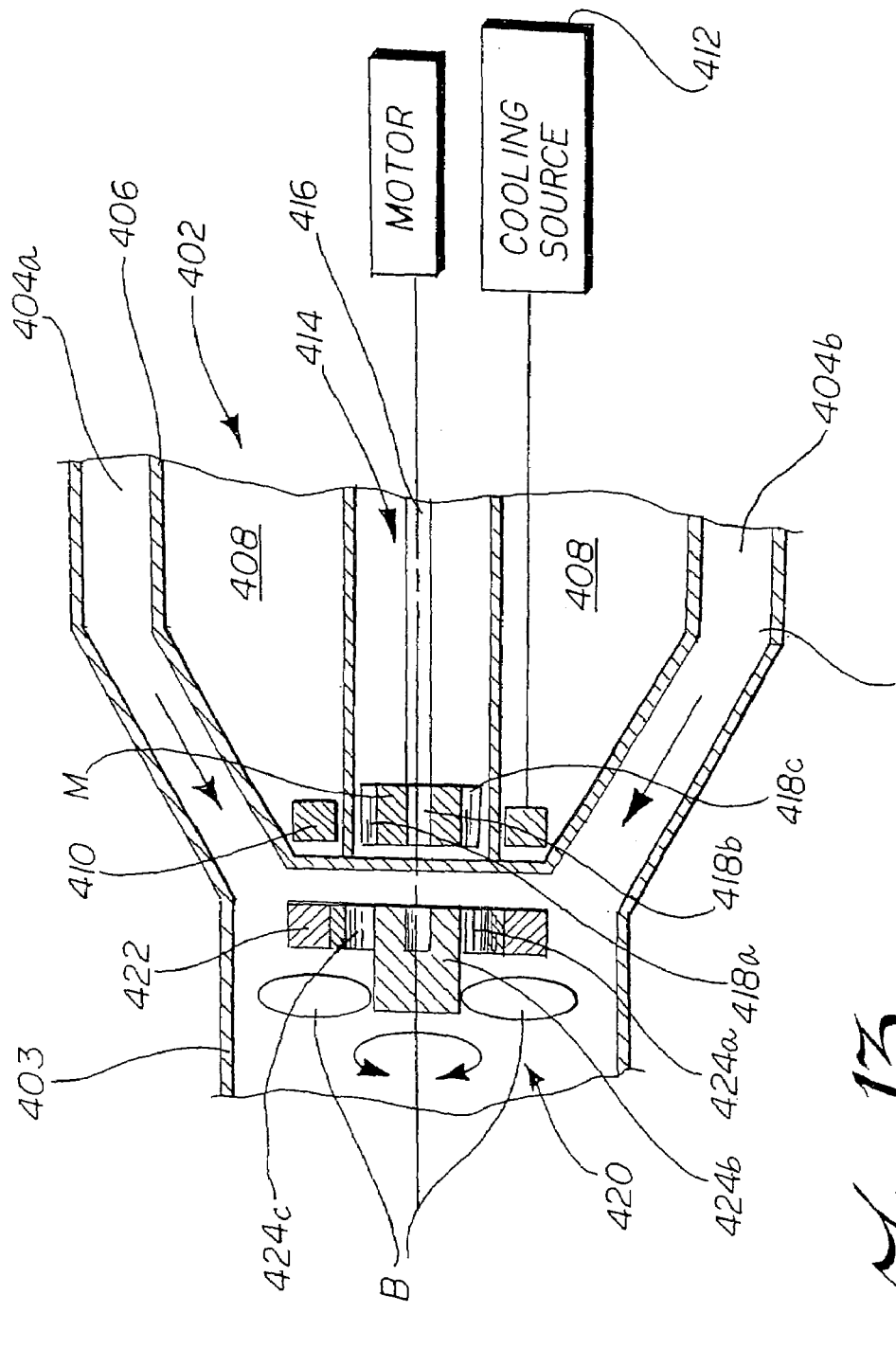
FIG. 13 is an alternate embodiment of an inline levitating pumping or mixing element, similar in some respects to the embodiment of FIG. 9.

Yet another embodiment of an inline pumping or mixing system 400 is shown in FIG. 13. The cryostat 402 in this case is essentially positioned directly in the path of fluid flow along the pipe 403, thus creating an annular (or possibly upper and lower) flow channels 404a, 404b. The cryostat 402 has an outer wall 406 that defines a chamber 408 for containing a superconducting element 410. The superconducting element 410 may be annular in shape, in which case the chamber 408 is of a similar shape. The chamber 408 may also be evacuated or insulated to thermally separate the superconducting element 410 from the outer wall 406. The superconducting element 410 is thermally linked to a separate cooling source 412, with both the thermal link and the cooling source being shown schematically in FIG. 13. It should be appreciated that this cryostat 402 is similar in many respects to the one described above in discussing the third embodiment illustrated in FIG. 9, which employs a similar, but somewhat reoriented, arrangement.

The wall 406 creating annular chamber 408 for the superconducting element 410 defines a room temperature bore or opening 414 into which a portion of a motive device may be inserted, such as the end of a shaft 416 carrying at least two driving magnets. FIG. 13 illustrates the motive device with three such driving magnets 418a, 418b, 418c, one of which is aligned with the rotational axis of the shaft 416. The opposite end of the shaft 416 is coupled to a motor (not numbered), which rotates the shaft and, hence, the driving magnets 418a, 418b, and 418c. The magnets 418a, 418b, 418c may be coupled directly to the shaft 416, or embedded/attached to an inert matrix material M.

The pumping or mixing element 420 is positioned in the pipe 403 adjacent to the outer wall 406 of the cryostat 402. The pumping or mixing element 420 includes a levitation magnet 422 that corresponds in size and shape to the superconducting element 410, as well as driven magnets 424a, 424b, 424c that correspond to the driving magnets 418a, 418b, and 418c. The levitation magnet 422 and driven magnets 424a-424c are attached to or embedded in a matrix material M, which may also support one or more blades B that provide the desired pumping or mixing action.

In operation, the motor rotates the shaft 416 to transmit rotary motion to the driving magnets 418a, 418b and 418c. As a result of the magnetic coupling formed between these magnets 418a-c and the opposite polarity driven magnets 424a-c, the pumping or mixing element 420 is caused to rotate in the fluid F. At the same time, the pumping or mixing element 420 remains magnetically suspended in the fluid F as the result of the pinning forces created between the superconducting element 410 and the levitation magnet 422. The operation is substantially the same as that described above with regard to the third embodiment, and thus will not be explained further here.

Figure 14:
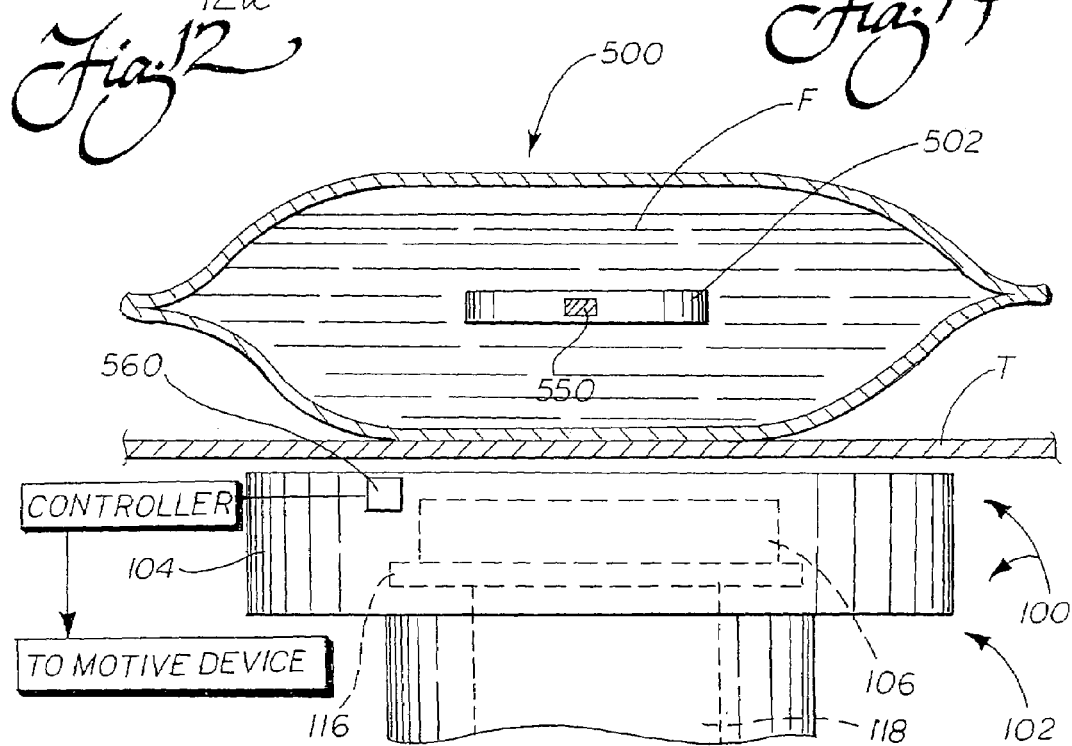
FIG. 14 is an enlarged partially cross-sectional, partially cutaway side view showing the manner in which a sealed flexible bag carrying a pumping or mixing element may be used for mixing a fluid, and also showing one example of how a transmitter and receiver may be used to ensure that the proper pumping or mixing element is used with the system.

Various optional modifications may in some circumstances enhance the set-up or performance of any of the systems described herein, or instead adapt them for a particular use, purpose, or application. As noted previously, the disposable vessel or container for holding the fluid undergoing pumping or mixing may be in the form of a flexible bag. An example of such a bag 500 is shown in FIG. 14, along with the system 100 for levitating the pumping or mixing element 502 of FIG. 5. The bag 500 may be sealed with either fluid F or the pumping or mixing element 502 (which may take the form of one of the several pumping or mixing elements disclosed above or an equivalent thereof) inside prior to distribution for use, or may be provided with a sealable (or resealable) opening that allows for the fluid and pumping or mixing element to be introduced and later retrieved.

Both the pumping or mixing element 502 and bag 500, whether permanently sealed or resealable, may be fabricated of inexpensive, disposable materials. Accordingly, both can simply be discarded after the pumping or mixing operation is completed and the fluid F is retrieved. It should also be appreciated that the vertical dimension of the bag 500 is defined by the volume of fluid F held therein. Thus, instead of placing the bag 500 containing the pumping or mixing element 502 directly on the surface of the cryostat, table T, or other support structure adjacent to the superconducting element 106, it is possible to place the flexible bag 500 in a separate rigid or semi-rigid container (see, e.g., FIG. 22). This helps to ensure that the fluid F provides the bag 500 with a sufficient vertical dimension to permit the pumping or mixing element 502 to freely rotate in a non-contact fashion. Alternatively, the bag 500 may include internal or external reinforcements (not shown) to enhance its rigidity without interfering with the rotation of the pumping or mixing element.

Figure 14A:
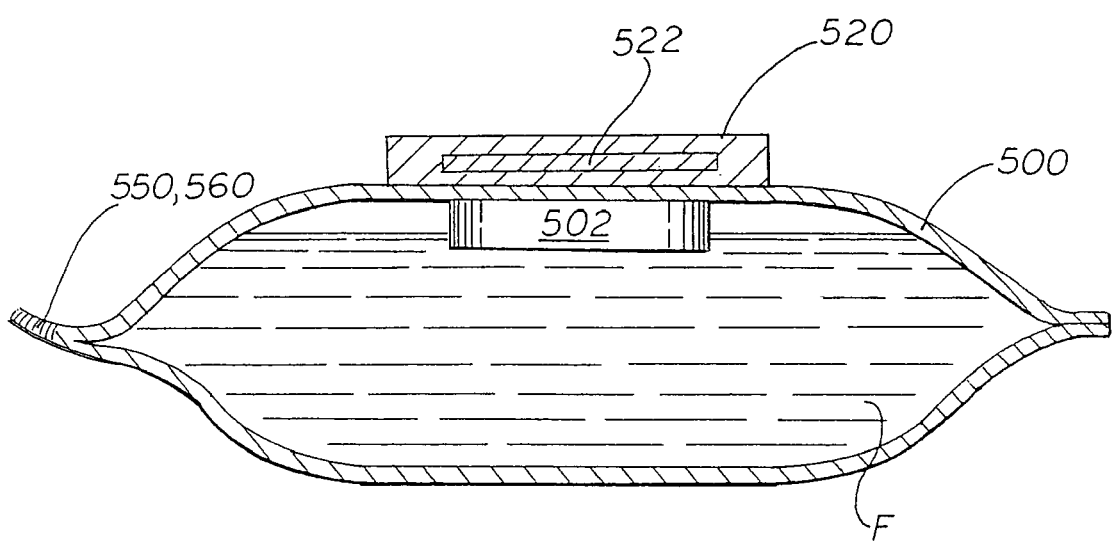
FIG. 14a is an enlarged, partially cross-sectional, partially cutaway side view showing an attachment including a coupler for coupling with the pumping or mixing element.
Figure 14B:
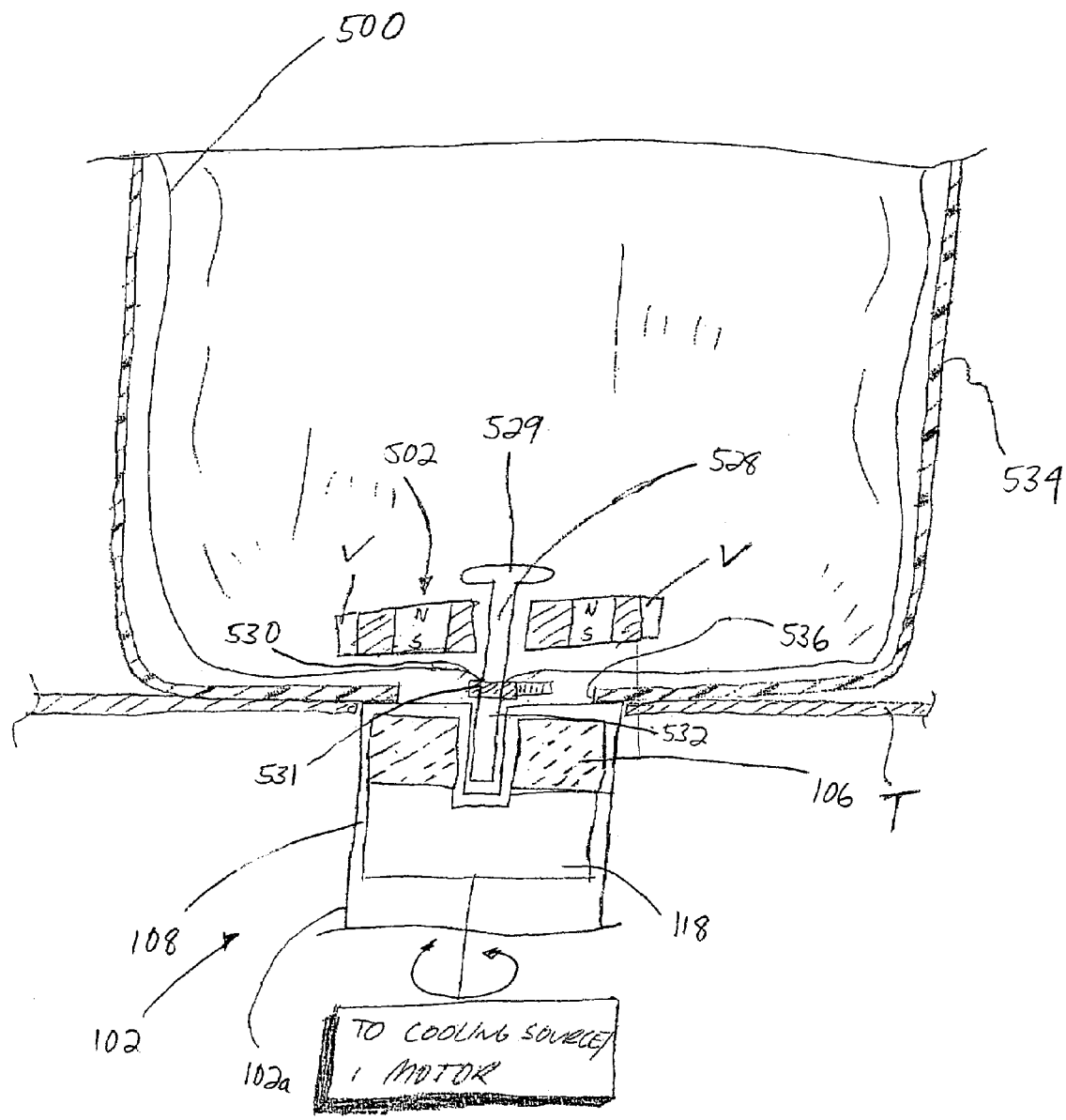
FIG. 14b is an enlarged, partially cross-sectional, partially cutaway side view showing a mixing vessel having centering and alignment structures.

In cases where the pumping or mixing element 502 is prepackaged in the bag 500, with or without fluid, it may inadvertently couple to adjacent magnets or other metallic structures. Breaking this coupling may render the bag susceptible to puncturing, tearing, or other forms of damage. Accordingly, as shown in FIGS. 14a and 14b, it may be desirable to hold the pumping or mixing element 502 place prior to use with any of the systems described herein, especially in cases where it is sealed inside the vessel/bag 500 during manufacturing As shown in FIG. 14a, one manner of holding the element 502 in place is to use an attachment 520, cover, or similar device including a coupler 522 formed of a ferromagnetic material or the like adjacent to the bag 500. This coupler 522 is thus attracted to and forms a magnetic coupling with the pumping or mixing element 502 when the attachment 520 is in place. As a result of this coupling, the pumping or mixing element 502 is prevented from coupling with magnets in adjacent bags or other magnetic structures (not shown). The attachment 520 should be fabricated of a non-magnetic material, such as rubber. In the operative position, the coupler 522 shields the magnetic field created by the pumping or mixing element 502. When the assembly including the bag 500 and the pumping or mixing element 502 is ready for use, the attachment 520 may simply be removed from the bag 500 to break the magnetic coupling between the pumping or mixing element 502 and the coupler 522.

A second manner of keeping the pumping or mixing element 502 at a desired location to facilitate coupling with the particular levitation/rotation devices used is to provide the bag 500 with a "centering" structure, such as a post 528. As shown in the embodiment illustrated in FIG. 14b, which includes the basic levitation and rotation system of FIG. 5, this post 528 may take the form of a rigid or semi-rigid piece of material projecting into the interior of the bag 500. Preferably, the post 528 is formed of the same material as the bag 500 or other container (plastic) and has an outer diameter that is less than the inner diameter or a bore or opening formed in the pumping or mixing element 502. As should be appreciated, the pumping or mixing element 502 may be held in place on the post 528 by gravity during shipping, prior to use, and even between uses. As illustrated, the upper end of the post 528 could also include a T-shaped or oversized head 529 (which could have a spherical, pyramidal, conic, or cubic shape). Alternatively, the head could have one or more transversely extending, deformable cross-members, an L-shaped hook-like member, or another type of projection for at least temporarily capturing the pumping or mixing element 502 to prevent it from inadvertently falling off when not in use. Of course, the positioning of the head 529 for capturing the pumping or mixing element 502 is preferably selected such that it does not interfere with the free levitation or rotation. As should be appreciated, the post 528 provides not only centering function, but also holds the pumping or mixing element 502 in place in case it accidentally decouples during the pumping or mixing operation. This significantly eases the process of returning the pumping or mixing element 502 to the proper position for initiating or resuming levitation/rotation by the corresponding system (which may be, for example, systems 10, 100, 200, 300, 800 etc.).

In FIG. 14b, this post 528 is adapted to receive the pumping or mixing element 502, which has a corresponding opening (and thus, may be annular or have any other desired shape or size). Since the post 528 preferably includes an oversized head portion 529 that keeps the pumping or mixing element 502 in place, including before a fluid is introduced, the vessel 500 may be manufactured, sealed (if desired), shipped, and stored prior to use with the pumping or mixing element 502 already in place. The vessel 500 may also be sterilized as necessary for a particular application, and in the case of a flexible bag, may even be folded for compact storage. As should be appreciated, the post 528 also serves the advantageous function of keeping the pumping or mixing element 502 substantially in place (or "centered") should it accidentally become decoupled from the adjacent motive device, which as in this case is a rotating annular superconducting element 106. However, the centering post 528 could also be used in the embodiment of FIG. 9 as well by simply forming a center opening in the pumping or mixing element 204.

In the illustrated embodiment, the post 528 is shown as being formed by an elongated rod-like structure inserted through one of the nipples 530 typically found in the flexible plastic bags frequently used in the bioprocessing industry (pharmaceuticals, food products, cell cultures, etc.). The oversized head portion 529 is preferably formed of a material that is sufficiently flexible/deformable to easily pass through the opening in the nipple 530. A conventional clamp 531, such as a cable or wire tie, may be used to form a fluid-impervious seal between the nipple 530 and the portion of the post 528 passing therethrough, but other known methods for forming a permanent or semi-permanent seal could be used (e.g., ultrasonic welding in the case of plastic materials, adhesives, etc.). Any other nipples 530 present (shown in phantom in FIG. 14b) may be used for introducing the fluid prior to mixing, retrieving a fluid during mixing or after mixing is complete, or circulating the fluid in the case of a pumping operation. Advantageously, the use of the rod/nipple combination allows for easy retrofitting. Nevertheless, instead of using a separate rod, the post 528 may be integrally formed with the material forming the vessel 500, either during the manufacturing process or as part of a retrofit operation. Also, as noted in my prior applications, the oversized head portion 529 may be cross-shaped, disc-shaped, L-shaped, Y-shaped, or may have any other desired shape, as long as the corresponding function of capturing the pumping or mixing element 502 is provided. The head portion 529 may be integrally formed, or alternatively may be provided as a separate component that is clamped or fastened to the post 528.

Figure 14C:
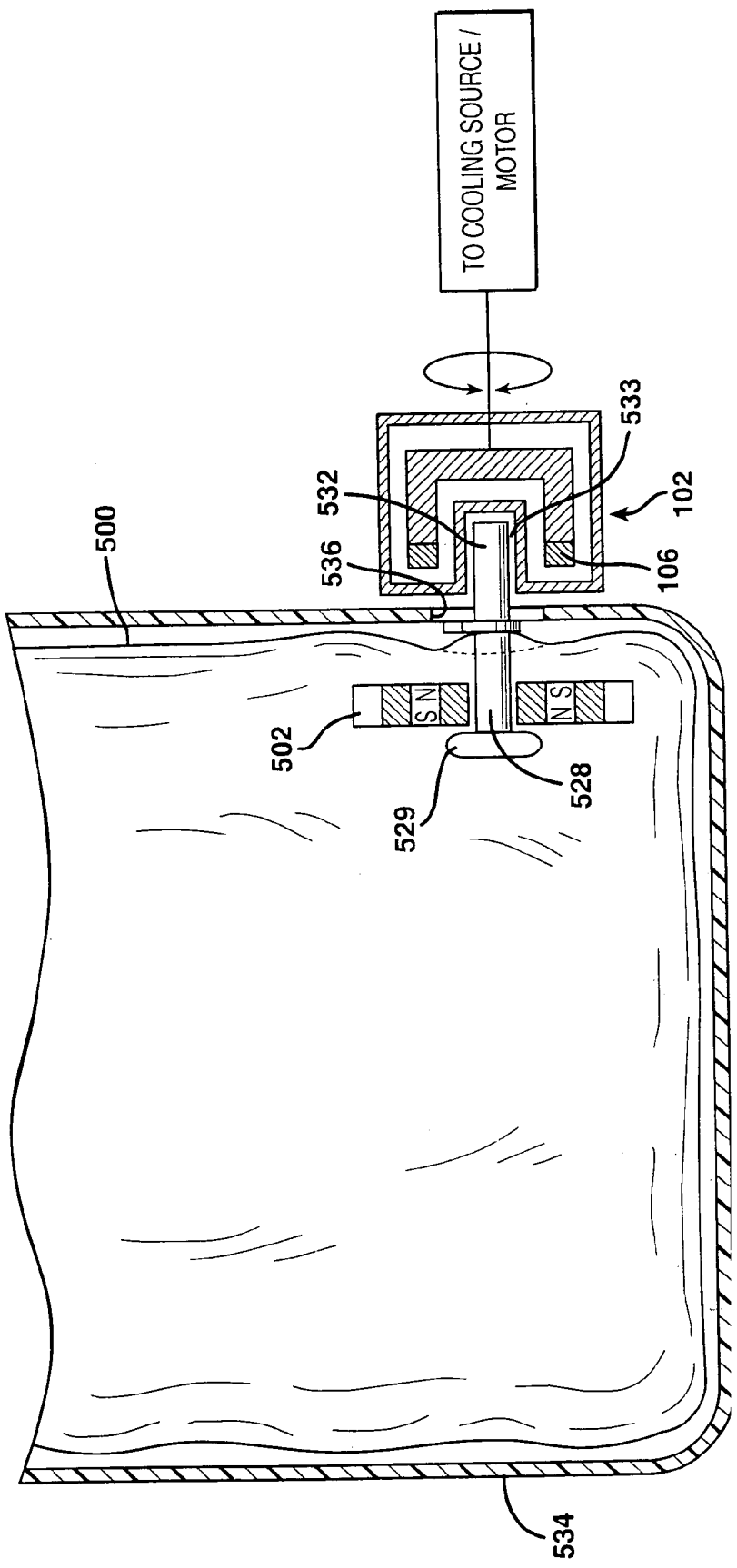
FIG. 14c is an enlarged, partially cross-sectional, partially cutaway side view showing an alternate orientation of the vessel with centering and alignment structures.

In yet another embodiment, the vessel 500 may also include a structure that helps to ensure that proper alignment is achieved between the centering post 528 and an adjacent structure, such as a device for rotating and/or levitating the pumping or mixing element 502. In the embodiment of FIG. 14b, this alignment structure is shown in the form of an alignment post 532 projecting outwardly from the vessel 500 and co-extensive with the centering post 528. The post 532 extends through an opening 536 formed in the lower portion, such as the floor, of a semi-rigid support container 534 defining a compartment for receiving the vessel 500. The container 543 thus serves as a support structure (which may instead be the table T, as shown in FIG. 14e).

The adjacent motive device, which as shown as including a cryostat 102 containing a rotating superconducting element 106, includes a locator bore 533. This bore 533 is concentric with the superconducting element 106 and is sized and shaped for receiving the alignment post 532 (which may have any desired cross-sectional shape, including circular, elliptical, square, polygonal, etc.). As a result of the centering and alignment posts 528, 532, assurance is thus provided that the pumping or mixing element 502 is in the desired position for forming a coupling with an adjacent motive device, such as the cryostat 102 housing the rotating superconducting element 106 (which may both rotate together, as described above). This is particularly helpful for properly aligning the pumping or mixing element 502 with the cryostat, such as cryostat 102, in the case of opaque vessels or adjacent containers, sealed or aseptic containers, large containers, or where the fluid is not clear. Instead of forming the alignment post 532 from an elongated rod inserted into a nipple 530 or the like, it should be appreciated that it may also be integrally formed with the vessel 500 during manufacturing, or later during a retrofit.

FIG. 14b also shows the centering post 528 projecting upwardly from a bottom wall of the vessel 500, but as should be appreciated, it could extend from any wall or other portion thereof. For example, as illustrated in FIG. 14c, the rod serving as both the centering post 528 and the alignment post 532 may be positioned substantially perpendicular to a vertical plane. Specifically, in the particular embodiment shown, the vessel 500 is an empty flexible bag as shown above positioned in a rigid or semi-rigid support container 534 having an opening 536 formed in the lower portion thereof. Once the vessel 500 is inserted in the container 534, but preferably prior to introducing a fluid, the alignment post 532 is positioned in the opening 536 such that it projects therefrom (along with any inlet or outlet hoses present). The proximal end of the alignment post 532 is then inserted into a corresponding receiver in the motive device, such as the locator bore 533 formed in the cryostat 102 (which is easily reoriented, as described herein). This ensures that the pumping or mixing element 502 is in the desired position to form the magnetic coupling with the superconducting once field cooling is complete to achieve levitation and/or rotation without the need for external intervention. As noted above, the coupling may be formed either before or after the introduction of the fluid into the vessel 500.

Also, while shown in conjunction with a particular embodiment of the pumping or mixing system, it should be appreciated that the alignment and centering posts 528, 532 may, either together or separately, be used in conjunction with different types of pumping or mixing elements or with any of the pumping or mixing systems disclosed herein.

In many of the above-described embodiments, the pumping or mixing action is essentially localized in nature. This may be undesirable in some situations, such as where the vessel is relatively large compared to the pumping or mixing element. To solve this problem, the particular system used to supply the pumping or mixing action may be provided with a motive device for physically moving the superconducting element (which may also be simultaneously rotated). This of course will cause the levitating pumping or mixing element to follow a similar path.

Figure 14D:
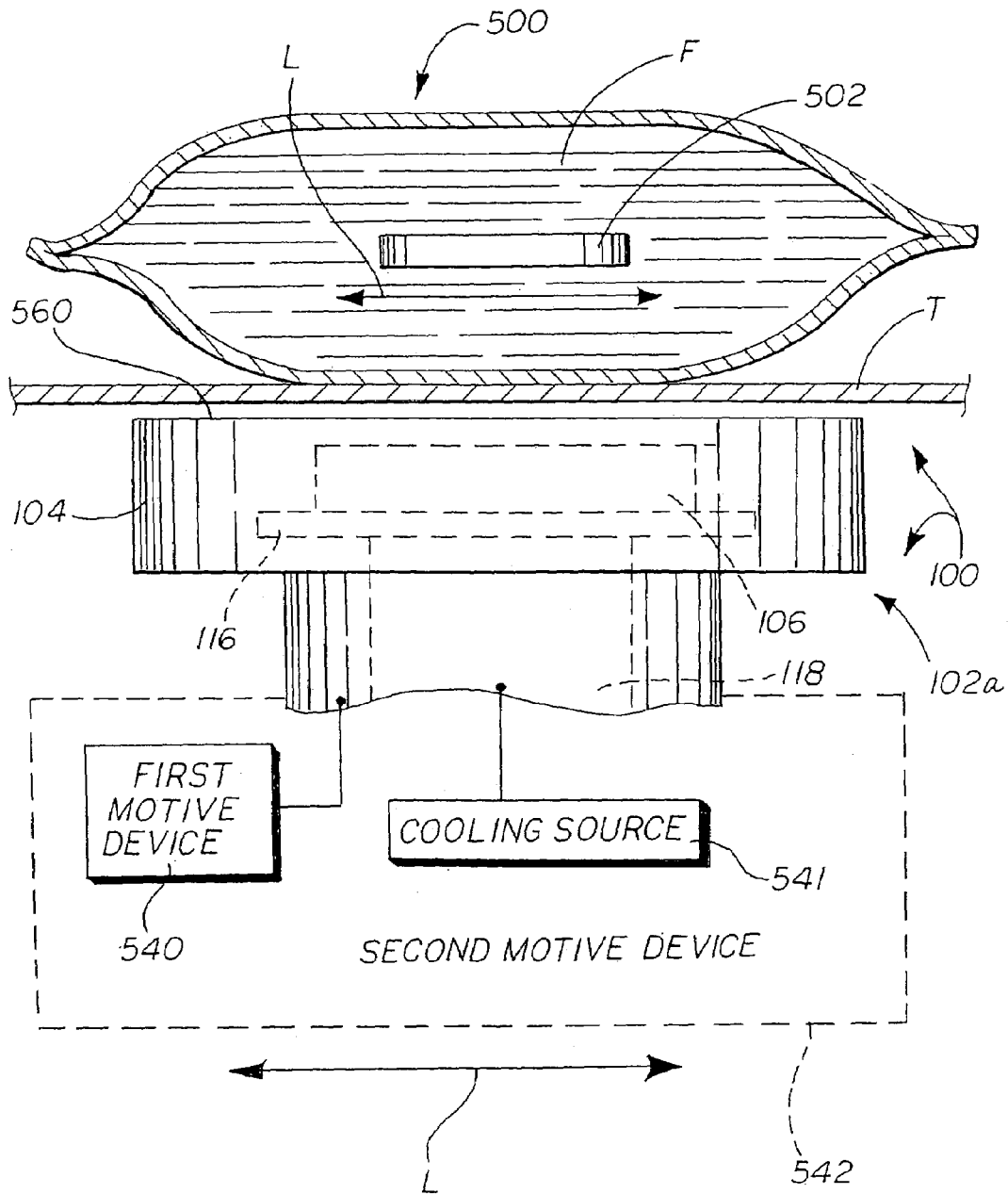
FIG. 14d is an enlarged, partially cross-sectional, partially cutaway side view showing the use of a second motive device in the system of FIG. 14, such as a linear motion device, for moving the superconducting element, and hence, the pumping or mixing element to and fro inside of the vessel.
Figure 14E:
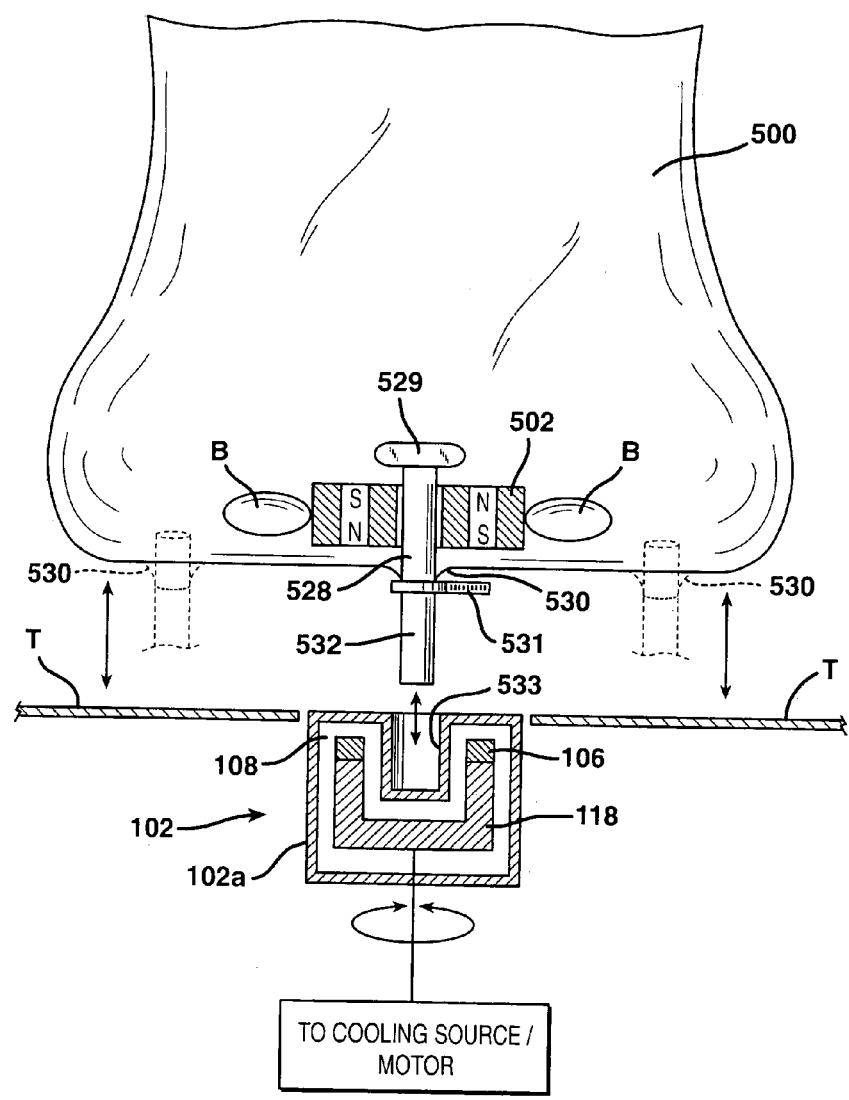
FIG. 14e is an enlarged, partially cross-sectional, partially cutaway side view showing a mixing vessel having centering and alignment structures.

With reference to the schematic view of FIG. 14d, and by way of example only, the particular arrangement is shown in use on the system 100 of FIG. 5, but with the bag 500 of FIG. 14. In addition to a motive device 540 for rotating the first portion of the cryostat 102a (which may comprise the bearing(s) 120, endless belt 128, motor 131, shaft, and pulley) and a cooling source 541, the system 100 may include a second motive device 542. In one embodiment, this second motive device 542 (shown schematically in dashed line outline only in FIG. 14c) is capable of moving the first portion of the cryostat 102a, and hence the superconducting element 106, to and fro in a linear fashion (see action arrow L in FIG. 14c). Thus, in addition to levitating and rotating the pumping or mixing element 502, the side-to-side motion allows it to move relative to the bag 500 or other vessel containing the fluid. This advantageously permits non-localized pumping or mixing action to be provided. The second motive device 542 may include a support structure, such as a platform (not shown) for supporting all necessary components, such as the first portion of the cryostat 102a (or the entire cryostat, such as in the embodiment of FIG. 9), the first motive device 540 for rotating one of the superconducting element 106 (or the pumping or mixing element 502 such as in the embodiment of FIG. 9), and the cooling source 541 (which may form part of the cryostat as shown in FIG. 9, or may be a separate component altogether, as shown in FIG. 2). Instead of using a linear motion device, it should also be appreciated that the second motive device 542 may be capable of moving the superconducting element 106 in a circular or elliptical path relative to the fixed position of the bag 500 or other vessel, or in any other direction that will enhance the overall mixing or pumping action provided by the rotating pumping or mixing element 502. Also, the bag 502 or vessel may be separately rotated or moved to further enhance the operation (see the above-description of the embodiment of FIG. 3).

Ensuring that the pumping or mixing elements are both proper for a particular system and are of the correct shape and size may also be important. To do so, it is possible to provide a transmitter in one of the pumping or mixing element or the vessel for generating a signal that is received by a receiver in the system (or vice versa), such as one positioned adjacent to the superconducting element or elsewhere. An example of one possible configuration is shown in FIG. 14, wherein the transmitter 550 is provided on the pumping or mixing element 502 itself and the receiver 560 is positioned in the cryostat 102 (but see FIG. 14a, wherein the transmitter 550 or receiver 560 is provided in the bag 500 serving as the vessel). A controller for the system, such as a computer (not shown) or other logic device, can then be used to maintain the system for rotating the pumping or mixing element 502 in a non-operational, or "lock-out," condition until the receiver and transmitter 550, 560 correspond to each other (that is, until the transmitter 550 generates an appropriate signal that is received by the receiver 560). The transmitter/receiver combination employed may be of any type well known in the art, including electromagnetic, ultrasound, optical, or any other wireless or remote signal transmitting and receiving devices.

In accordance with another aspect of the invention, a kit is also provided to assist in the set-up of any of the systems previously described. Specifically, and as briefly noted in both this and my prior applications, it is necessary during field cooling to cool the superconducting element to below its transition temperature in the presence of a magnetic field in order to induce levitation in a permanent magnet producing the same magnetic field. This cooling process causes the superconducting element to "remember" the field, and thus induce the desired levitation in the pumping or mixing element each time it or any other magnet having either a substantially similar or identical magnetic field distribution is placed over the superconducting element. While it is possible to use the pumping or mixing element itself to produce the magnetic field required during field cooling, oftentimes the pumping or mixing element will be sealed in the vessel or container. This makes it difficult, if not impossible, to ensure that the magnets held therein are properly aligned and spaced from the superconducting element during field cooling.

Figure 15:
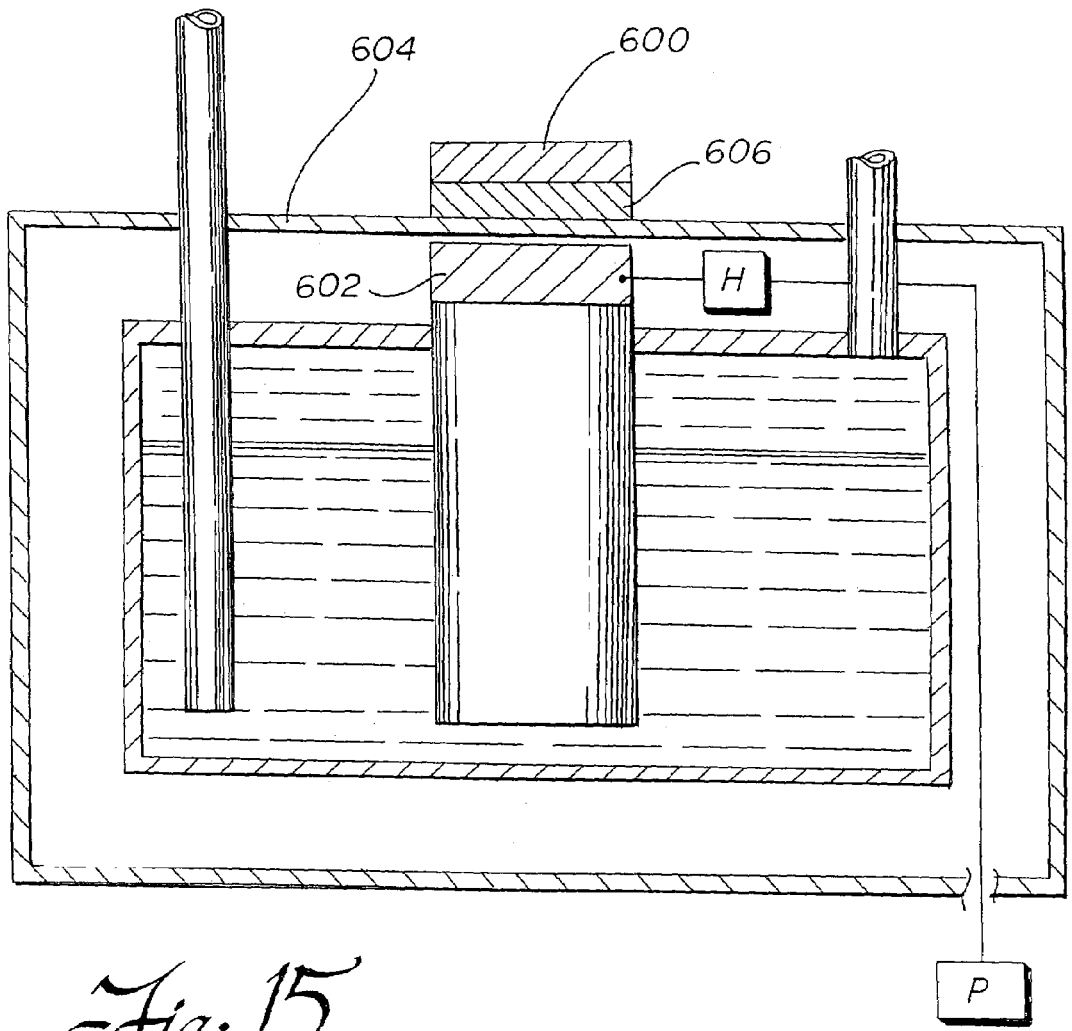
FIG. 15 illustrates one charging magnet including a spacer that may form part of a kit for use in charging the superconducting element as it is cooled to the transition temperature, as well as a heater for warming the superconducting element to above the transition temperature for recharging.

One way to overcome this potential problem is to use a set-up kit. As illustrated in FIG. 15, the set-up kit may comprise at least one charging magnet 600 having a size, shape, and magnetic field distribution that is identical to the levitation magnet contained in the particular pumping or mixing element slated for use in one of the pumping or mixing systems previously described. The charging magnet 600 is placed adjacent to the superconducting element 602, such as on the upper surface of the cryostat 604, table (not shown), or other structure. As illustrated, the charging magnet 600 may further include a spacer 606. This spacer 606 allows the charging magnet 600 to simulate the spacing of the pumping or mixing element (not shown) above the superconducting element 602 during field cooling. This ensures that the desired levitation height is achieved for the pumping or mixing element (not shown) once the vessel is in position. The spacer 606 is formed of a non-magnetic material to avoid interfering with the charging process. By providing a variety of different sizes, shapes, and configurations of charging magnets in the kit (e.g., annular magnets), it is possible to easily perform field cooling for any corresponding size or shape of levitation magnet in the corresponding pumping or mixing element, and then simply place the vessel containing the pumping or mixing element over the superconducting element 602 to induce the desired stable, reliable levitation. It is also possible to field cool the superconducting element 602 while the cryostat 604 is in one orientation, and then reorient it for forming the coupling with the pumping or mixing element (see, e.g., FIG. 14c).

During field cooling, and regardless of whether the pumping or mixing element or a separate charging magnet 600 is used to produce the charging magnetic field, it is possible to unintentionally or accidentally induce an undesired magnetic state in the superconducting element 602, such as if the position of the pumping or mixing element (not shown) or charging magnet 600 is not correct. Since improper charging may prevent the pumping or mixing element from levitating in a stable fashion, recharging the superconducting element 602 may be required. To facilitate recharging the superconducting element, it is provided with a heater H, such as an electric heating coil (not shown). By energizing this coil using a power supply P or other source of electrical current (not shown), the superconducting element 602 may be quickly brought up from the transition temperature for recharging. As shown schematically, the power supply P is preferably positioned externally to the cryostat 604. Once the position of the pumping or mixing element or charging magnet 600 is adjusted or corrected, the heater H may be turned off and the superconducting element once again allowed to cool to the transition temperature in the presence of the desired magnetic field. Yet another embodiment of a system 700 is provided for use with a particular type of vessel including a cavity, such as of the type designed to withstand high internal pressures. Even with this cavity, the system 700 permits a strong magnetic coupling to be formed between an external magnet or superconductor and one or more magnets forming part of an internal mixing element, such as a rotor or impeller, inside the vessel to ensure that stable, reliable levitation is achieved.

Figure 16:
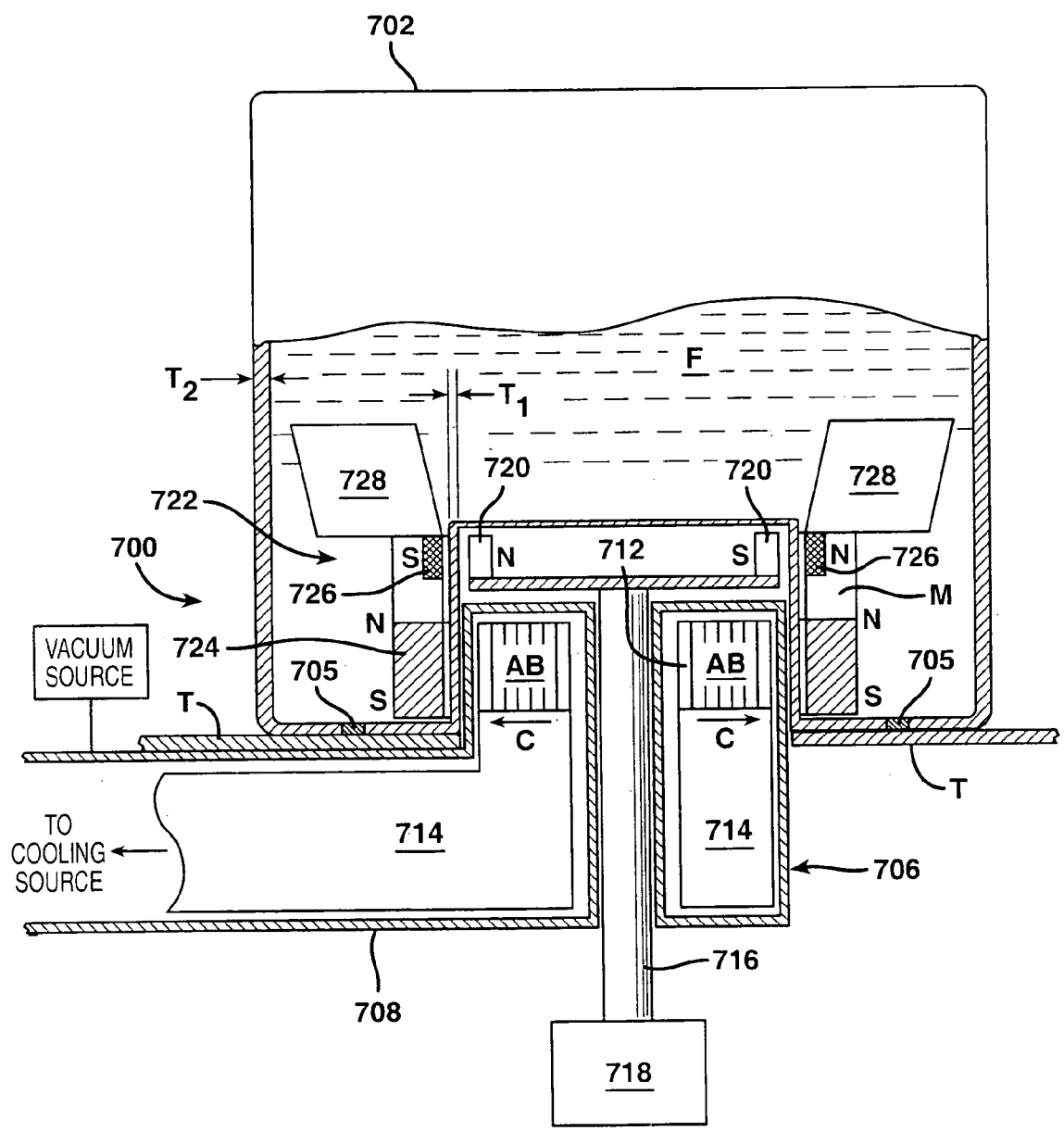
FIG. 16 is as partially cross-sectional, mainly schematic view of an embodiment of the system for use with a vessel having a thin-walled cavity.

As shown in the schematic, partially cross-sectional side elevational view of FIG. 16, the vessel 702 includes a cavity 704 formed in one sidewall thereof. As briefly explained above, the shape of this cavity 704 is preferably cylindrical. In the cylindrical case, this shape allows for the outer sidewall of the cavity 704 to be fabricated having a first thickness $t_1$ (about 2 millimeters in one possible embodiment, but possibly even less), with the remainder of the vessel 702 being formed from the same or a different material having a second, greater thickness $t_2$ (e.g., more than 2 millimeters, and preferably about 7 millimeters). To form a unitary vessel, the cavity 704 may be formed as a separate "hat-shaped" section, including an annular flange that is welded (see weld 705 in FIG. 16) to a corresponding flange (not numbered).

With this construction, the vessel 702 is able to withstand relatively high internal pressures (up to about 7 bar, and possibly greater), yet the relatively thin sidewall of the cavity 704 allows for strong magnet-magnet/magnet-superconductor interactions to be achieved. Of course, the potential reduction in thickness of the sidewalls of the cavity 704 and the upper limit of the internal pressure are directly influenced by the type of material used, with the dimensions provided above corresponding to a vessel 702 formed of conventional non-magnetic stainless steel. Although a cylindrical cavity 704 is shown, it should be appreciated that other equivalent geometric arrangements may also be used, including those having regular or irregular polygonal cross-sections or the like.

To adapt the superconducting levitation scheme described immediately above to a vessel 702 having such a cavity 704, a special "cryostat" 706 may be used, which is generally similar in construction to the one shown in FIG. 9. In the illustrated embodiment, the cryostat 706 includes an external wall 708 that defines an enclosed space or chamber (not numbered). This space is evacuated, such as by using a vacuum source (not numbered), and together with the wall 708 creates a vacuum "jacket" 710 around a superconductor or superconducting element 712 held therein. The superconducting element 712 is preferably a "high temperature" superconducting element formed of melt-textured $ReBa_2Cu_3O_x$, with Re representing a rare earth element (e.g., Yttrium, of which YBCO is a common example), but the use of other such materials either already known or discovered after the filing is of course possible without departing from the broadest aspects of the invention. Also, as is known in the art, the superconducting element 712 may be formed from a single annular or ring shaped piece of material, or as outlined further in the description that follows, may be comprised of a plurality of contiguous or non-contiguous segments or sections, each formed of a piece of superconducting material interconnected or arranged in an annular or substantially polygonal configuration.

In the illustrated embodiment, the superconducting element 712 is positioned in a "head" portion of the cryostat 706 sized and/or otherwise adapted for extending or projecting into the cavity 704 formed in the vessel 702. The cryostat 706 also includes or houses a thermal link 714 for supplying the cooling that keeps the element 712 in the desired superconducting state. As described above, the thermal link 714 is preferably formed of a material having a high degree of thermal conductivity/low thermal resistance (metals, such as copper, brass, or the like). Although not critical, the link 714 may include an engagement portion corresponding generally in size and shape to the superconducting element 712 to ensure that the desirable full contact and engagement is established between the corresponding surfaces to improve thermal transfer. As also described above, the thermal link 714 is connected to a cooling source, such as a Dewar flask filled with a liquid cryogen, a closed cycle refrigerator, or the like (see, e.g., FIG. 9). It should be appreciated by skilled artisans that the particular cooling source or thermal link used is not important or critical, as long as it is capable of maintaining the element 712 in the desired superconducting state to induce levitation in the mixing element 722.

Figure 16A:
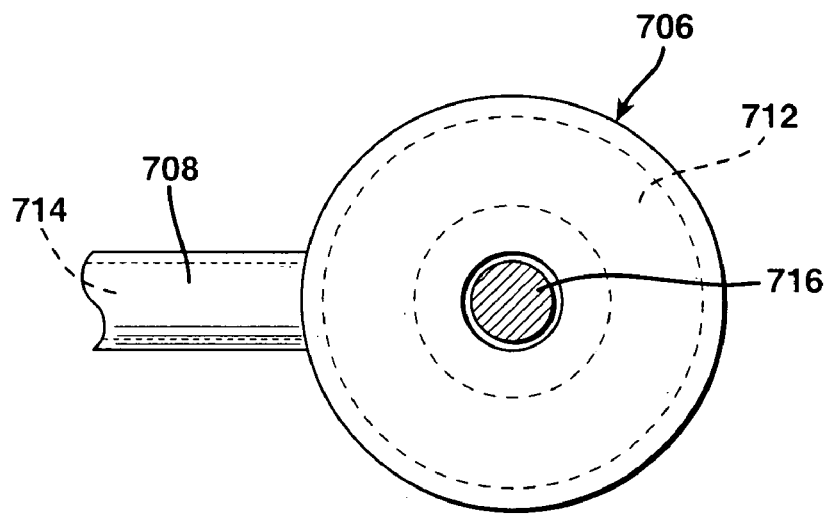
FIG. 16a is a partially cutaway, partially cross-sectional top view of the cryostat of FIG. 16.

As with the embodiment in FIG. 9, the outer wall 708 of the cryostat 706 may be configured to create a bore or opening that allows for a shaft 716 or the like to pass therethrough (see FIG. 16a). One end of the shaft 716 is coupled to a motive device, such as a motor 718, while the other carries a plurality or array of drive magnets 720. The drive magnet array 720 is preferably positioned in close proximity to the inside surface of the sidewall of the cavity 704, and is comprised of a plurality of magnets having alternating polarities or polar orientations (with the N-S poles preferably being arranged perpendicular to the vertical plane and spaced sufficiently close to the wall of the cavity 704 to create the strongest possible magnetic coupling, and hence, the most efficient torque transfer).

Turning now to the mixing element 722, it is preferably in the form of a rotor or impeller comprised of a hollow, substantially cylindrical or tubular body sized so as to permit a concentric orientation with the cylindrical cavity 704 inside the vessel 702. The mixing element 722 may comprise a levitation magnet 724 generally corresponding in shape and proportional in size to the superconducting element 712, and preferably having its poles oriented in a direction parallel to a vertical plane. Spaced from the levitation magnet 724, and preferably embedded in a matrix material M, is an array of strategically positioned driven magnets 726. The driven magnets 726 correspond generally in size and shape to the array of alternating polarity drive magnets 720 carried on the shaft 716. The driven magnets 726 are also of alternating polarity to create the desired magnetic coupling with the drive magnets 720 for transmitting the drive torque from the motive device, such as the motor, to the shaft 716, and ultimately to the levitating mixing element 722. As shown in FIG. 16, the mixing element 722 may also carry one or more blades 728, vanes, or the like to further enhance the mixing action provided (or pumping action, in the case of a pumping chamber having a cavity bottom).

Hence, as depicted in FIG. 16, it is possible to easily adapt the mixing system 700 for use with a vessel 702 having a thin-walled cavity 704 that is nevertheless capable of withstanding high pressures, such as those possibly created during cleaning or sterilization. As an example of one possible application, the vessel 702 may thus be pre-sealed with the magnetic mixing element 722 (e.g., rotor or impeller) inside, and then simply placed over the cryostat 706, such as by positioning the vessel on an adjacent stable support surface, such as a table, support platform, stand or the like (see reference character T in FIG. 16). Assuming that field cooling has previously been completed (such as by using a "kit" for supporting a corresponding "set-up" magnet adjacent to the superconducting element 712 during cooling, which in this case could be an annular set-up magnet, as opposed to the disc-shaped one in FIG. 15), the vessel 702 is simply positioned over the cryostat 706, as shown in FIG. 16, such that the magnetic field of the permanent levitation magnet 724 creates the desired flow of current through the superconducting element 712 to achieve the simultaneous attraction and repulsion that results in stable levitation.

Figure 17:
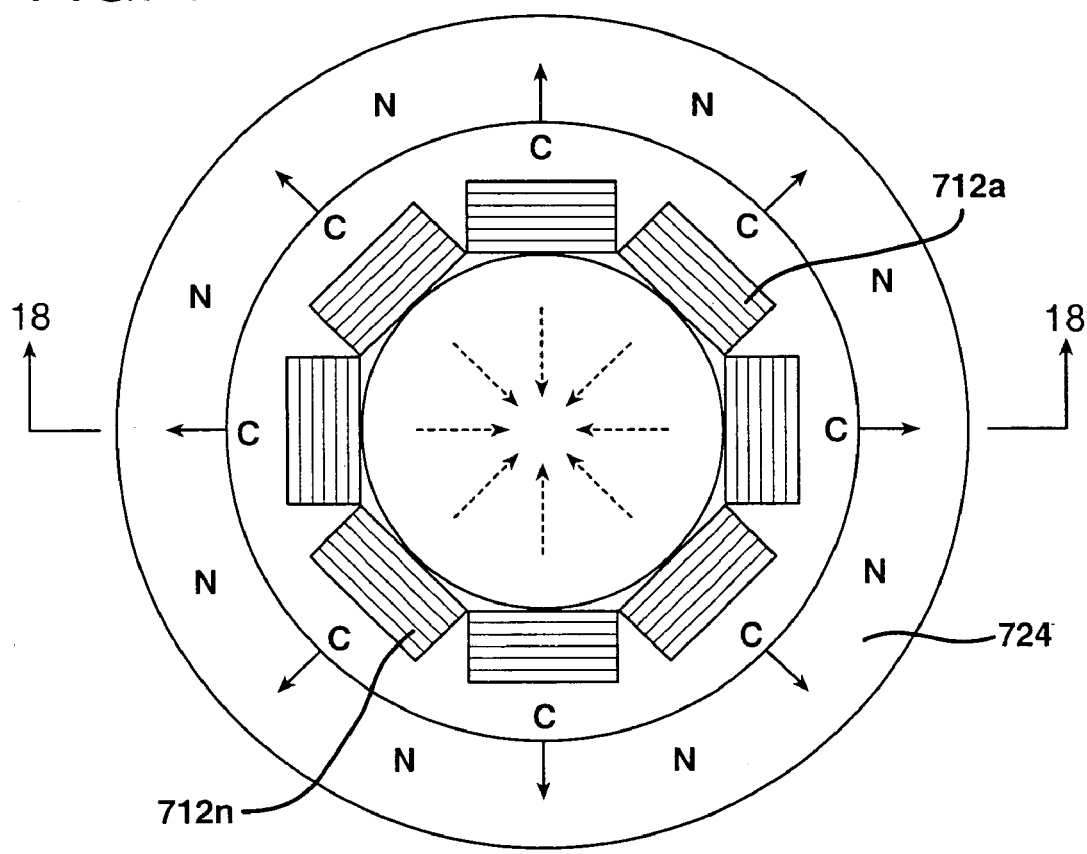
FIG. 17 is an enlarged, schematic view showing a superconductor or superconducting element comprised of a plurality of segments of a superconducting material having crystallographic planes for levitating a concentric annular levitation magnet, and showing in particular a desired orientation of the crystallographic C-axis of each segment relative to the magnetization vector of the levitation magnet.
Figure 18:
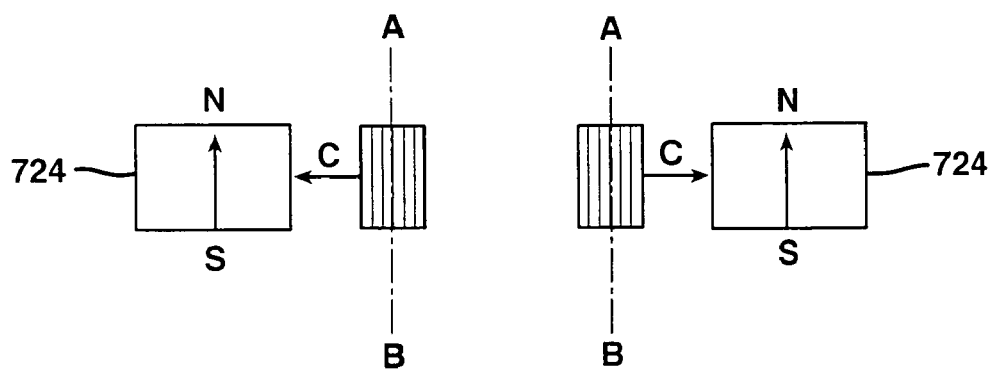
FIG. 18 is a cross-sectional view taken along line 18-18 of FIG. 17.

During experimentation using the system 700, it was discovered that it may be advantageous in terms of levitational stability to form the superconducting element 712 of a plurality of segments of the melt-textured/melt-processed rare-earth superconductor described above, with the particular orientation of the crystallographic axis or planes of each segment being selected to significantly enhance the magnetic stiffness of the coupling, as well as the load capacity of the levitating mixing element 722. Specifically, as shown in FIG. 17, which is a plan schematic view of the levitation magnet 724 and a plurality of segments $712a \ldots 712n$ formed of a superconducting material having crystallographic planes (see below) and arranged in a non-contiguous polygonal configuration, and FIG. 18, which is a cross-sectional view of the same taken along line 18-18 of FIG. 17, the crystallographic "C-axis" of each superconducting segment $712a \ldots 712n$ is oriented in a radial direction, or in the illustrated embodiment, substantially perpendicular to the magnetization vector of the levitation magnet 724, and preferably passes through the center thereof. Accordingly, the A-B planes are oriented substantially parallel to the polar magnetization axis of the levitation magnet 724. Superconducting materials having these crystallographic planes/axes include those comprised of $ReBa_2Cu_3O_x$, formed by a melt-texturing or "melt-processing," as is known in the art (see, e.g., U.S. Pat. No. 5,747,426 to Abboud, the disclosure of which is incorporated herein by reference).

Using this arrangement, it was found that the levitation force, magnetic stiffness, and concomitant load capacity of the levitation magnet 724 is increased on the order of two to three times without a corresponding change in any other parameter of the system 700 described above. Of course, these increases serve to enhance the rotational stability of the mixing element 722 when such an arrangement is used in a pumping or mixing system, which in turn improves the operational reliability. These increases also advantageously reduce the tendency of the pumping or mixing element 722 to decouple at higher rotational speeds or in pumping or mixing high viscosity fluids or the like.

It is also noted that the system 700 is generally described above as a mixing system for use with vessels 702 or containers capable of withstanding high pressures. However, it should also be appreciated that the system 700 could also be used for the mixing or pumping of fluids through a vessel 702 in the form of a flexible, open-top container or any other type of container having the cavity 704 or a similar configuration. Of course, the strategic orientation of the elements of a segmented superconductor could also be used to enhance the levitational and rotational stability of a pumping or mixing element used in any of the systems described herein as well.

Figure 19A:
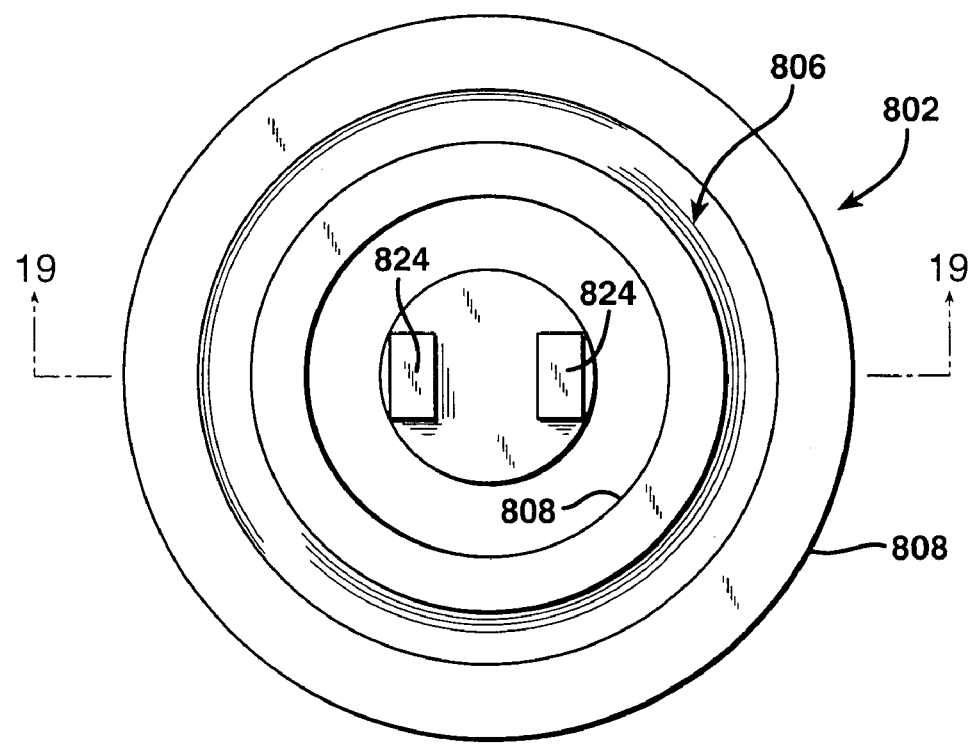
FIG. 19a is a top view of the cryostat and a portion of the motive device in the system of FIG. 19.
Figure 19:
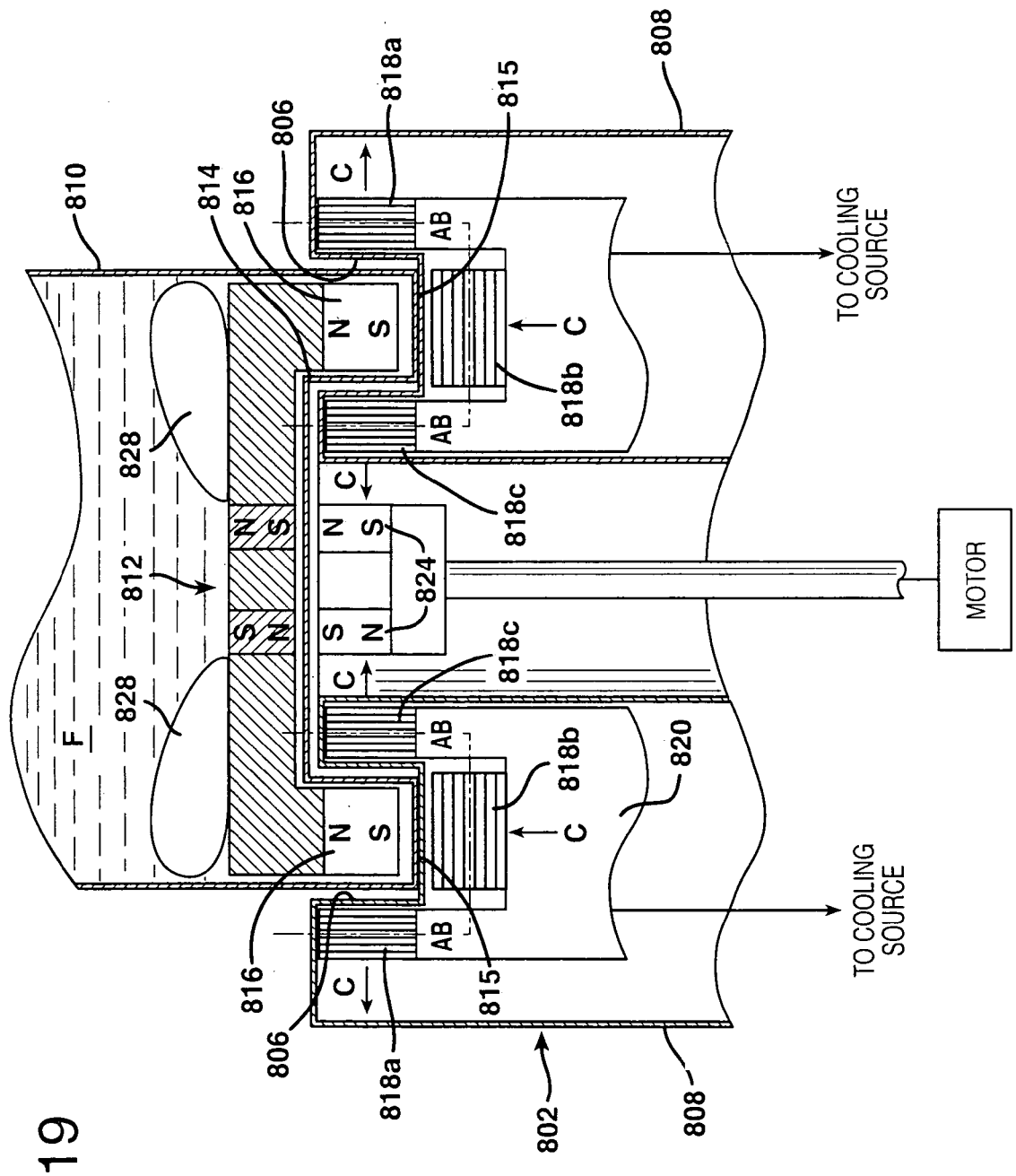
FIG. 19 is an embodiment wherein a plurality of superconductors or superconducting elements are used to levitate a pumping or mixing element in a fluid containing vessel, and again showing in particular a desired orientation of the crystallographic C-axis of each segment relative to the magnetization vector of the levitation magnet.

Yet another embodiment of a pumping or mixing system 800 is proposed in FIG. 19. Perhaps the best way to describe this embodiment is to begin with a description of the vessel 810 and the pumping or mixing element 812. The vessel 810, like vessel 702, is preferably created having a cavity 814 that defines a concentric annular protruding portion 815. Preferably, the wall defining each side of cavity 814 and each side of the annular portion 815 is fabricated of a relatively thin, non-magnetic material, such as stainless steel. As noted above with regard to vessel 702, by forming the remainder of the vessel 810 having relatively thick sidewalls, it may withstand high pressures, such as those created during sterilization using steam under pressure or the like. However, in the case where the vessel 810 is not subjected to high pressures or is used as a pumping chamber, the walls may be formed of a substantially homogeneous material (disposable plastics, glass, stainless steel, etc.) having substantially the same relative thickness. A description of an embodiment wherein a flexible plastic bag is provided with a cavity is described below and shown in FIG. 22.

The pumping or mixing element 812 is capable of being positioned in the vessel 810 and includes a levitation magnet 816. In particular, the levitation magnet 816 is sized and shaped for extending into the interior of the annular portion 815 of the vessel 810. In the illustrated embodiment, the levitation magnet 816 is polarized in the vertical direction (the specific orientation of the poles is not critical) to create a vertical magnetization vector. However, the magnetization vector could also be oriented in a horizontal or substantially horizontal plane (although those skilled in the art will recognize that forming a single ring shaped magnet having opposite poles oriented in a horizontal plane is more difficult than forming one having a vertical magnetization vector).

To levitate the pumping or mixing element in the vessel 810, at least one, and preferably a plurality of superconducting elements 818 are positioned in an annular cryostat 802. This cryostat 802 is specially adapted for receiving the annular protruding portion 815 of the vessel 810 (see FIG. 19a) and may even support the vessel, as shown in FIG. 19. More specifically, in the illustrated embodiment, the cryostat 802 includes an annular channel 806 for receiving the corresponding annular portion 815 of the vessel 810. The outer wall 808 of the cryostat 802 defines a space or chamber that is preferably evacuated to create a vacuum jacket, as described above. Alternatively, the chamber could be filled with an insulating material to reduce the thermal transfer. Regardless of the means used, the important point is that in the case of pumping or mixing non-cryogenic, warm or temperature sensitive fluids, no or only negligible thermal transfer from the cold superconductor to the vessel and hence the fluid results.

Preferably, the superconducting elements 818 are comprised of a plurality of segments, each of which is in thermal communication with a cooling source (e.g., a Dewar flask or a closed-cycle refrigerator) via a thermal link 820 positioned and supported in the cryostat 802. The segments comprising each of the one or more superconducting elements 818 are preferably formed of a "high-temperature" superconducting material having crystallographic A-B planes and a C-axis, which as noted above, is a characteristic of melt-textured or melt-processed $ReBa_2Cu_3O_x$, with Re representing a rare earth element (e.g., Yttrium, of which YBCO is a common example).

In the preferred embodiment, three superconducting elements 818a, 818b, 818c are provided on the thermal link 820, although it should be appreciated from reviewing the description that follows that using only a single superconducting element or two superconducting elements to levitate the pumping or mixing element 812 is entirely possible (see FIG. 16). A first of the superconducting elements 818a is positioned adjacent to a first side of the annular channel 806 formed in the cryostat 802 adjacent to a first side of the annular levitation magnet 816. The second superconducting element 818b is also positioned adjacent to a second side of the annular levitation magnet 816. The third superconducting element 818c is positioned adjacent to a third side of the annular levitation magnet 816. Each of the superconducting elements 818a, 818b, 818c may be in thermal communication with the same thermal link 820, as shown in FIG. 19 and positioned internal to the corresponding cryostat 802, which by way of insulation or vacuum jacket prevents any thermal transfer to the room temperature vessel 810, the fluid F held therein, or the pumping or mixing element 812.

In a most preferred version of this embodiment, the crystallographic planes/axes of the segments forming the superconducting elements 818a, 818b, 818c are oriented so as to significantly improve the levitation force, the resulting loading capacity, and the magnetic stiffness of the coupling formed with the pumping or mixing element 812. Specifically, the first and third superconducting elements 818a, 818c (or more particularly, the segments comprising these elements) are oriented such that the C-axes thereof are perpendicular to the magnetization vector of the levitation magnet 816, while the second superconducting element 818b is oriented such that the C-axis of each segment thereof is aligned with and parallel to the magnetization vector of the levitation magnet 816. Another way to describe the arrangement is that the A-B crystallographic planes of the first and third superconducting elements 818a, 818c are parallel to the axis of polarization of the levitation magnet 816, while the A-B crystallographic planes of the second superconducting element 818b are perpendicular to the polarization axis (note the substantially parallel lines representing the A-B planes drawn on each superconducting element 818a-c in FIG. 19). As used herein, the terms "parallel" and "perpendicular" are intended to mean generally or substantially parallel or perpendicular, it being recognized that variations in the orientation of the various crystallographic planes or axes relative to the magnetization vector are either inherent or may be created by slight misalignments of adjacent elements, or may be intentionally varied within a range to adjust or fine tune the levitation force provided or rotational stability.

The particular arrangement shown in FIG. 19 results in a system 800 in which the pumping or mixing element 812 is levitated in a most stable fashion. This stable levitation results primarily from the interaction between the specially oriented segments forming each superconducting element 818a-c and the annular levitation magnet 816. As a result of this arrangement, the loading capacity of the pumping or mixing element is increased, as it the stiffness of the magnetic coupling. This combination allows for a greater amount of torque to be supplied to the pumping or mixing element 812 without accidental decoupling, which allows for higher angular velocities to be achieved. It also allows for use of the system 800 with fluids having higher viscosities.

The drive system for rotating the pumping or mixing element may be substantially as described above. Specifically, a shaft 822 coupled at one end with a motive device, such as a motor 824, is positioned in a room temperature bore or through an opening formed in the cryostat 802. The end of the shaft 822 adjacent to the vessel 810 carries a plurality of drive magnets 824 having alternating polarities. Corresponding driven magnets 826 having alternating polarities are provided on the pumping or mixing element 812. As shown in FIG. 19, the pumping or mixing element may also include impeller blades 828, vanes, or like structures to further enhance the pumping or mixing action provided.

In accordance with yet another embodiment of the present invention, a specific pumping or mixing system 900 using a rotating superconducting element 901 is shown in FIG. 20.

The superconducting element 901 may be supported by a plate 902 in thermal engagement with a cooling source forming a part of a cryostat 903 and preferably rotating therewith. The superconducting element 901 is surrounded by a wall 905 defining an evacuated chamber 906, which may together be considered to form a vacuum jacket comprising part of the cryostat 903 (although as described above the chamber 906 could also be insulated or any other known or yet-to-be discovered means for obviating thermal transfer between a cold superconducting element could be used).

In the illustrated embodiment, the cooling source is a portable refrigerator or "cryocooler" 904 that also forms part of the cryostat 903. The cryocooler 904 is shown as having a "head" end 905 that extends into the chamber 906 to directly engage and support the plate 907 which in turn supports the superconducting element 901, although the use of a separate thermal link (not shown) is also possible, depending on the relative dimensions of the system. As with the thermal link previously described, both the plate 902 and the head end 907 of the cryocooler are typically formed of a material having a high degree of thermal conductivity/low thermal resistance (e.g., a metal) to ensure that the desirable efficient thermal transfer is established. The plate 902 may also be supported from the wall 905 by one or more connecting members 908, which are preferably thin, but relatively strong, and formed of a material having a low degree of thermal conductivity so as to create only negligible thermal transfer to the wall 905.

The cryostat 903 is rotatably supported by at least one, and preferably a pair of bearings or bearing assemblies 909a, 909b, which are in turn supported by a stable support structure, such as an adjacent vertical wall VW or another type of support frame (which may or may not engage the adjacent structure, such as table T, supporting the vessel). For example, one bearing may engage the outer wall 905 of the cryostat 903, while the other engages the outer wall of the cryocooler 904. The use of two bearing assemblies 909a, 909b of course ensures that the cryostat 903 rotates about a vertical center axis in a most stable and reliable fashion and is capable of resisting any skewing forces, and may also allow it to be turned on its side (such as it would appear if FIG. 20 is oriented in a landscape view, rather than a portrait view). As shown in FIG. 20, the bearing assemblies 909a, 909b may include mechanical roller or ball bearings, or other elements that may provide low-friction, rotatable support the cryostat 903.

To transmit the desired rotational motion, an endless belt 910 may be placed in frictional engagement with a first pulley 911 coupled to or carried by the cryostat 903. The belt 910 also engages a second pulley 912 supported by the shaft 914 of a motive device 916, such as a variable speed electric motor. As should be appreciated, the rotation of the shaft 914 thus causes the cryostat 903, and hence, the superconducting element 901 positioned therein to rotate. As noted above, the cryostat 903 could also be mounted "inline" on a shaft that is in turn connected or coupled directly to a motive device, such as an electric motor.

One particularly preferred example of a commercially available closed-cycle refrigerator or cryocooler 904 for use in the present invention is a type of substantially self-contained, compact, closed-cycle cryocooler employing the Stirling cycle to produce the desired refrigeration, several models of which are manufactured and distributed by Sunpower, Inc. of Athens, Ohio. As shown schematically in FIG. 20, this cryocooler 904 includes a lower portion 904a which serves to house an electric motor and an upper portion 904b adjacent to the head 907 which houses a reciprocating piston (not shown). In light of the commercial availability of several suitable models, the workings of such a cryocooler need not be understood to practice the present invention. However, it is noted that Sunpower, Inc. holds a number of U.S. patents on various types of cryocoolers, each of which is incorporated herein by reference to the extent deemed necessary to allow a skilled artisan to make or use this invention. Regardless of the type of cooling source used, the important point is that it is fully capable of generating the "high temperatures" (e.g., 77K-90K) necessary to induce a superconducting state in, for example, a YBCO superconducting element (which may be comprised of a plurality of segments, as described below).

To supply the necessary power to the cryocooler 904 such that it keeps the superconducting element 901 at the desired temperature, yet allows it to rotate even at high speeds, a dynamic electrical connection is provided. Specifically, contacts 918, which are shown in the form of annular rings surrounding the outer wall of the cryocooler 904, are provided for engaging corresponding "stationary" flexible or pivoting contacts 920 in electrical communication with a power source 922 (120/220V), which may be remote. As should be appreciated, this configuration allows the cryocooler 904 to freely rotate at both high and low speeds while continuously receiving the power necessary to run the motor/drive the piston and keep the head end 907 at the desired cold temperature. Instead of this illustrated configuration, a well-known type of dynamic electrical connection called a "slip ring" may be used, such as those manufactured by Siemens, Litton, and the Kaydon Corp. A slip ring is also sometimes referred to in the art as a "rotary electrical interface," a "commutator," a "swivel," or a "rotary joint."

Figure 22:
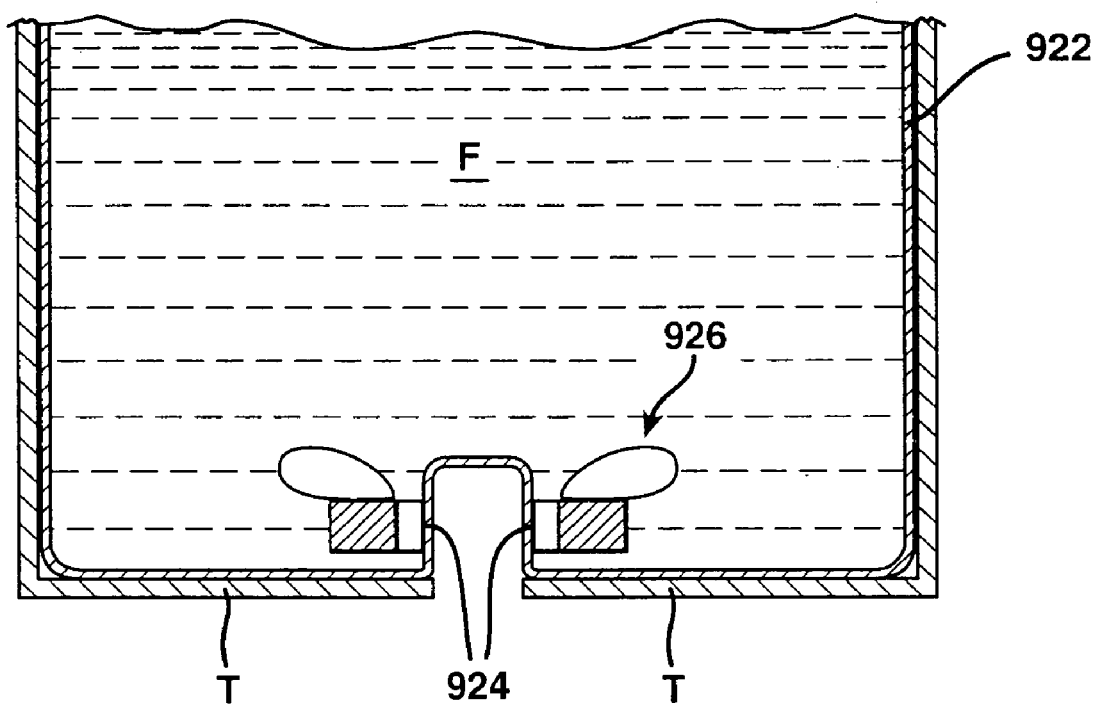
FIG. 22 illustrates a flexible bag or container having a cavity formed therein, which in addition to receiving the head end of the cryostat may also act as a centering post for a concentric pumping or mixing element.

The system described above can be substituted into the system 100 shown in FIGS. 5-7 for rotating a pumping or mixing element in the form of a flat, disc-shaped rotor or impeller 134 for pumping or mixing a fluid in a flat-bottomed rigid vessel or bag. In that case, the plate 902 could be eliminated and a disc-shaped superconducting element, such as element 106, used in its place. However, in FIG. 20, the vessel 922 is illustrated having a cavity 924, which may of course be similar in construction to the cavity provided in a vessel capable of withstanding high internal pressures, as described above and shown in FIG. 16. Alternatively, the cavity 924 could be formed in a conventional open-top vessel, in a flexible bag or container (see FIG. 22), or in any other type of vessel used in applications where high pressures are not a concern. In the case where the cavity 924 is formed in a flexible bag or container, as shown in FIG. 22, is should also be appreciated that the cavity 924 may serve a function similar to that of centering post 528 shown in FIG. 14b (and could even include a peripheral flange, projections, or like structures at the upper end to ensure that the pumping or mixing element 926 remains fully held in place during shipping, storage, or between uses, yet spaced far enough away to avoid creating any interference with the desired levitation/rotation).

In any case, in the embodiment in FIG. 20, the pumping or mixing element 926 is substantially cylindrical and includes only a levitation magnet 928, since both the levitation force and the driving torque are provided by the superconducting element 901. This levitation magnet 928 may be comprised of a plurality of segments of permanent magnets 928a . . . 928n having alternating polarities and arranged in a substantially annular or polygonal configuration (see the schematic illustration merely showing a preferred orientation/arrangement in FIG. 21). As also shown schematically in FIG. 21, the superconducting element 901 is concentric with the levitation magnet 928 and is also comprised of a plurality of segments 901a . . . 901n arranged in an annular or polygonal configuration. Preferably, each segment 901a . . . 901n is oriented having its crystallographic C-axis aligned in the radial direction (i.e., oriented generally parallel to the magnetization vector of a corresponding segment 928a . . . 928n of the permanent magnet 928, and preferably passing substantially through the center thereof). Accordingly, the A-B planes of the segments 901a . . . 901n comprising the superconducting element 901 are oriented generally perpendicular to the radial direction, and hence, the magnetization vector. As a result of this arrangement, the rotating superconducting element 901 not only reliably induces stable levitation in the pumping or mixing element 926 via levitation magnet 928, but also forms a magnetic coupling which causes the pumping or mixing element 926 to rotate. As shown in FIG. 20, the pumping or mixing element 926 may also carry one or more impeller blades, vanes, wings, or like structures 930 to further enhance the pumping or mixing action.

Figure 23:
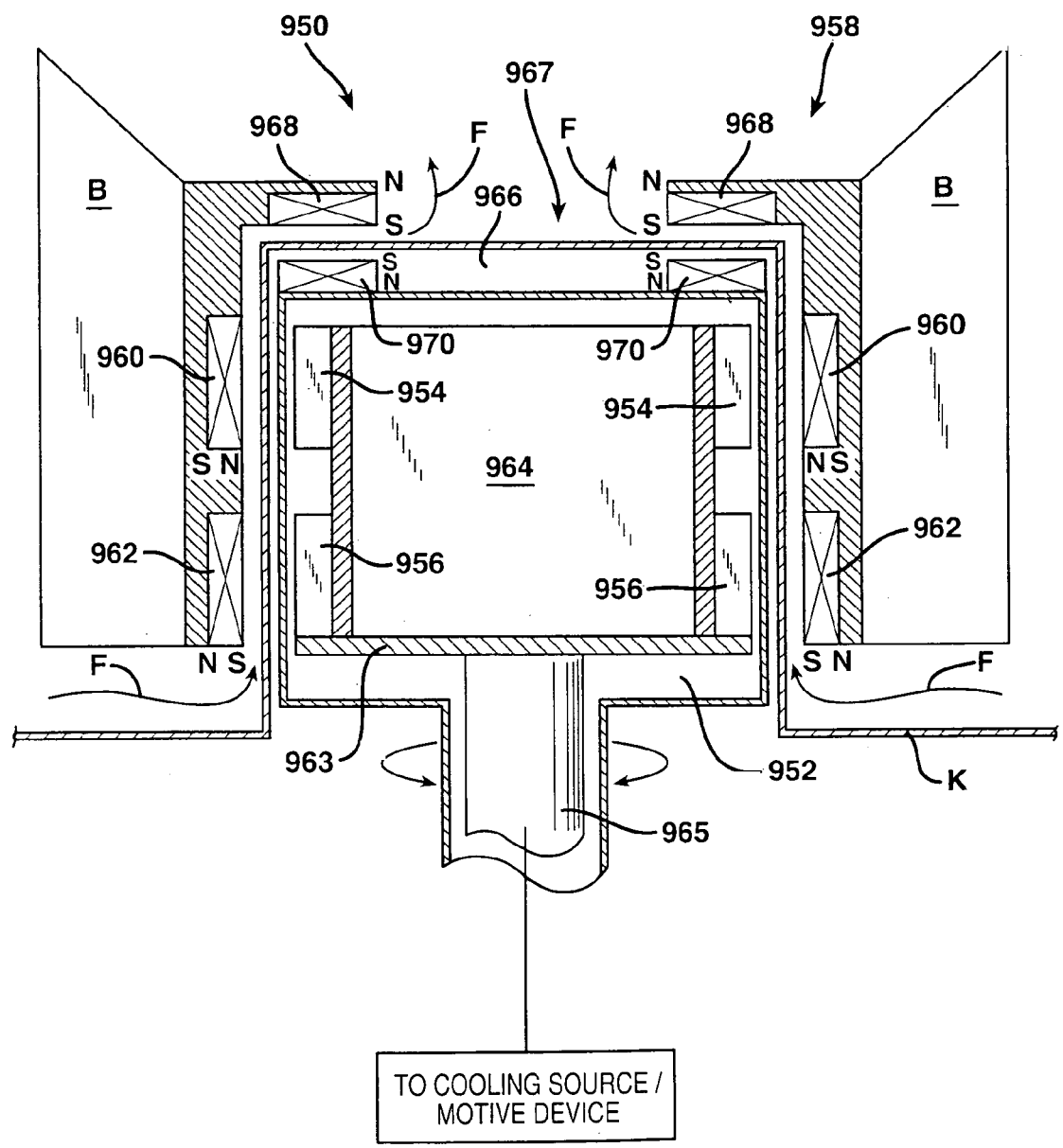
FIG. 23 illustrates an embodiment where permanent magnets are used to provide a levitation-assist function to prevent the pumping or mixing element from contacting the adjacent vessel.

FIG. 23 shows an embodiment of the pumping or mixing system 950 for use with a vessel (such as a tank K, but any vessel disclosed herein would also work) having a cavity that is generally similar to the embodiment shown in FIG. 20 with a few modifications. The first is that the rotating cryostat 952 includes two arrays of superconducting elements 954, 956, with each array spaced in the vertical direction. The pumping or mixing element 958 includes corresponding arrays of alternating polarity magnets 960, 962 (see, e.g., FIG. 21), with each magnet in the array 960 having a neighboring magnet with an alternating polarity. The rotation of the cryostat 952 and, hence, the superconducting element arrays 954, 956 thus induces both levitation and rotation in the pumping or mixing element 958 (which is shown having a plurality of upstanding blades B). As should be appreciated, the dual arrays enhance the vertical stiffness of the coupling and improve torque transfer.

The superconducting element arrays 954, 956 are supported on a thermally conductive platform 963 by an upstanding cylindrical wall 964. The platform 963 in turn is coupled to a rod 965 serving as a thermal link to a cooling source, such as the SUNPOWER cryocooler described above or a Dewar flask filled with a liquid cryogen, which is in turn coupled to a motive device (shown in block form only, but see FIG. 20 for an example of one possible embodiment). As noted above, insulating or evacuating the chamber 966 in the cryostat 952 prevents the cold superconducting element arrays 954, 956 from cooling the adjacent tank K to any significant degree, which means that the system is well-adapted for pumping or mixing non-cryogenic fluids, including room-temperature fluids.

The embodiment of FIG. 23 also differs from the one shown in FIG. 20 in that the pumping or mixing element 958 carries a first ring magnet 968 (or an equivalent array of magnets, such as vertically polarized magnetic discs (not shown)). A corresponding ring magnet 970 (or array of magnets) is carried by the rotating cryostat 952 (preferably externally and at the top, as shown in FIG. 23). The first ring magnet 968 and the second ring magnet 970 are oriented such that like poles are adjacent to each other. This magnet-magnet interaction thus repels the pumping or mixing element 958 from the cryostat 952. However, the interaction between the superconducting element arrays 954, 956 and the arrays of magnets 960, 962 together generally levitate and hold the pumping or mixing element 958 in place. The net result is that the pumping or mixing element 958 is levitated, but is able to resist any force tending to move it into contact with the tank K, including the outer surface of the adjacent cavity.

Another distinction in the illustrated embodiment is that the pumping or mixing element 958 is generally cylindrical and includes an opening 967. As a result of this construction, when the pumping or mixing element 958 is rotated, fluid is drawn into the gap between it and the adjacent cavity in the tank K (see action arrows F). The fluid then passes through the opening 967, which enhances the fluid agitation created by the rotation of the pumping or mixing element 958, even at relatively low angular velocities.

Figure 24:
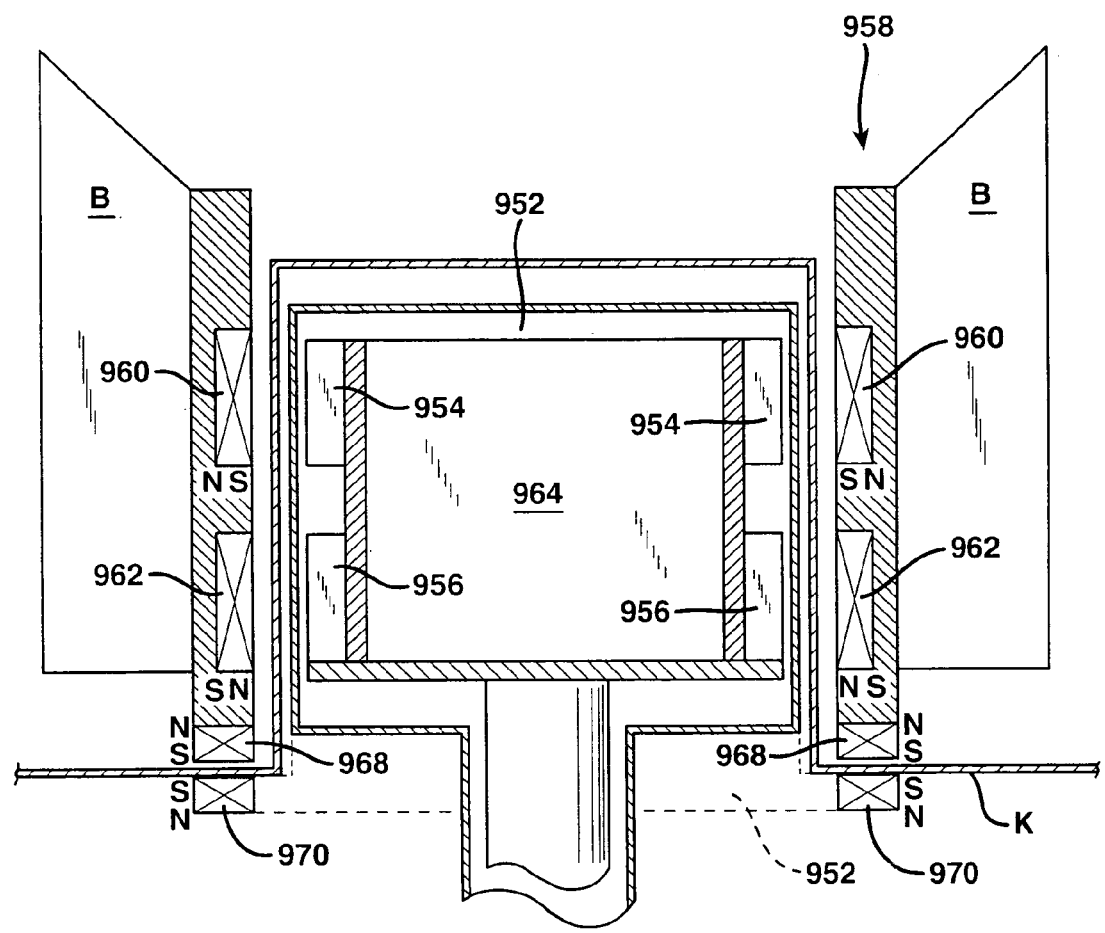
FIG. 24 is another embodiment where permanent magnets are used to provide a levitation-assist function to prevent the pumping or mixing element from contacting the adjacent vessel.

A related embodiment is shown in FIG. 24. In this embodiment, the first ring magnet 968 (or array) is again provided on or in the pumping or mixing element 958, but the second ring magnet 970 (or array) is positioned external to the tank K. Again, the rings 968, 970 have like polarities along the adjacent faces to create a repelling force. In this case, this force helps to prevent the pumping or mixing element 958 from "bottoming out" on the adjacent surface of the tank K. Although not preferred for most applications due to the clean-up and sterilization problems possibly created, the second ring magnet 970 could be positioned just inside the tank K as well. Instead of attaching the ring magnet 970 to the tank K, it could also be supported by the cryostat 952, such as a flange (note dashed lines in FIG. 24) or a related structure that rotates therewith. Also, the possibility of providing neighboring magnets in each array 960, 962 with like polarities is shown (with the polarities of vertically adjacent magnets in each array still alternating), which is somewhat less preferred than the embodiment of FIG. 23 in which the polarities of neighboring magnets in each array alternate.

Figure 25:
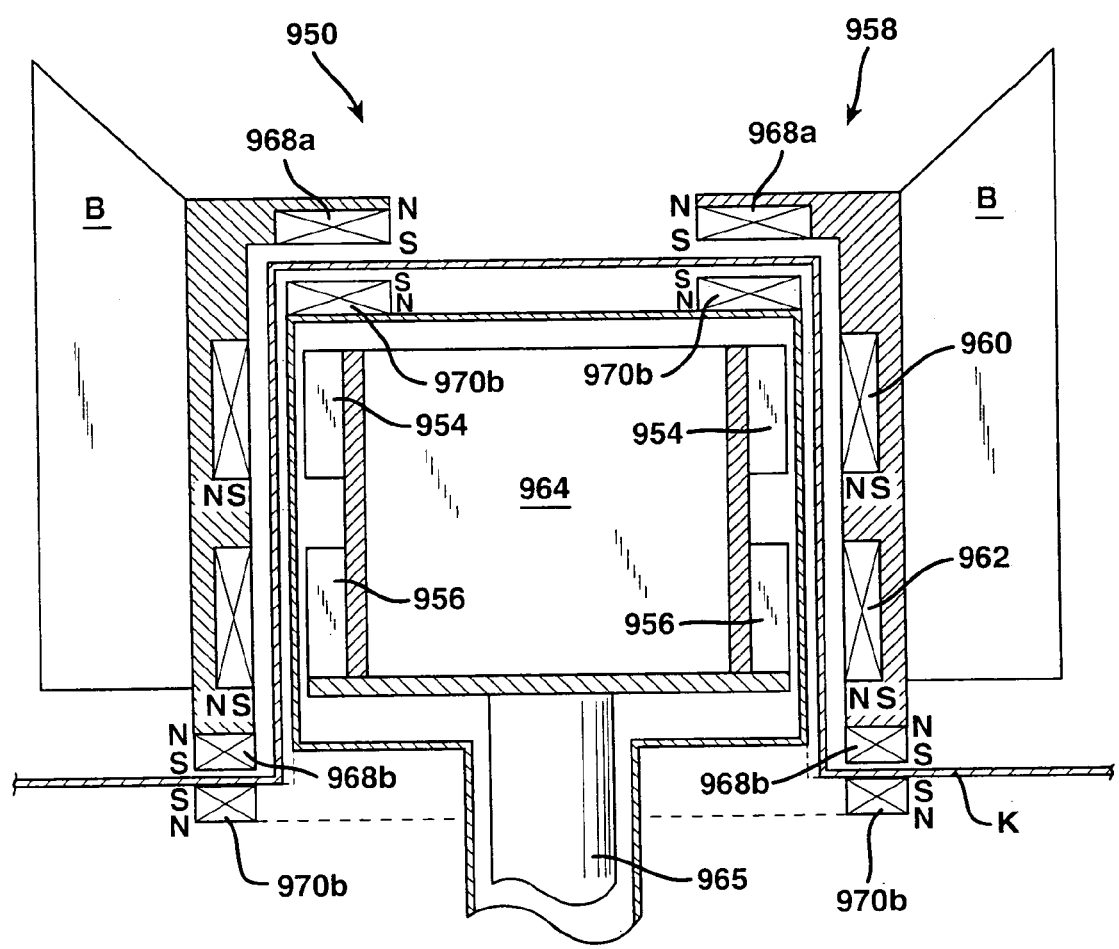
FIG. 25 is yet another embodiment where permanent magnets are used to provide a levitation-assist function to prevent the pumping or mixing element from contacting the adjacent vessel.

These two approaches could also be combined into the same system, as shown in FIG. 25. In particular, first and second ring magnets 968a, 970a are provided in one portion of the pumping or mixing element 958, and third and fourth ring magnets 968b, 970b are provided in another. The repelling forces created thus provide dual levels of protection against the rotating pumping or mixing element 958 inadvertently contacting the vessel or tank K. Also, either or both approaches could be used in the embodiments of FIG. 16 or 19 as well. Also note that the polarities of adjacent magnets in the arrays 960, 962 are alike, although each vertically adjacent pair has a different polarity that the next-adjacent pair. This is somewhat less preferred than the arrangement of FIG. 23 in terms of stiffness, but would work nevertheless.

By switching the polarities, it is also possible to provide one or more sets of magnets like ring magnets 968, 970 that attract, rather than repel each other. The attractive force thus created may help to prevent the pumping or mixing element 958 from moving in a vertical direction relative to the cavity as it rotates (or in the horizontal direction, in the case where the cavity is positioned with its centerline axis parallel to a horizontal plane). The magnets would preferably be sufficiently weak in power to avoid creating any instability in the levitation and/or rotation induced by the superconducting element arrays 954, 956.

Figure 26:
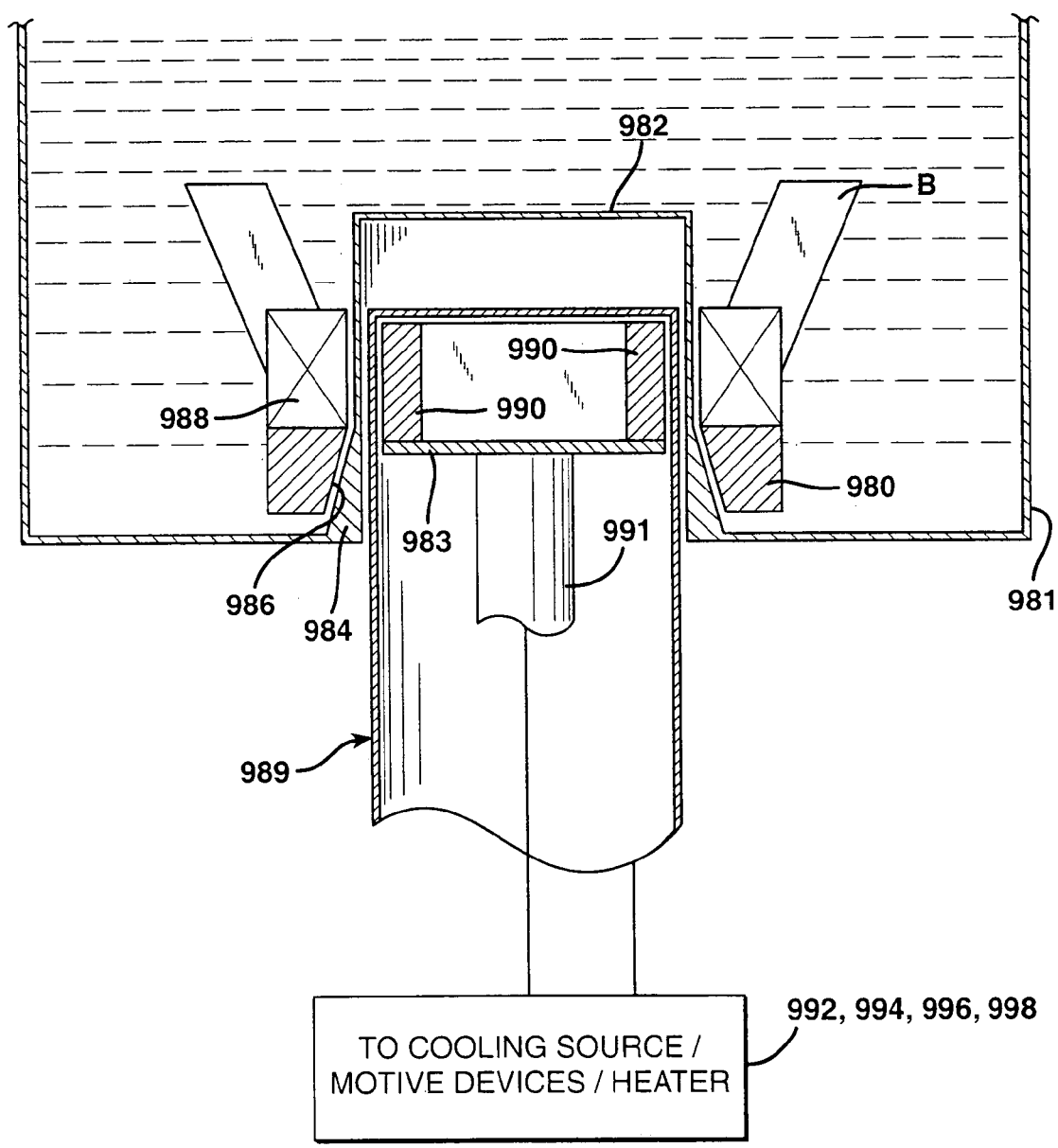
FIG. 26 is a partially cross-sectional view showing a vessel including an engagement structure for engaging and supporting the pumping or mixing element when in a non-levitating condition.
Figure 27:
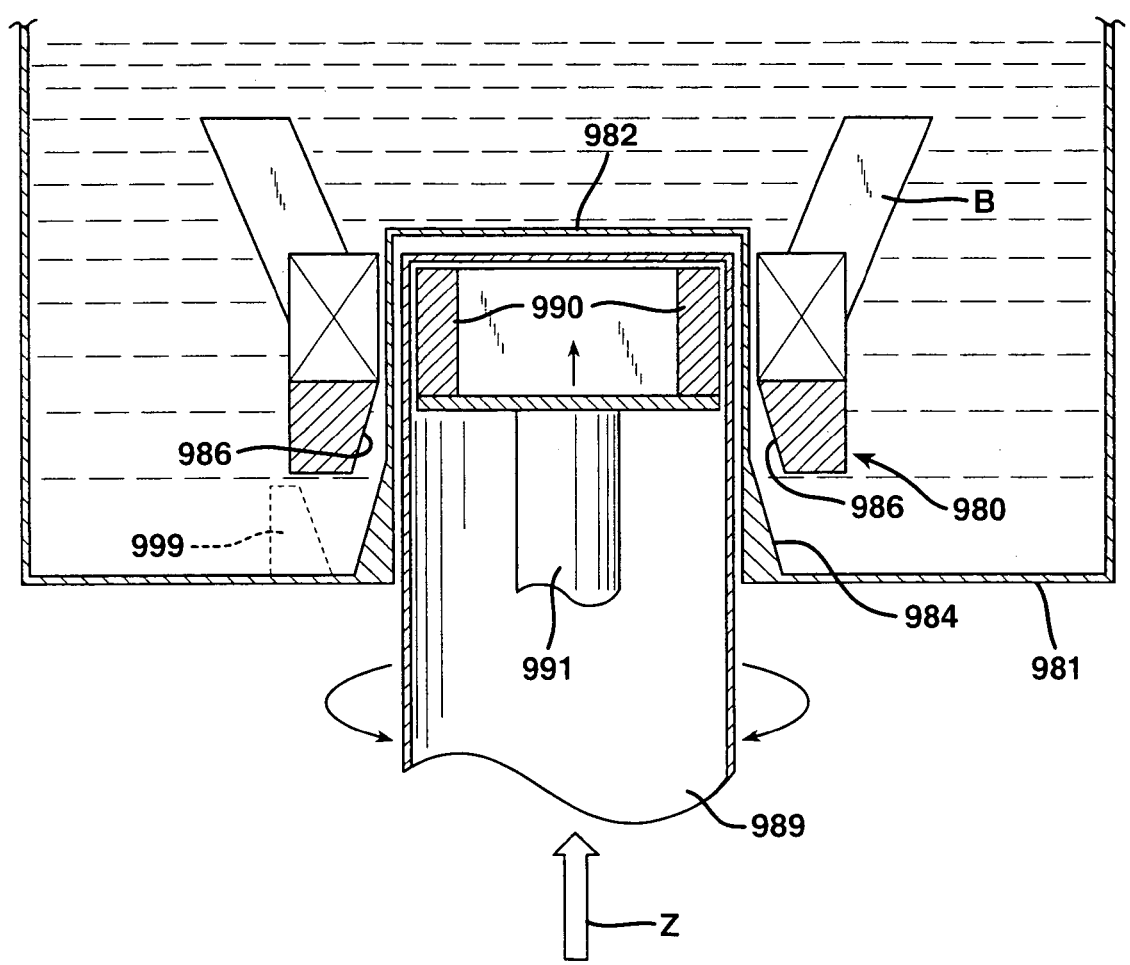
FIG. 27 is a partially cross-sectional view showing the moving of the cryostat to in turn move the magnetically coupled pumping or mixing element of FIG. 26 to a levitated position.

FIGS. 26 and 27 show a method and apparatus for centering and setting up a pumping or mixing element 980 that is capable of levitating in a vessel 981, such as in a hermetically sealed tank, in a sterile vessel, such as a flexible bag, or even in an open-top vessel where access to the corresponding surface adjacent to levitating the pumping or mixing element is restricted. The vessel 981 includes a cavity 982, as described above. Inside the vessel 981, the cavity 982 may include along its outer surface an engagement structure for contacting, engaging, or supporting the pumping or mixing element 980 when in a non-levitating or resting position. In the preferred embodiment, this engagement structure comprises a frusto-conical surface 984 that is tapered relative to the horizontal plane. The pumping or mixing element 980, which is of course generally annular, includes a matching surface 986 along at least a portion of an adjacent inner surface thereof. Preferably, the matching surface 986 is formed in an inert portion of the pumping or mixing element 980, such as the matrix material (e.g., plastic, metal, composites, etc.) used to support the levitation magnet or magnet array 988 (which is shown schematically, but could be any appropriate one of the arrangements described herein). The pumping or mixing element 980 is shown slightly raised in the vertical direction to illustrate the shape of the surfaces 984, 986. However, it should be appreciated that these surfaces 984, 986 would normally be in contact with each other as the result of gravity when the pumping or mixing element 980 is at rest (i.e., non-levitating), such that a radial centering function is inherently provided.

A cryostat 989, which may be substantially identical to those described above, is positioned in the cavity 982. In particular, the cryostat 989 contains one or more superconducting elements 990 (which may in turn be formed of segments) that are mounted on a platform 983 that is in turn coupled via thermal link 991 to a cooling source, which in view of the various versions described herein is merely shown in block form. The entire cryostat 989 is preferably coupled to a second motive device 994, also shown in block form, that rotates it along with the superconducting element(s) 990. It may also be coupled to a second motive device for moving it relative to an inner surface of the cavity 982, such as in the vertical direction as shown in FIG. 26. As described above, in the case of non-cryogenic fluids, the cryostat 989, or at least the portion housing the superconducting element(s) 990 and any other cryogenic structures, is preferably evacuated or insulated to prevent thermal transfer to the adjacent vessel 981.

To form a magnetic coupling between the superconducting element(s) 990 and the levitation magnet 988 of the pumping or mixing element 980, the cryostat 989 is moved to a position within the cavity 982 where these two structures are substantially aligned. In particular, the alignment is such that the superconducting element(s) 990 face the adjacent levitation/driven magnet(s) on the pumping or mixing element 980, which of course is inside of the vessel 981. Once this alignment is achieved, the superconducting element(s) 990 are cooled to below the transition temperature (preferably less than 90K for a YBCO superconductor) in accordance with a field cooling protocol. As a result, a magnetic coupling is established with the levitation/driven magnet 988 and the desired pinning forces are created that permit stable, exceptionally reliable levitation of the pumping or mixing element 980 (and rotation, in the case where the superconducting element 990 is rotated, such as by using the configuration shown in FIG. 21).

Once the magnetic coupling is formed, the cryostat 989 may be moved further into the cavity 982, either manually or using a third motive device 996, such as a linear actuator or the like. As a result of the coupling formed between the superconducting element(s) 990 and the levitation magnet 988, this causes the matching surface 986 of the pumping or mixing element 980 to separate from the frusto-conical engagement surface 984 (see FIG. 27 and note action arrow Z). Rotation of the cryostat 989 using the second motive device 994 may then be effected as described above to cause the levitating pumping or mixing element 980 to rotate and, hence, pump or mix the fluid in the vessel 981.

To return the pumping or mixing element 980 to a resting position such that contact is re-established between surfaces 984, 986, the superconducting element(s) 990 need only be returned to above the transition temperature, at which point the magnetic coupling is lost. To expedite this operation, and as described above, a heater 998 may be used. Once the coupling is no longer formed, it should be appreciated that the pumping or mixing element 980 gently comes to rest such that the surfaces 984, 986 are in engagement and the desired centering function is provided as a result of the matching tapers or slopes. Advantageously, this means that the user of the system need not have access to the pumping or mixing element 980 to ensure that it is properly centered for purposes of field cooling prior to levitation, and actually avoids the need for the use of a set-up kit, as described above (which in this case could be hat-shaped with a set-up or charging magnet corresponding in magnetic field and polarity to levitation magnet being placed over the head end of the cryostat 989).

The use of this "moving cryostat" arrangement with the other embodiments of pumping or mixing systems disclosed herein is also possible, and in particular, with the embodiment shown in FIGS. 19, 20, 23-25 (which may require adjusting the relative dimensions or adding an annular piece of inert material to the pumping or mixing element to provide the matching surface 986). Also, instead of forming the frusto-conical surface as part of the cavity 982, it could actually be a separate, freestanding structure positioned at the same location or adjacent to the outer surface of the pumping or mixing element 980 (see the phantom depiction of engagement structure 999 in FIG. 27), in which case the matching surface 986 would be positioned accordingly (i.e., along the outer surface of the pumping or mixing element 980). The entire arrangement could also be inverted (not shown), with the engagement surface 984 being provided on the upper end of the cavity 982 and the matching surface 986 being on a corresponding surface of the pumping or mixing element 980 (in which case, the cryostat 989 would be withdrawn from the cavity 982 once the desired magnetic coupling is formed). If the vessel 981 is inverted, the cavity 982 would preferably be elongated to avoid interfering with the adjacent wall of the vessel 981.

As explained in a co-pending provisional application assigned to CT Technologies, Inc., each of the embodiments of pumping or mixing systems disclosed herein 10, 100, 200, 300, 700, 800, or 900 could also be used for mixing a fluid with a product, such as a bacterial nutrient culture media, eukaryotic cell nutrient culture media, buffer, reagent, or like intermediate product for forming one or more end products. As a result of the levitating nature of the pumping or mixing element, application of these systems to vessels where the product and the pumping or mixing element are sealed in the vessel before use, including in an aseptic environment, is of course possible.

In summary, a number of systems 10, 100, 200, 300, 700, 800, 900 as well as variations on these systems and related methods, are disclosed that use or facilitate the use of superconducting technology to levitate a magnetic element that, when rotated, serves to pump or mix a fluid. In one system 10, the magnetic element 14 is placed in a fluid vessel 16 positioned external to a cryostat 12 having an outer wall or other housing 18 for containing a superconducting element 20. A separate cooling source 24 (either a cryogenic chamber 26, FIGS. 1 and 3 or a refrigerator 48, FIG. 2) thermally linked to the superconducting element 20 provides the necessary cooling to create the desired superconductive effects and induce levitation in the magnetic element 14. Since the pumping or mixing element levitates in the fluid F, no penetration of the vessel walls by mixing or stirring rods is necessary, which eliminates the need for dynamic bearings or seals. Additionally, the outer wall 18 of the cryostat 12 or other housing defines a chamber 25 that thermally isolates and separates the superconducting element 20 from the vessel 16 containing the fluid F and pumping or mixing element 14. The thermal isolation may be provided by evacuating the chamber 25, or filling it with an insulating material. By virtue of this thermal isolation and separation, the superconducting element 20 can be positioned in close proximity to the outer wall or housing 18 adjacent to the vessel 16 and pumping or mixing element 14, thereby achieving a significant reduction in the separation distance or gap G between the pumping or mixing element 14 and the superconducting element 20. This enhances the magnetic stiffness and loading capacity of the magnetic levitating pumping or mixing element 14, thus making it suitable for use with viscous fluids or relatively large volumes of fluid.

The exceptionally stable levitation provided as a result of the reduced separation distance also significantly reduces the potential for contact between the rotating pumping or mixing element and the bottom or sidewalls of the vessel. This makes this arrangement particularly well-suited for use in fluids that are sensitive to shear stress or the effects of frictional heating. However, since the superconducting element 20 is substantially thermally isolated and separated from the vessel 16, the magnetic element 14, and hence the fluid F contained therein, may be shielded from the cold temperatures generated by the cooling source 24 to produce the desired superconductive effects and the resultant levitation. This allows for temperature sensitive fluids to be mixed or pumped. By using means external to the vessel 16 to rotate and/or stabilize the magnetic element 14 levitating in the fluid F, such as one or more rotating driving magnets coupled to the magnetic element 14, the desired pumping or mixing action is provided.

Additional embodiments of systems 100 (900), 200 for pumping or mixing a fluid wherein the necessary motive force is provided from the same side of the vessel at which the superconducting element is positioned are also disclosed, as are systems 300, 400 for rotating an inline pumping or mixing element positioned in a vessel in the form of a pipe or the like in a similar fashion. Alternative systems 700, 800, and 900 are also disclosed, which are particularly well adapted for applications using special vessels having cavities that assist in withstanding high internal pressures. Particular orientations of the crystallographic planes of the material used as the superconductor are also described to enhance the levitation force and magnetic stiffness of the coupling, which in turn increases the stability and load capacity of the pumping or mixing element, as is the use of opposing pairs of permanent magnets to provided a levitation-assist function. A manner of centering and setting up a pumping or mixing element in a hermetically sealed vessel is also disclosed.

The foregoing description of various embodiments of the present invention have been presented for purposes of illustration and description. The description is not intended to be exhaustive or to limit the invention to the precise forms disclosed. Obvious modifications or variations are possible in light of the above teachings. For example, while the use of a thermally separated superconducting element is disclosed, the subsequent development of room temperature superconductors would obviate this need. The embodiments described provide the best illustration of the principles of the invention and its practical applications to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The invention claimed is:

1. A mixing tank assembly for use in mixing a fluid under sterile conditions so as to avoid contamination or leakage, comprising:
   a side wall having an interior surface at least partially bounding a chamber;
   a floor disposed within or at the base of the chamber, the floor having an opening extending therethrough;
   a flexible bag disposed within the chamber so as to rest on the floor, the flexible bag having an upper portion and a substantially continuous lower portion bounding a hermetically sealed compartment capable of holding the fluid under sterile conditions;
   a mixer disposed within the compartment of the flexible bag; and
   a shaft having a first end for receiving the mixer.

2. The assembly according to claim 1, wherein the shaft projects through an aperture in the flexible bag, and further including a seal for sealing the shaft to the bag to prevent leakage.

3. The assembly of claim 1, wherein the shaft comprises an oversized head portion.

4. The assembly of claim 1, wherein the shaft is coupled to the mixer.

5. The assembly of claim 1, wherein the shaft is positioned in a cavity formed in a side of the bag.

6. The assembly of claim 1, wherein the shaft comprises a post integral with the bag.

7. The assembly of claim 1, wherein the shaft includes a second end external to the bag.

8. A mixing tank assembly for use in mixing a fluid under sterile conditions so as to avoid contamination or leakage comprising:
   a first container including a lower portion having an opening;
   a hermetically sealed flexible bag disposed within the first container;
   a mixer disposed within the flexible bag; and
   a shaft having a first end for receiving the mixer and an opposing second end, said shaft being secured to said flexible bag.

9. The assembly of claim 8, wherein the lower portion comprises the floor of the first container.

10. The assembly of claim 8, wherein the lower portion comprises a sidewall of the first container.

11. The assembly of claim 8, wherein the second end of the shaft is inserted in a motive device.

12. The assembly of claim 8, wherein the shaft projects through an aperture in the flexible bag, and further including a seal for sealing the shaft to the bag.

13. The assembly of claim 12, wherein the seal is formed by a tie surrounding the shaft.

14. A mixing tank assembly for use in mixing a fluid under sterile conditions so as to avoid contamination or leakage, comprising:
   a support structure;
   a flexible bag resting on the support structure, said flexible bag having an upper portion and a substantially continuous lower portion bounding a hermetically sealed compartment capable of holding the fluid under sterile conditions;
   a mixer disposed within the compartment; and
   a shaft having a first end for receiving the mixer.

15. The assembly of claim 14, wherein the shaft is connected to the flexible bag.

16. The assembly of claim 14, wherein the shaft is movable relative to the flexible bag.

17. The assembly of claim 14, wherein the flexible bag surrounds the shaft.

18. The assembly of claim 14, wherein the support structure comprises a generally planar surface for supporting the flexible bag.

19. The assembly of claim 14, wherein the support structure comprises a container having a side wall with an interior surface at least partially bounding a chamber for receiving the flexible bag, said container further including a floor disposed within or at the base of the chamber, the floor having an opening extending therethrough.

20. The assembly of claim 14, wherein the support structure includes an opening through which a second end of the shaft extends.

21. The assembly of claim 14, wherein the flexible bag includes a nipple in the lower portion thereof and the shaft projects through the nipple.

22. The assembly of claim 21, further including a seal for sealing the shaft to the bag.

23. The assembly of claim 22, wherein the seal is formed by a tie surrounding the shaft.

* * * * *